(12) United States Patent
Yohe et al.

(10) Patent No.: US 10,144,596 B2
(45) Date of Patent: Dec. 4, 2018

(54) SYSTEM AND METHOD FOR FORMING AND MOVING AN ARTICLE ARRAY

(71) Applicant: DYCO, INC., Bloomsburg, PA (US)

(72) Inventors: Peter D. Yohe, Bloomsburg, PA (US); Jeffrey W. Hess, Bloomsburg, PA (US); Ronald H. Cordingly, Berwick, PA (US); Thomas M. Zurewich, Orangeville, PA (US)

(73) Assignee: DYCO, INC., Bloomsburg, PA (US)

( * ) Notice: Subject to any disclaimer, the term of this patent is extended or adjusted under 35 U.S.C. 154(b) by 0 days.

(21) Appl. No.: 15/410,317

(22) Filed: Jan. 19, 2017

(65) Prior Publication Data
US 2017/0129715 A1    May 11, 2017

Related U.S. Application Data

(63) Continuation-in-part of application No. 14/721,409, filed on May 26, 2015, now Pat. No. 9,586,769.

(51) Int. Cl.
| | |
|---|---|
| *B65B 35/56* | (2006.01) |
| *B65G 47/74* | (2006.01) |
| *B65G 47/90* | (2006.01) |
| *B65B 35/40* | (2006.01) |
| *B65G 47/08* | (2006.01) |
| *B65B 21/06* | (2006.01) |
| *B65B 21/12* | (2006.01) |
| *B65B 21/18* | (2006.01) |
| *B65B 35/36* | (2006.01) |
| *B65B 35/30* | (2006.01) |
| *B65B 35/50* | (2006.01) |

(52) U.S. Cl.
CPC .............. *B65G 47/74* (2013.01); *B65B 21/06* (2013.01); *B65B 21/12* (2013.01); *B65B 21/18* (2013.01); *B65B 35/36* (2013.01); *B65B 35/40* (2013.01); *B65G 47/082* (2013.01); *B65G 47/084* (2013.01); *B65G 47/90* (2013.01); *B65B 35/30* (2013.01); *B65B 35/50* (2013.01); *B65B 35/56* (2013.01)

(58) Field of Classification Search
CPC ......... B65B 5/061; B65B 35/40; B65B 35/44; B65B 9/02; B65G 47/082; B65G 47/088
USPC ......... 198/418.1, 418.5, 418.7, 419.1, 419.3, 198/429, 459.7, 468.11, 736, 747; 414/791.7, 792.6; 53/244, 255, 448, 475, 53/531, 542
See application file for complete search history.

(56) References Cited

U.S. PATENT DOCUMENTS

| | | | |
|---|---|---|---|
| 1,558,691 A | 10/1925 | McDermott | |
| 3,127,029 A | 3/1964 | Luginbuhl | |
| 3,172,547 A * | 3/1965 | Holstebroe | ............. B65B 35/50 414/791.7 |
| 3,435,584 A * | 4/1969 | Prechter | .................. B65B 5/061 198/418 |
| 4,041,674 A | 8/1977 | Reid | |

(Continued)

*Primary Examiner* — Gregory W Adams
(74) *Attorney, Agent, or Firm* — McNees Wallace & Nurick LLC

(57) ABSTRACT

A system for forming and moving an article array including a consolidation area having a support surface for receiving and arranging rows of articles to form an article array from an article row delivery device while the consolidation area continuously stabilizingly supports the periphery of the article rows positioned on the support surface as the article rows are arranged to form the article array.

12 Claims, 57 Drawing Sheets

(56) References Cited

U.S. PATENT DOCUMENTS

| | | | |
|---|---|---|---|
| 4,667,808 A | | 5/1987 | Mastak |
| 5,030,058 A | * | 7/1991 | Dorner ............... B65G 47/82 198/463.4 |
| 5,548,945 A | | 8/1996 | Nippes |
| 6,164,045 A | * | 12/2000 | Focke ............... B65B 5/105 198/429 |
| 6,328,153 B1 | | 12/2001 | Manghi et al. |
| 6,419,442 B1 | * | 7/2002 | O'Brien ............... B65G 47/82 414/790.3 |
| 6,739,108 B2 | * | 5/2004 | Blattner ............... A23L 3/001 53/247 |
| 6,782,678 B1 | | 8/2004 | Bodereau |
| 7,066,317 B2 | | 6/2006 | Iwasa et al. |
| 7,506,490 B1 | | 3/2009 | Yohe et al. |
| 7,634,894 B2 | | 12/2009 | Yohe et al. |
| 7,721,509 B2 | | 5/2010 | Vissers |
| 7,726,932 B2 | | 6/2010 | Leblanc et al. |
| 7,900,766 B2 | | 3/2011 | Takayama et al. |
| 7,942,254 B2 | | 5/2011 | Schell |
| 8,875,869 B1 | | 11/2014 | Burchell et al. |
| 2006/0016094 A1 | * | 1/2006 | Covert ............... F26B 5/06 34/217 |
| 2015/0037126 A1 | | 2/2015 | Parker |

\* cited by examiner

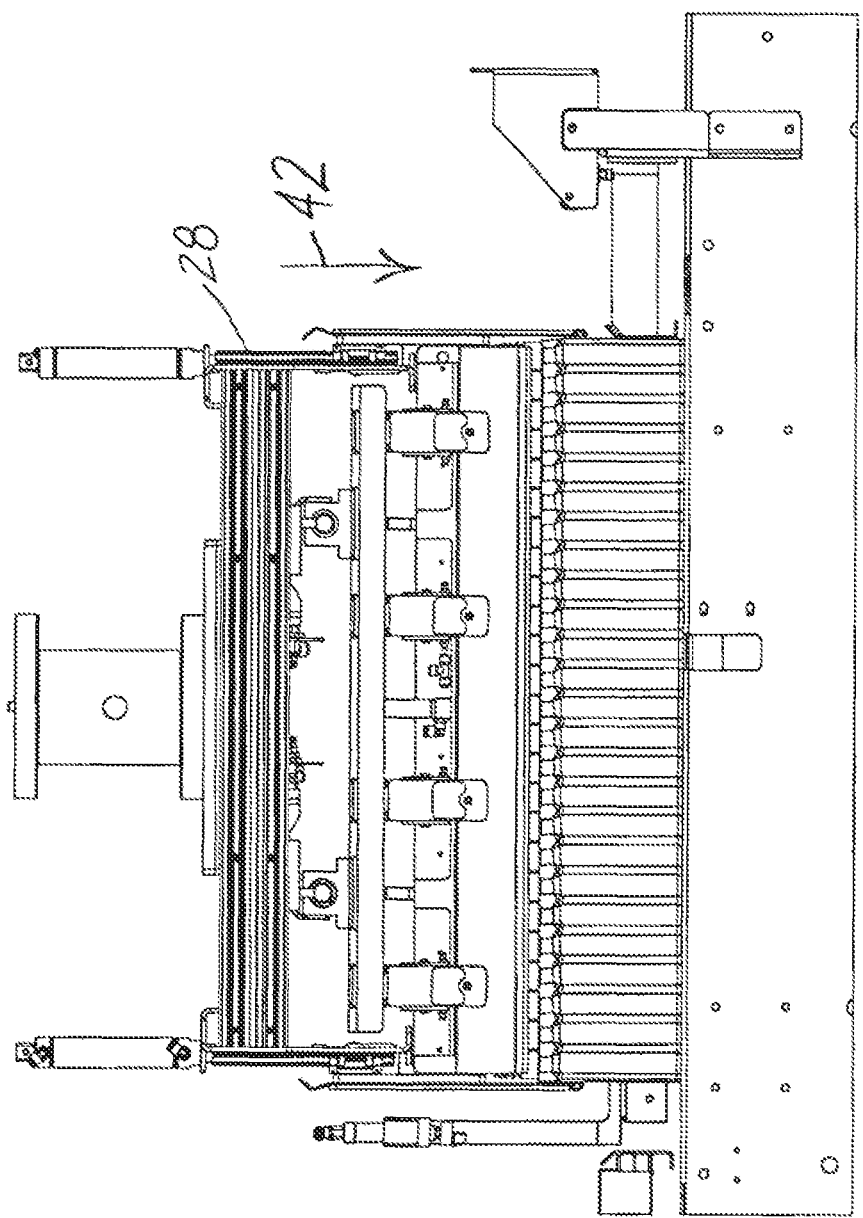

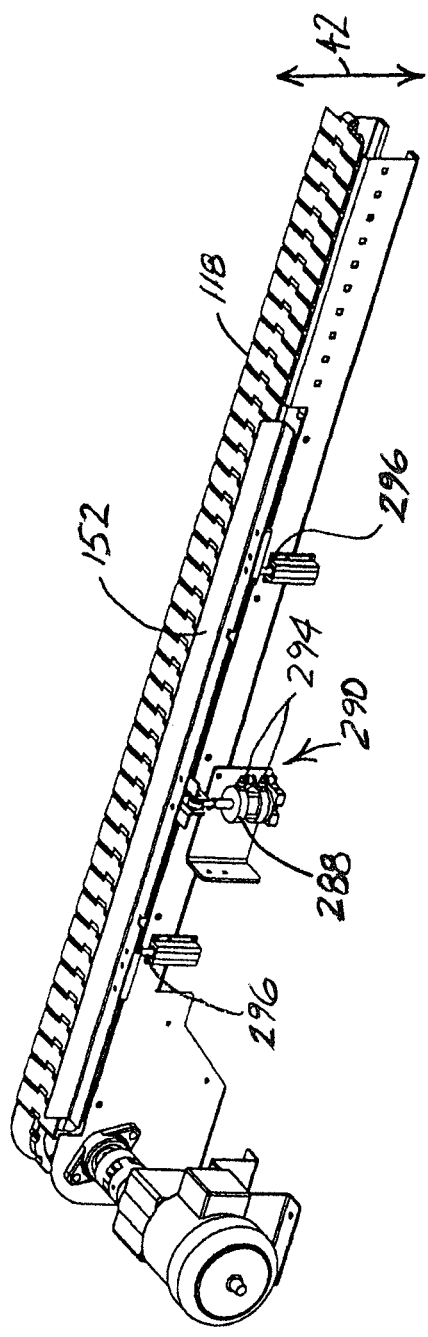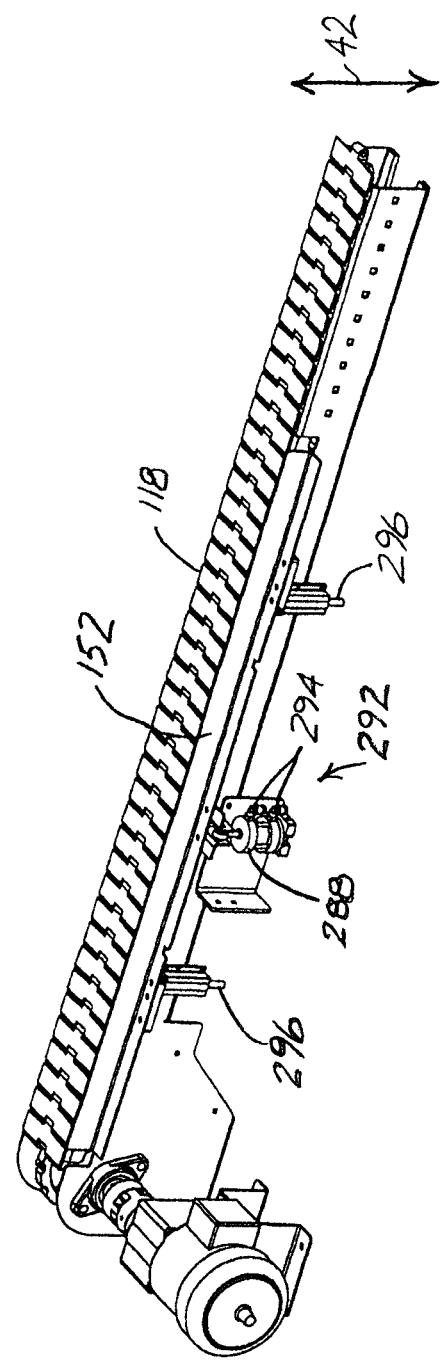

SYSTEM AND METHOD FOR FORMING AND MOVING AN ARTICLE ARRAY

FIELD OF THE INVENTION

The present invention is directed to a system for equipment associated with loading and unloading palletizing article arrays or portions thereof.

BACKGROUND OF THE INVENTION

When large numbers of stackable articles must be transported in large quantities to another location, especially when the article is small, the article may be packaged in a container to protect the article during shipping of the container. Alternately, to reduce the amount of handling required and/or to reduce the amount of shipping material consumed, the articles may be arranged in a tight grouping, or array, of articles. Each array of articles can form a layer of articles that can be stacked on a pallet having a footprint which can be accommodated by freight hauling compartments, e.g., for truck, rail, sea or air vessels.

Palletizing articles is becoming increasingly automated in manufacturing facilities, wherein articles are moved via a conveyor, which articles are manipulated by dedicated machinery onto pallets.

It would be beneficial to develop and use a system for loading/unloading article array heads.

BRIEF DESCRIPTION OF THE INVENTION

In an embodiment, a system for forming and moving an article array including a consolidation area having a support surface for receiving and arranging rows of articles to form an article array from an article row delivery device while the consolidation area continuously stabilizingly supports a periphery of the article rows positioned on the support surface as the article rows are arranged to form the article array. The consolidation area includes a backing plate and a first stabilizer, the article rows positioned between the backing plate and first stabilizer, the backing plate and the stabilizer providing stabilizing support to opposed portions of the periphery of the article rows. Upon the first stabilizer and the backing plate moving and stabilizingly supporting the article rows in a first direction while forming the article array, at least the backing plate in contact with a corresponding row of the article rows while moving the article rows in the first direction, a second stabilizer provides independent stabilizing support to the portion of the periphery of the article rows stabilizingly supported by the backing plate prior to the backing plate moving in a direction opposite the first direction, in preparation of receiving additional article rows in the consolidation area immediately adjacent the article rows already positioned on the support surface for forming the article array. Upon formation of the article array, the second stabilizer discontinues providing stabilizing support to the portion of the periphery of article rows formerly stabilizingly supported by the backing plate, the portion of the periphery of the first row of articles formerly stabilizingly supported by the backing plate being stabilizingly supported by a corresponding portion of the periphery of the additional rows of articles, and a portion of the periphery of the additional row of articles being stabilizingly supported by the backing plate. An article array moving device is provided for moving the article array from the consolidation area toward the collection area.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIGS. 5-21 are sequential operational movements of the forming/moving system of the article array forming/moving system of FIG. 4.

FIG. 54 is an enlarged, isolated upper perspective view of an exemplary stabilizer in a raised position.

FIG. 55 is an enlarged, isolated upper perspective view of the stabilizer of FIG. 54 in a retracted position.

Wherever possible, the same reference numbers will be used throughout the drawings to represent the same parts.

DETAILED DESCRIPTION OF THE INVENTION

Figure 1:
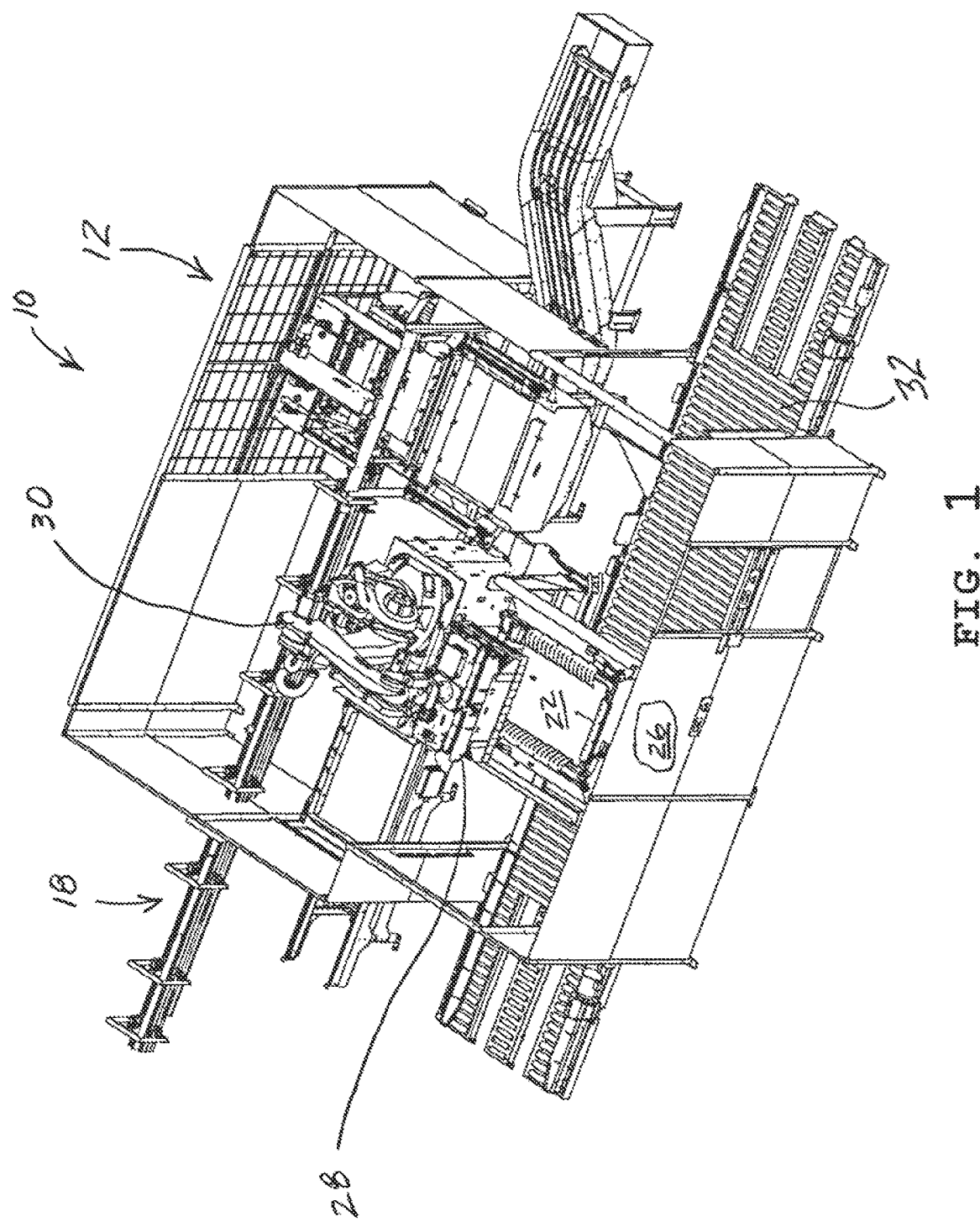
FIG. 1 is an upper perspective view of an exemplary palletizing system.

Referring to FIG. 1, an automated palletizer system or palletizer 10 utilizing an article array forming/moving system 12 is shown. Article array forming/moving system 12 receives articles 14 (FIG. 4), and more specifically, article rows 16 (FIG. 4) from an article row delivery device 18, such as a conveyor for forming article arrays 22 (FIG. 18) that are moved to a collection area 26 (FIG. 1) such as a container or a tray (e. g., having a bottom surface and short peripheral walls extending upwardly from the bottom surface), by a article array moving device 28 movable by an anthropomorphic robotic arm 30. As shown in FIG. 1, once container or collection area 26 is filled with article arrays 22 and closed, the container or collection area 26 is moved via a conveyor 32 for shipping. In other palletizing embodiments, the components may by arranged differently. Other exemplary embodiments of associated components of palletizer 10 will be discussed in further detail below.

For purposes herein, the term "article row" may be used irrespective the number of articles rows being gripped, moved or otherwise manipulated. In other words, the term "article row" may be used irrespective a single row of articles or article row 16 (FIG. 22), a pair of rows of articles or article row pairs 17 (FIG. 18) or more than two pairs of article rows or an array of articles or article array 22 (FIG. 4) being gripped, moved or otherwise manipulated. Similarly, the term "article array" may refer to two or more article rows, although the term "partial article array" may be used to refer to an article array already having two or more article rows, but undergoing further loading or building of article rows, thereby further building, loading or enlarging the existing article array. The terms "gripped" and "manipulated" and "moved" and the like in the context of the interaction between the article row delivery device and the article row(s) may be used interchangeably.

Figure 2:
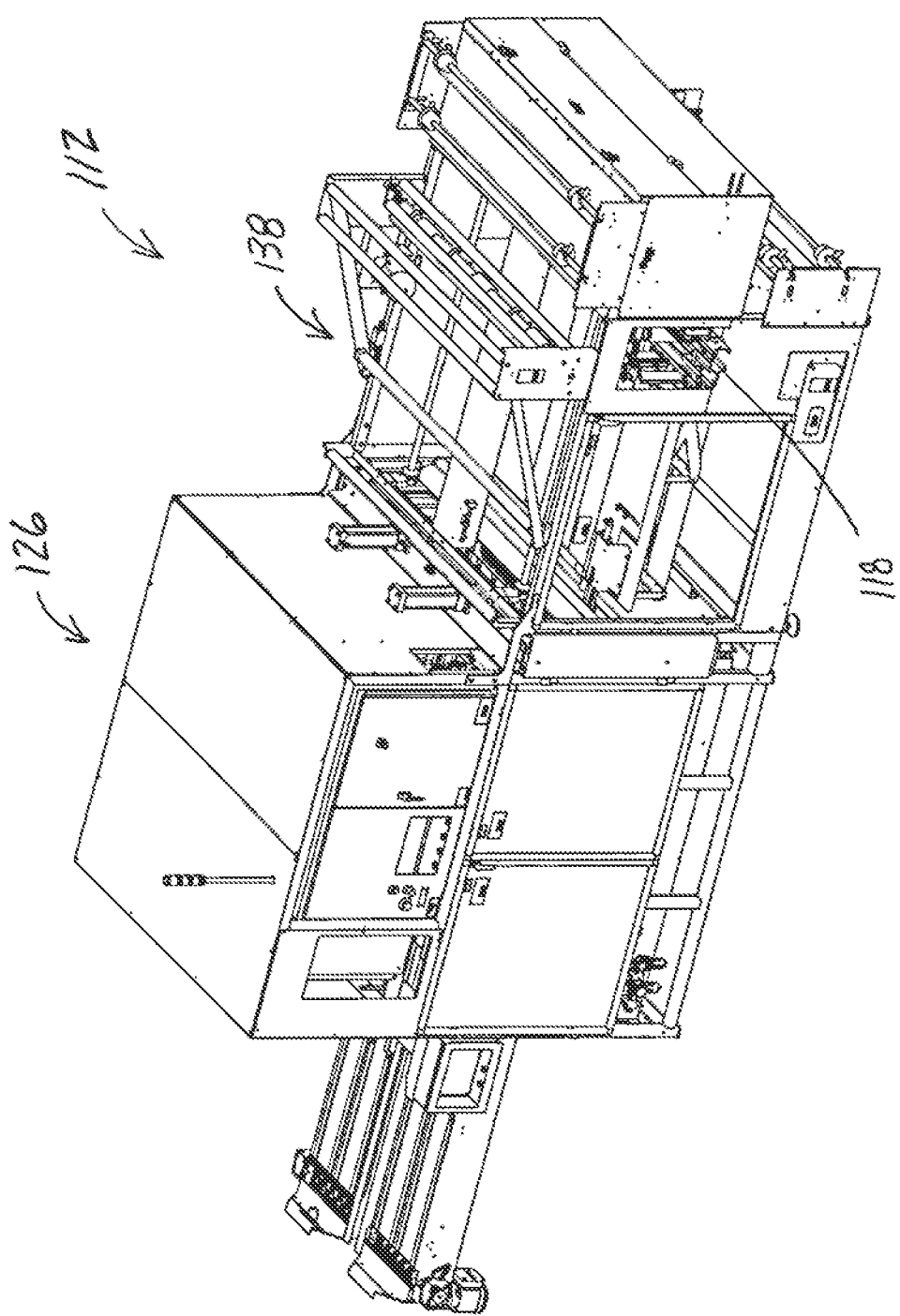
FIG. 2 is an upper perspective view of an exemplary article array forming/moving system.

FIG. 2 shows an article array forming/moving system 112 configured to receive successive article rows 16 (FIG. 22) from article row delivery device 118 for forming the article array 22 (FIG. 29) in consolidation area 138 prior to moving the article array 22 to collection area 126, such as a bagging area.

Figure 3:
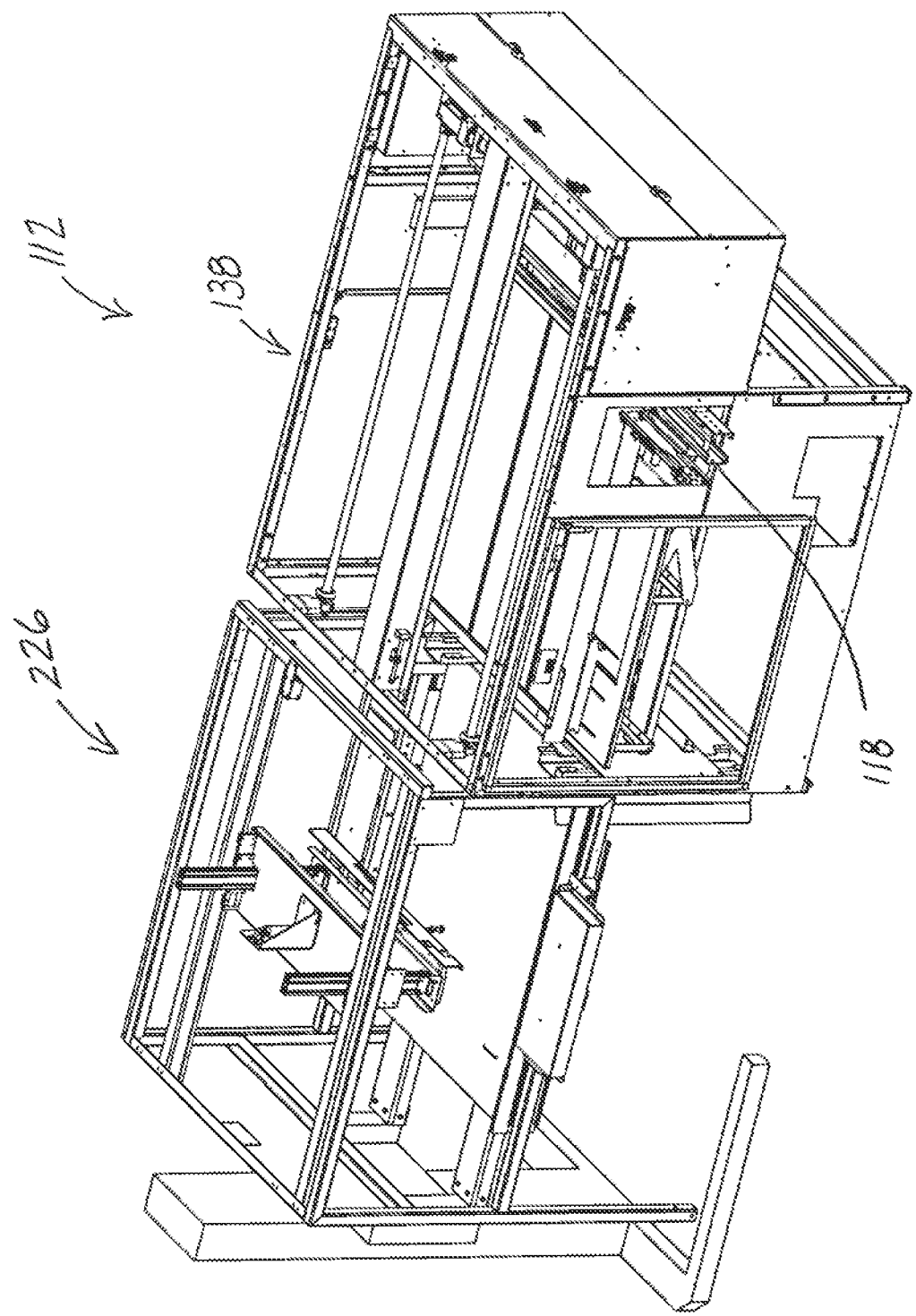
FIG. 3 is an upper perspective view of an exemplary article array forming/moving system.
Figure 34:
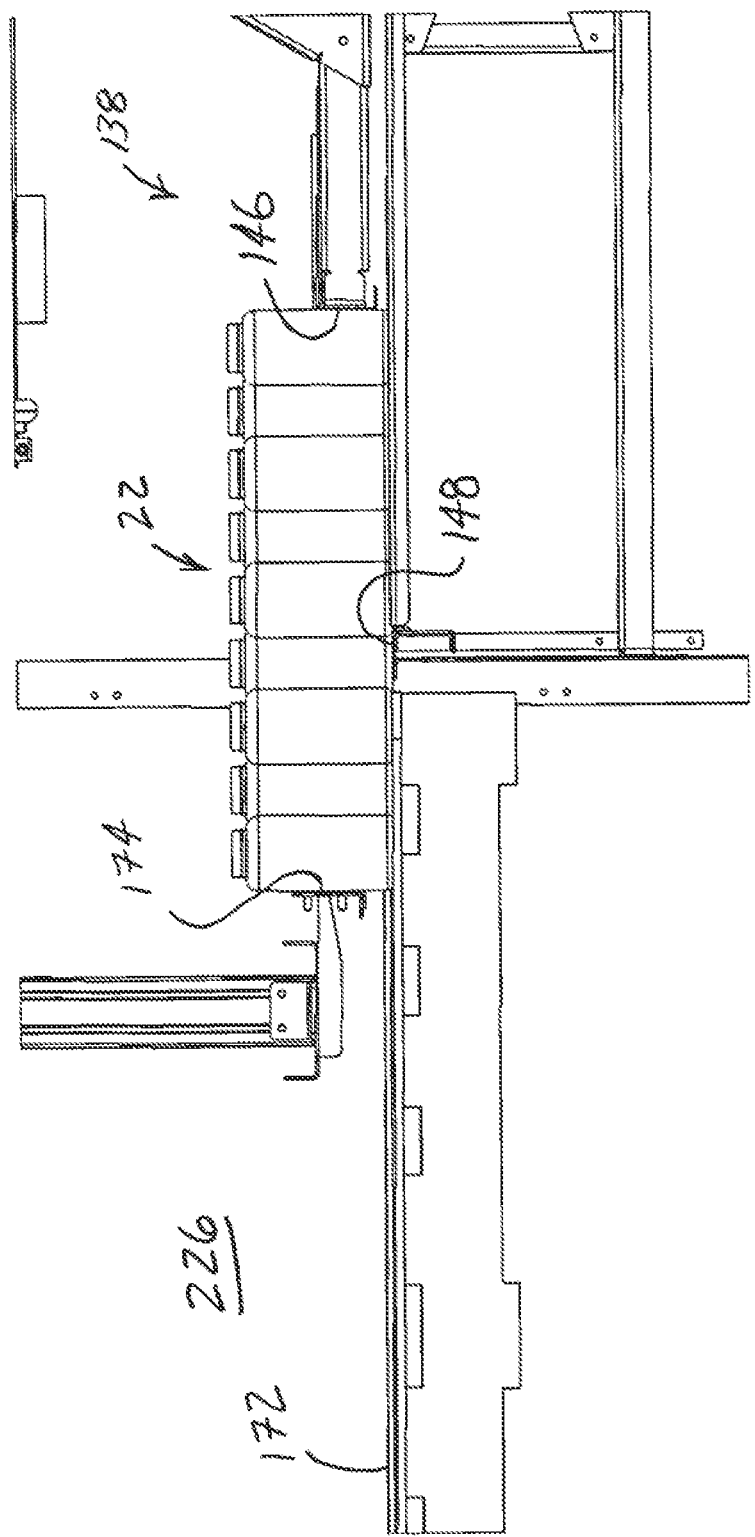
FIG. 34 is an operational movement of the forming/moving system of the article array forming/moving system of FIG. 3.

FIG. 3 shows an article array forming/moving system 112 configured to receive successive article rows 16 (FIG. 22) from article row delivery device 118 for forming the article array 22 (FIG. 29) in consolidation area 138 prior to moving the article array 22 to collection area 226, such as onto a slip sheet 172 (FIG. 34).

Figure 4:
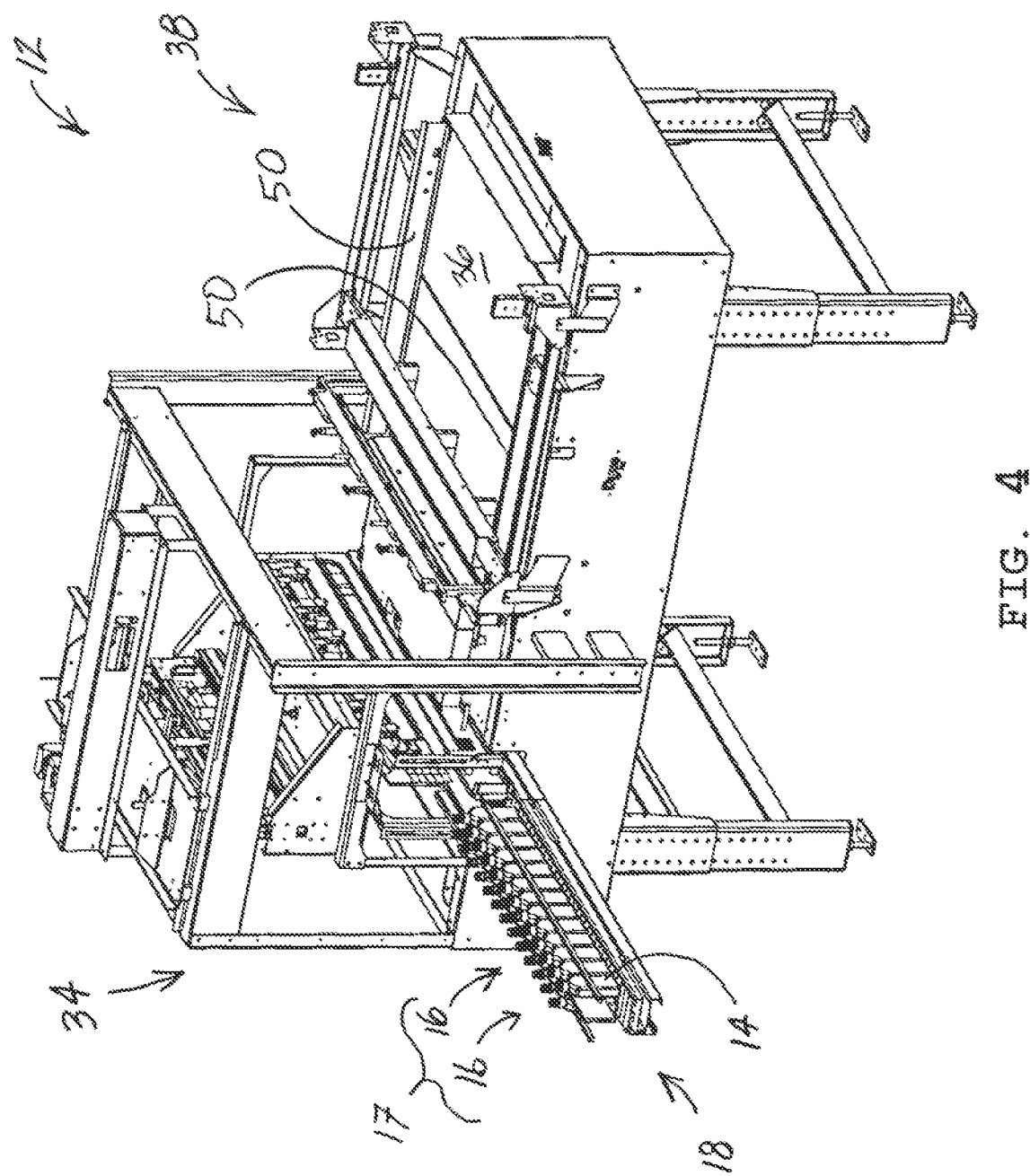
FIG. 4 is an upper perspective view of an exemplary article array forming/moving system.

FIG. 4 shows article array forming/moving system 12 that is configured to receive an article row pair 17 or pair of article rows 16 from article row delivery device 18. As shown in FIG. 4, article row delivery device 18 is a conveyor used in combination with an article row handling device 34. Article row handling device 34 receives article row pair 17 from article row delivery device 18, and then places the article row pair 17 onto a support surface 36 of a consolidation area 38. In another embodiment, the article row delivery device can include an article array head, such as article array moving device 28 (FIG. 1) used in combination with an article row delivery device 18 or other article row delivery source.

Figure 36:
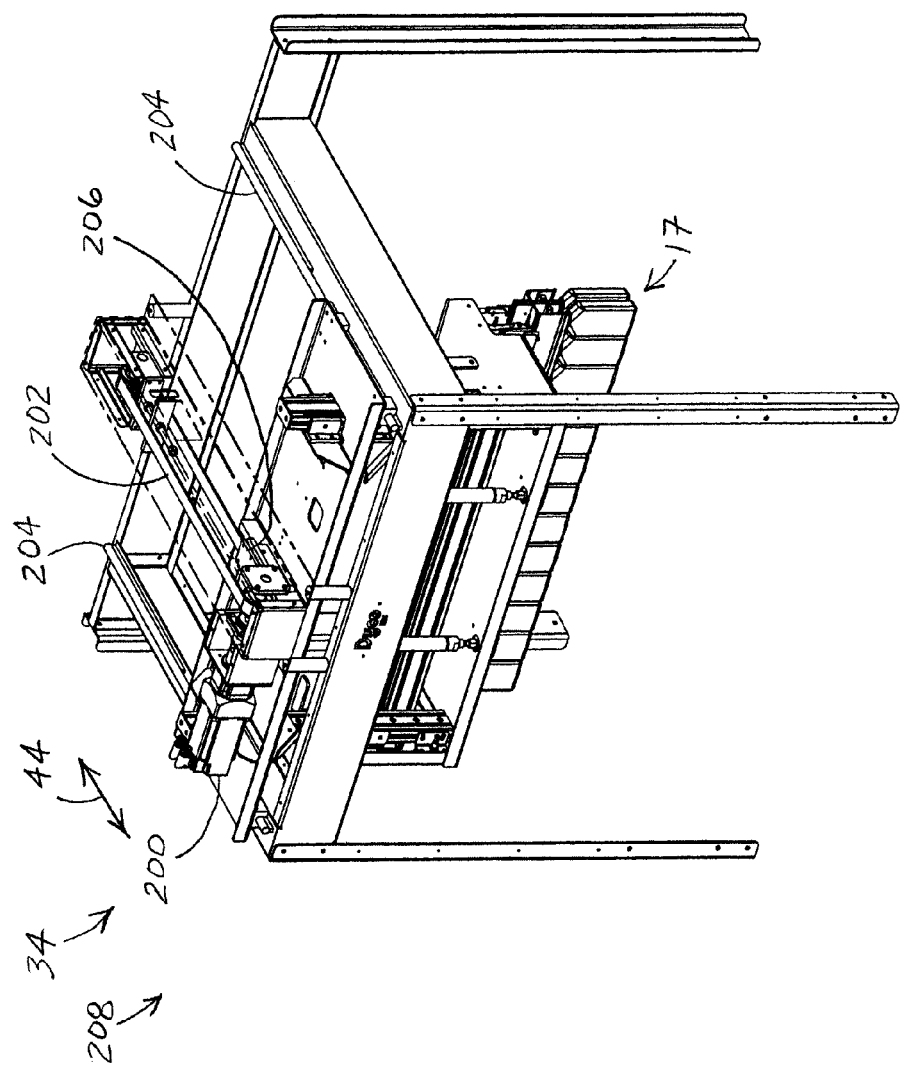
FIG. 36 is a partial cutaway view of the article array forming/moving system of FIG. 4 rotated 90 degrees counterclockwise about a vertical axis, the article array forming/moving system in a home position.
Figure 37:
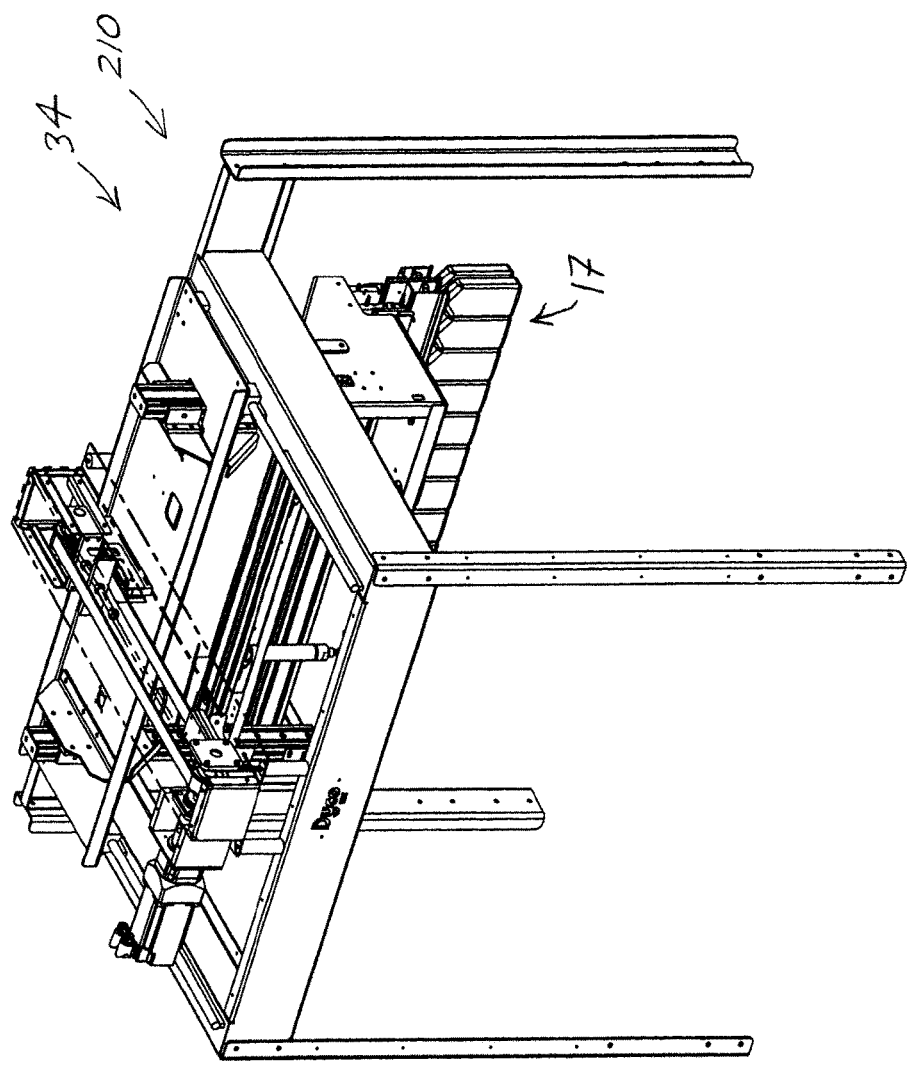
FIG. 37 is the partial cutaway view of the article array forming/moving system of FIG. 36 in an extended position.

As further shown in FIG. 36, which is a partial cutaway of FIG. 4 rotated 90 degrees counterclockwise about a vertical axis, article row handling device 34 is urged into movement in horizontal direction 44 along guides 204 by a motor 200 which rotationally drives a drive belt 202 that is connected to article row handling device 34 by a block 206. FIG. 36 shows article row handling device 34 in a home position 208 while FIG. 37 shows article row handling device 34 in an extended position 210.

Figure 5:
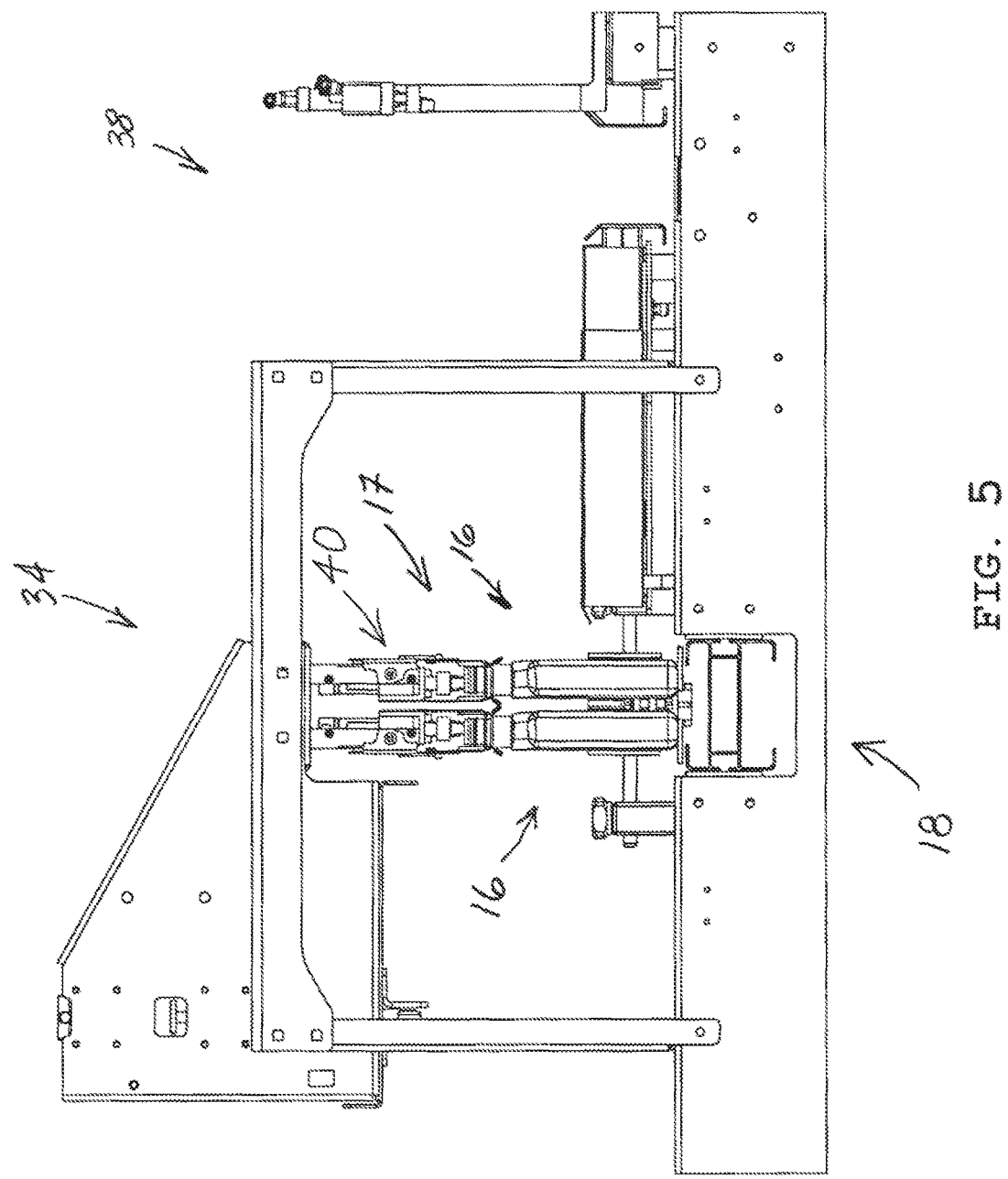

FIGS. 5-17 sequentially show the operation of article array forming/moving system 12 (FIG. 4). It is to be understood that the exemplary sequential operation movements shown in FIGS. 5-17 (as well as other exemplary operational movements discussed in further detail below) may at least partially occur simultaneously or in an order different than that discussed. As shown in FIG. 5, the exemplary article row handling device 34 includes a clamping head 40 having a pair of gripping jaws for engaging each article row 16 of article row pair 17 received from article row delivery device 18. In one embodiment, the clamping head may be able to engage a different number of article rows, such as the number of article rows provided from the article row delivery device.

Figure 38:
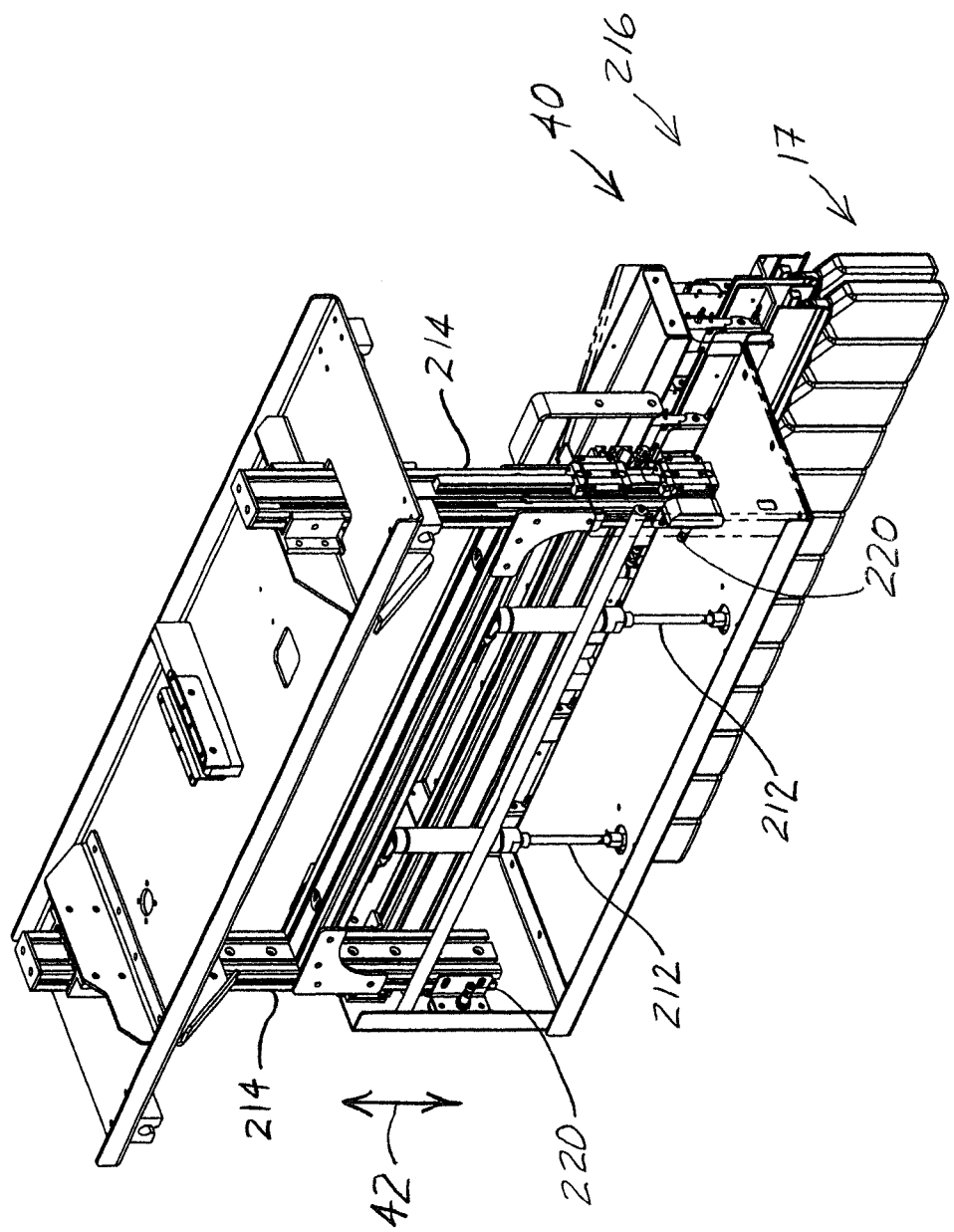
FIG. 38 is an exemplary upper perspective view of an exemplary clamping head in a lowered position.
Figure 39:
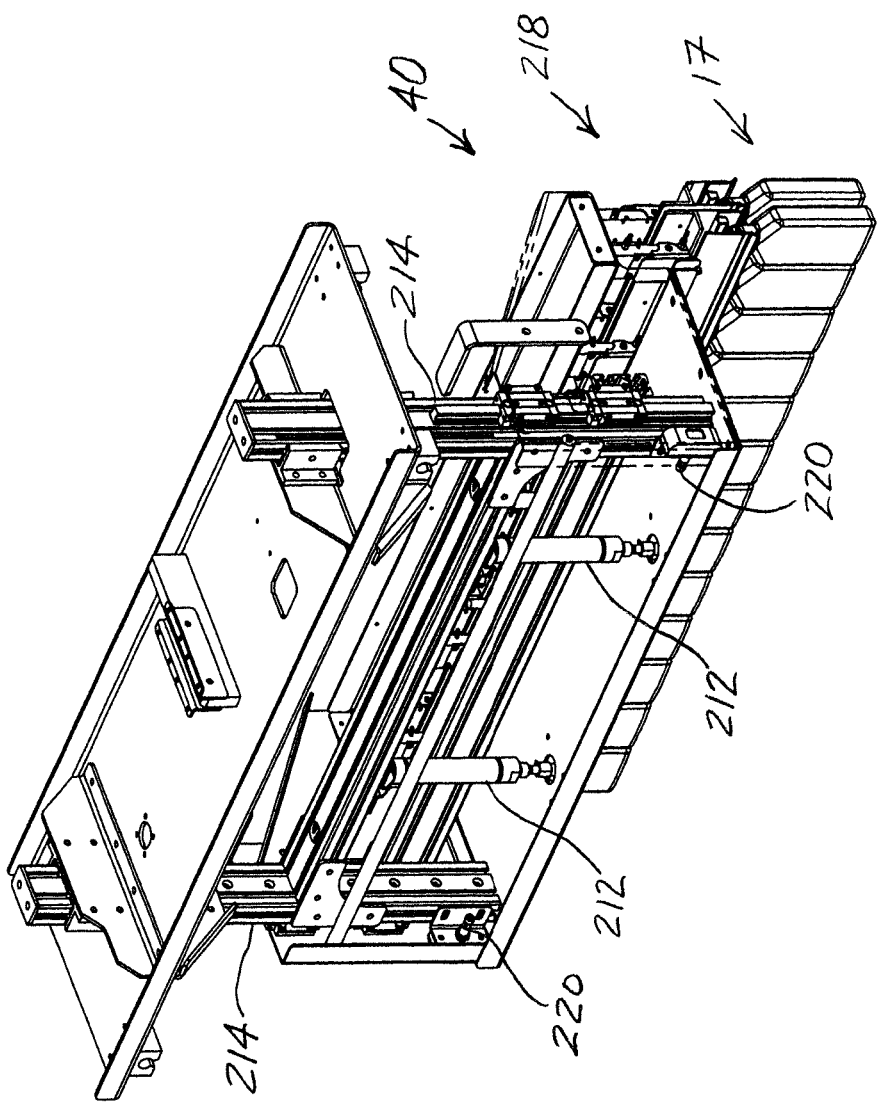
FIG. 39 is an exemplary upper perspective view of an exemplary clamping head in a raised position.

As shown in FIGS. 38-39, actuators 212 urge clamping head 40 into movement in vertical direction 42 along guides 214 between an extended or lowered position 216 (FIG. 38) and a raised position 218 (FIG. 39) as controlled by sensors 220 in a conventional manner.

Figure 6:
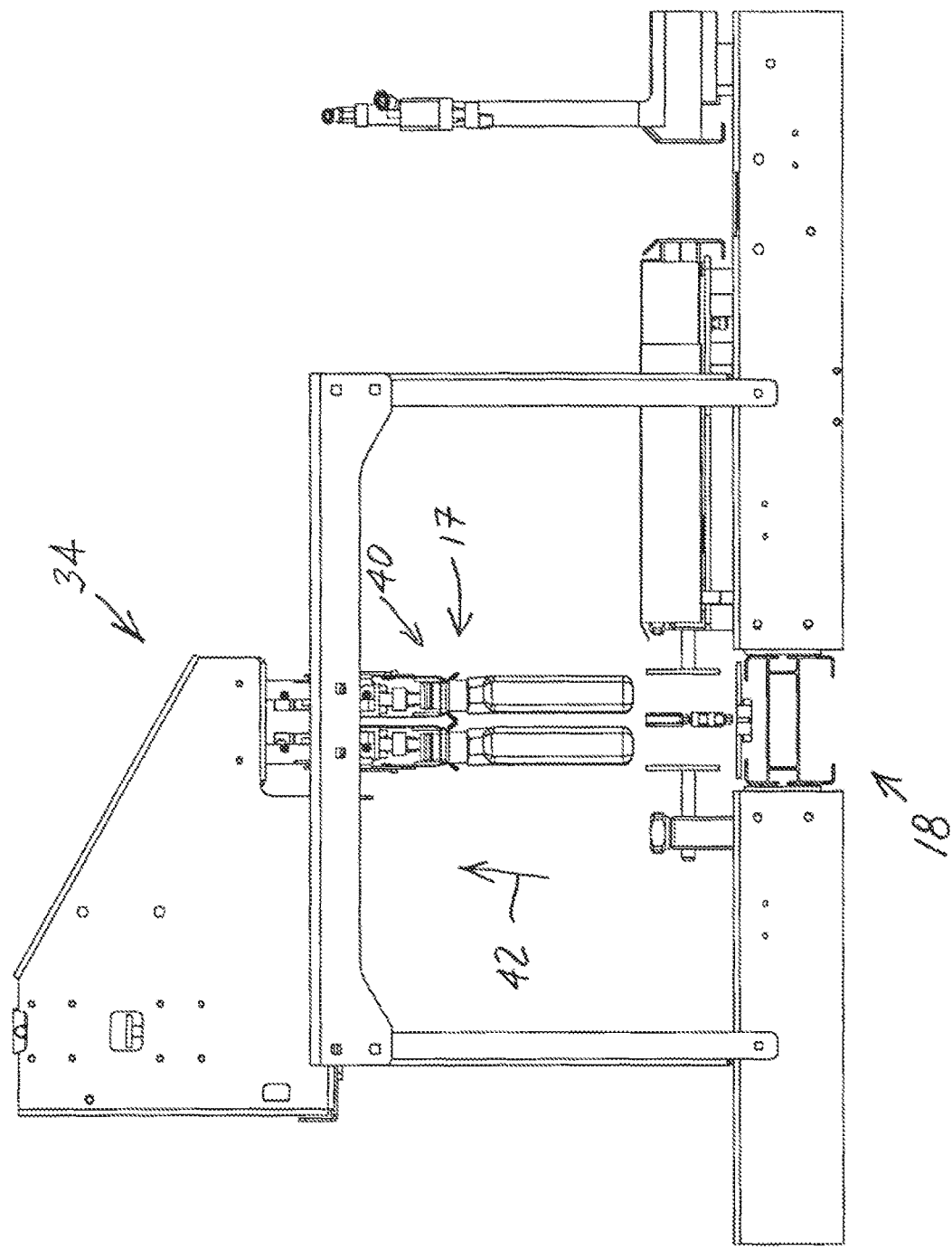

Once clamping head 40 engages article row pair 17 received from article row delivery device 18 in lowered position 216 (FIG. 38), then as shown in FIG. 6, article row handling device 34 raises article row pair 17 in a vertical direction 42 away from article row delivery device 18 toward raised position 218 (FIG. 39).

Figure 7:
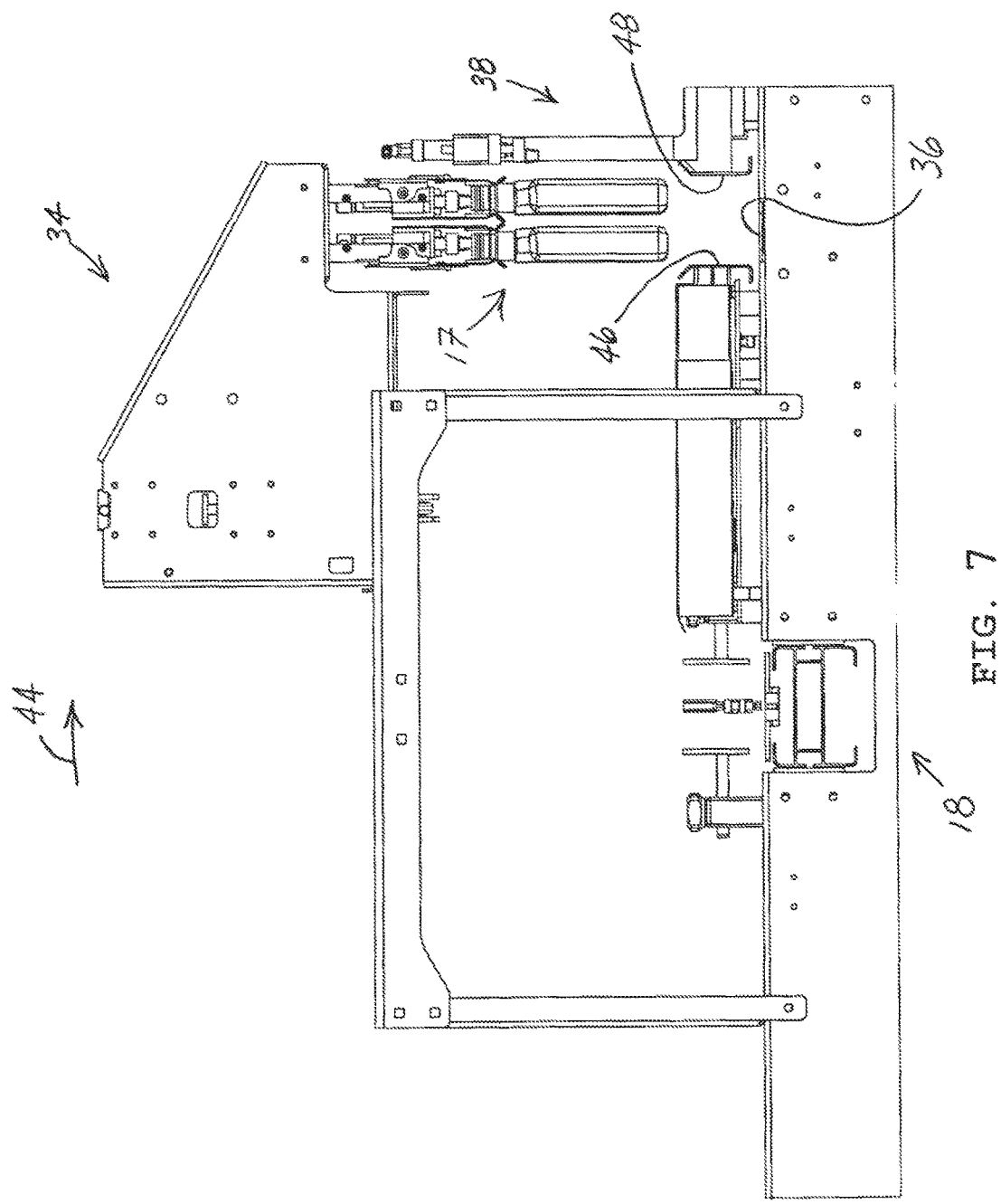

Once article row handling device 34 raises article row pair 17 away from article row delivery device 18, then as shown in FIG. 7, article row handling device 34 moves article row pair 17 in a horizontal direction 44 away from article row delivery device 18 toward extended position 210 (FIG. 37) until article row pair 17 is vertically positioned over a support surface 36 of consolidation area 38 and between a backing plate 46 and a stabilizer 48. Consolidation area 38 includes support surface 36, backing plate 46 and stabilizer 48 and other components as will be discussed in further detail below.

Figure 8:
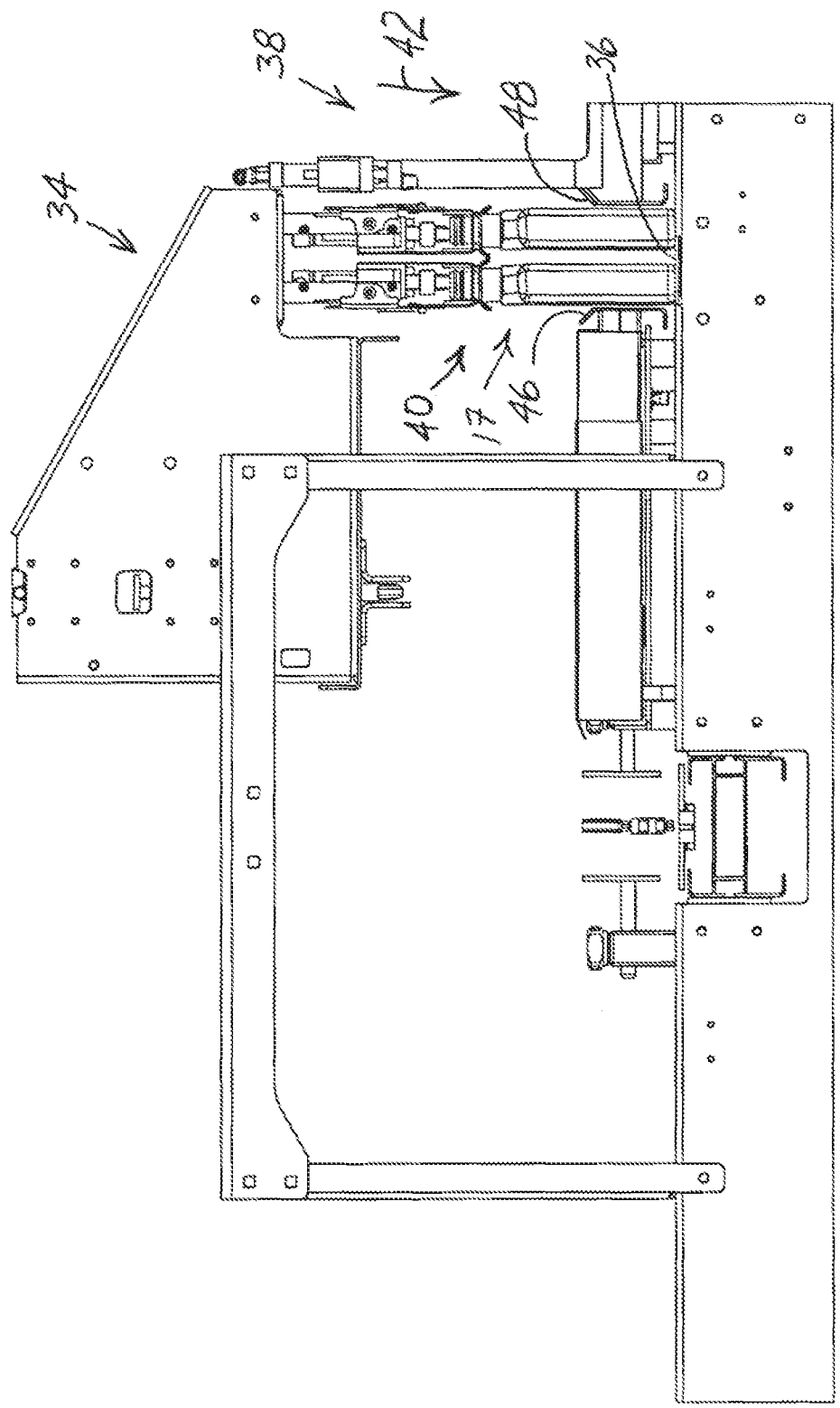

Once article row pair 17 is vertically positioned over support surface 36 of consolidation area 38 and between backing plate 46 and stabilizer 48, then as shown in FIG. 8, clamping head 40 of article row handling device 34 moves article row pair 17 in a vertical direction 42 toward lowered position 216 (FIG. 38) between backing plate 46 and stabilizer 48 until article row pair 17 contacts and is vertically supported by support surface 36 of consolidation area 38.

Figure 9:
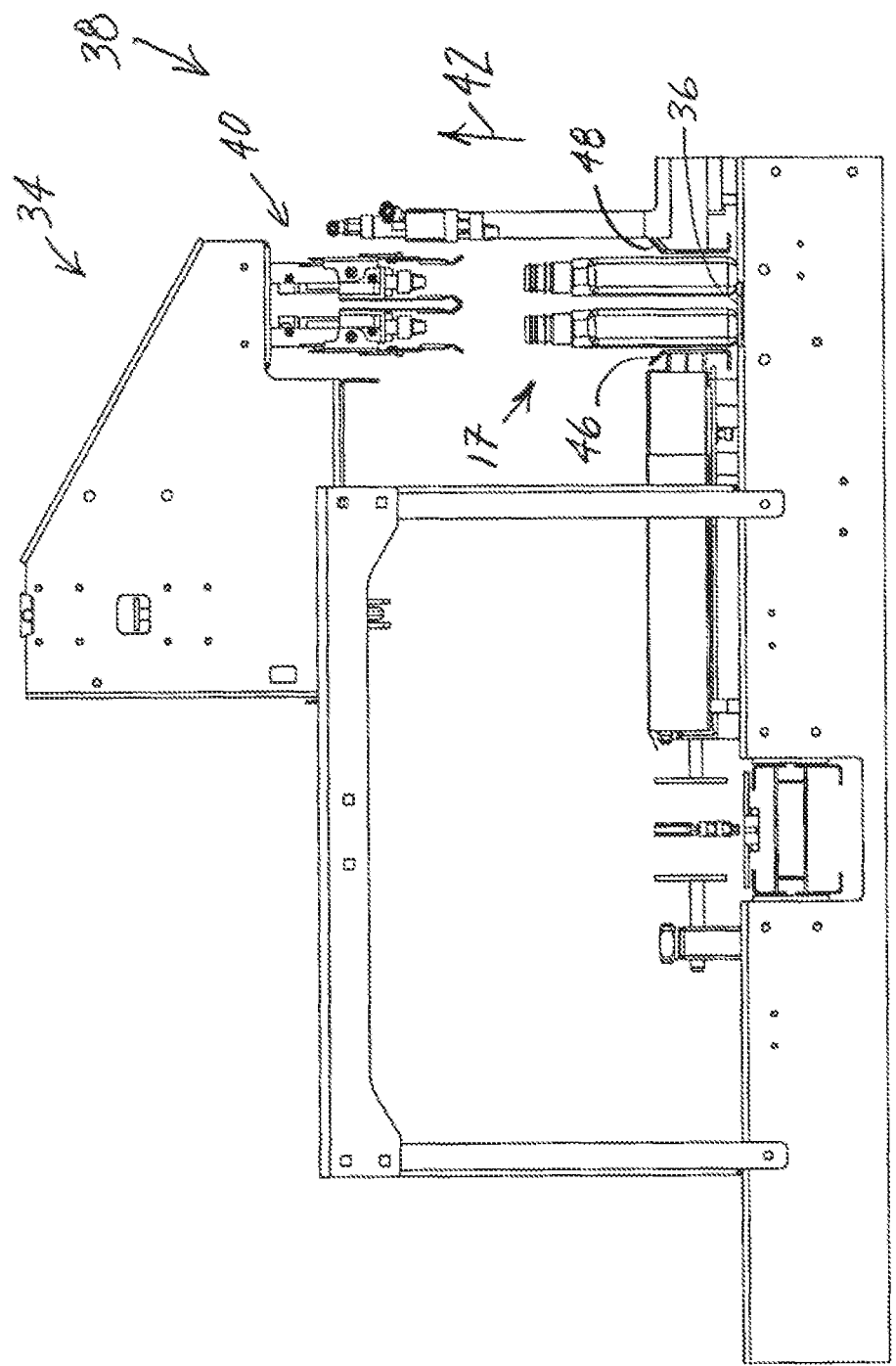

Once article row pair 17 contacts and is vertically supported by support service 36 of consolidation area 38, then as shown in FIG. 9, clamping head 40 of article row handling device 34 is disengaged from article row pair 17 and moves in vertical direction 42 away from the article row pair toward raised position 218 (FIG. 39). As a result, article row pair 17 is vertically supported by support surface 36 and the periphery of article row pair 17 is stabilizingly supported by consolidation area 38, which includes backing plate 46, stabilizer 48, and opposed support members 50 (FIG. 4).

For purposes herein, "stabilizingly supported" and variations thereof refer to support provided to at least the periphery of the article row(s) such as to prevent tipping of the articles. For example, such stabilizing support may include, but is not limited to lateral support, including support forces directed substantially perpendicular to the support surface of the consolidation area, and vertical compressive support forces applied to opposed ends of the article row(s), such as applied by clamping head 40 to corresponding ends of article row pair 17 opposite support surface 36, such as shown in FIG. 8.

Figure 10:
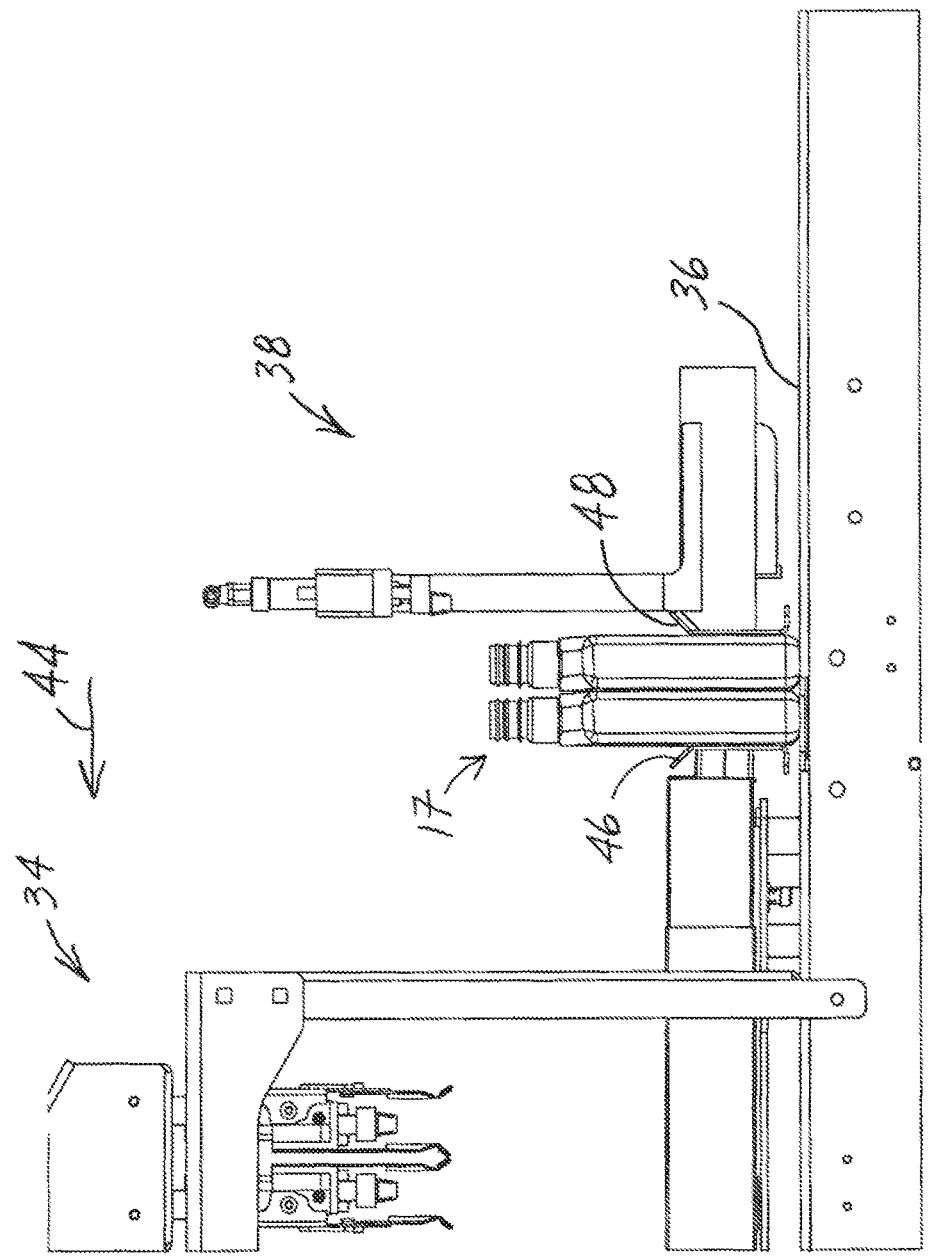

Once clamping head 40 of article row handling device 34 is disengaged from article row pair 17, and vertically moved away from article row pair 17, then as shown in FIG. 10, article row handling device 34 moves in horizontal direction 44 away from article row pair 17 toward home position 208 (FIG. 36) in preparation of engaging another article row pair 17 received from article row delivery device 18 (FIG. 5) as previously discussed.

Figure 11:
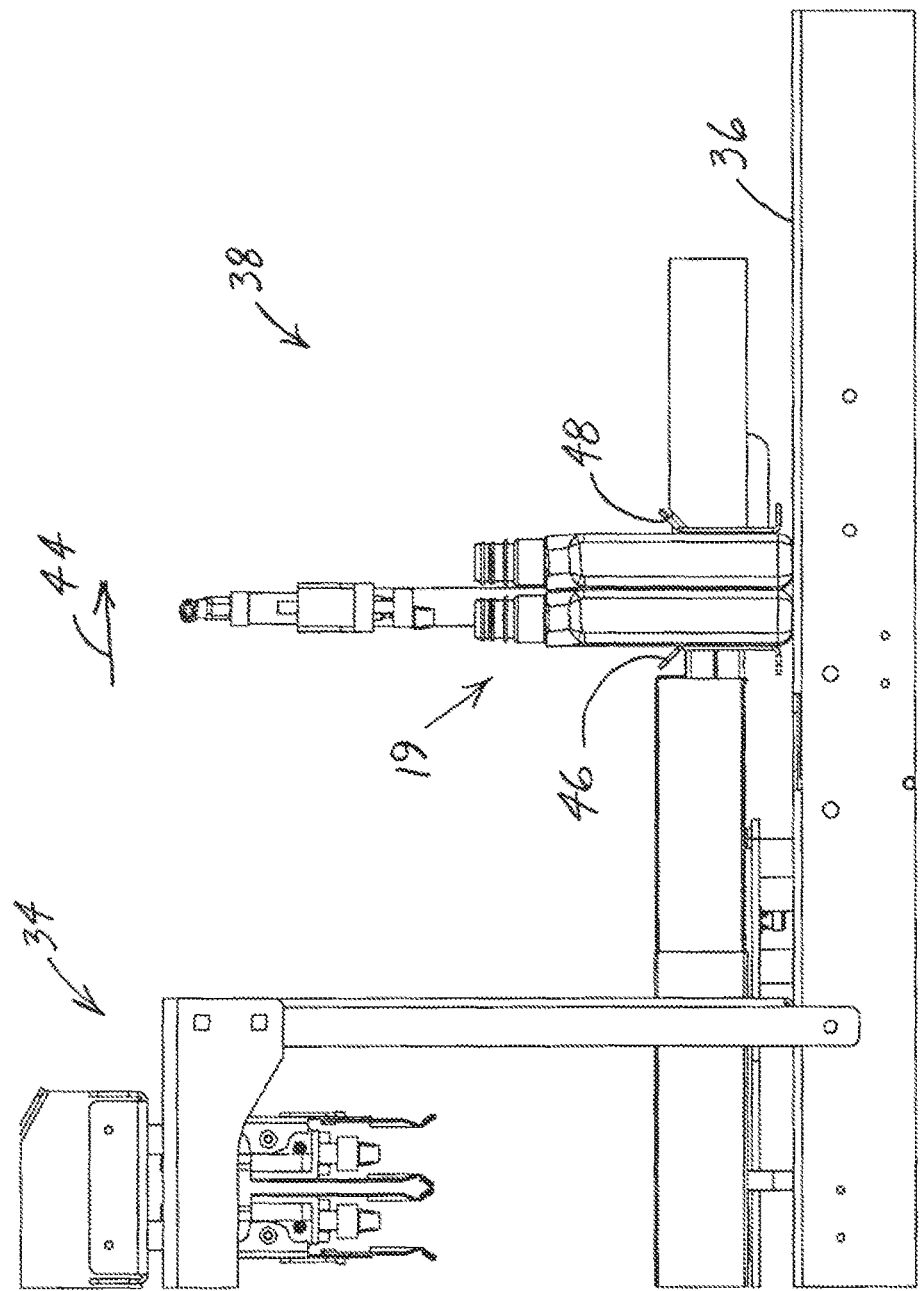

Once article row handling device 34 moves away from article row pair 17, then as shown in FIG. 11, backing plate 46 and stabilizer 48 move and stabilizingly support opposed portions of the periphery of article row pair 17 (FIG. 10) in a horizontal direction 44 away from article row handling device 34, becoming already positioned article rows 19, with support members 50 (FIG. 4) of consolidation area 38 providing stabilizing support of the remaining portions of the periphery of already positioned article rows 19. In other words, article row pair 17 and already positioned article rows 19 are each continuously stabilizingly supported by the backing plate 46, stabilizer 48 and consolidation area 38, such as shown in FIG. 40.

Figure 40:
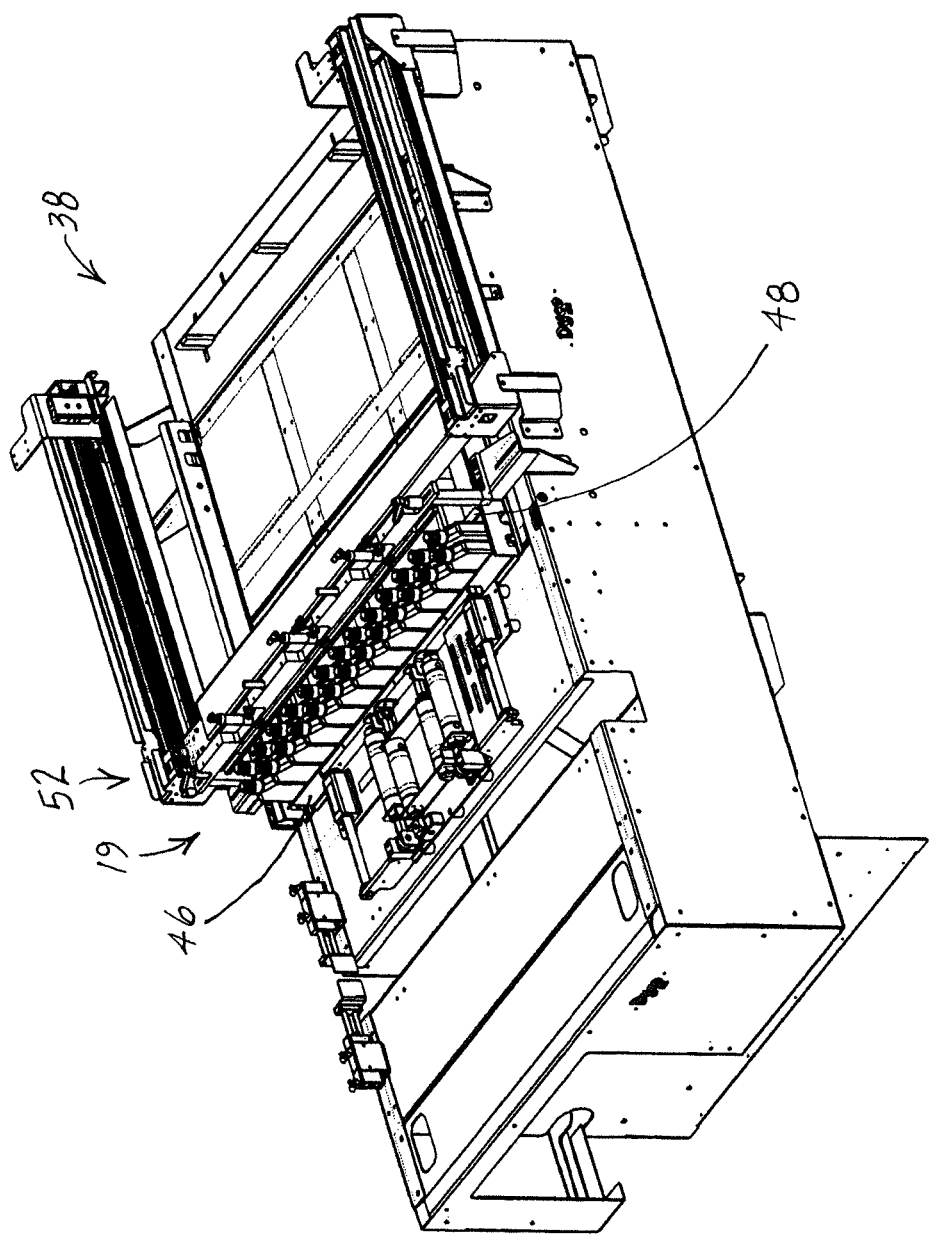
FIG. 40 is an upper perspective view of an exemplary stabilizer in a consolidation area.
Figure 41:
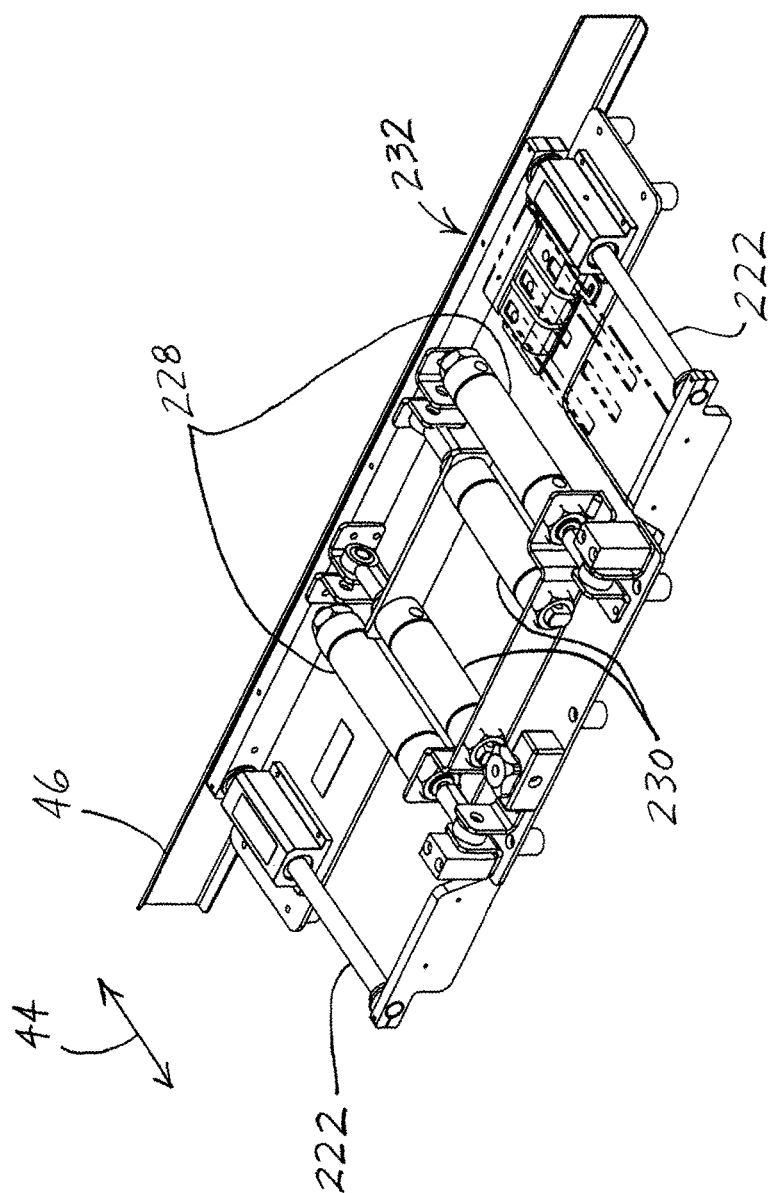
FIG. 41 is an enlarged, isolated upper perspective view of an exemplary backing plate of FIG. 40.

As shown in FIG. 41, which is an enlarged, isolated upper perspective view of backing plate 46 of FIG. 40, backing plate 46 is urged into movement in horizontal direction 44 along guides 222 by opposed actuators 228, 230 as controlled by sensors 232 in a conventional manner.

Figure 42:
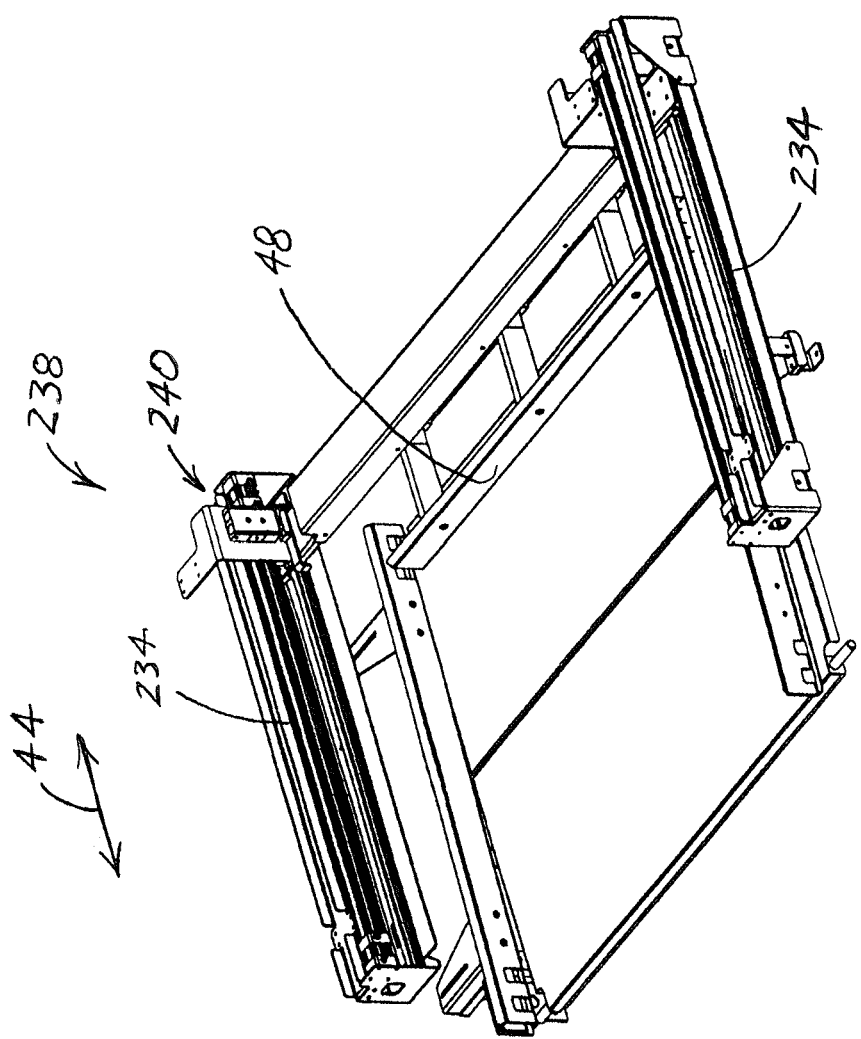
FIG. 42 is an enlarged, isolated upper perspective view of the stabilizer of FIG. 40 in an extended position.
Figure 43:
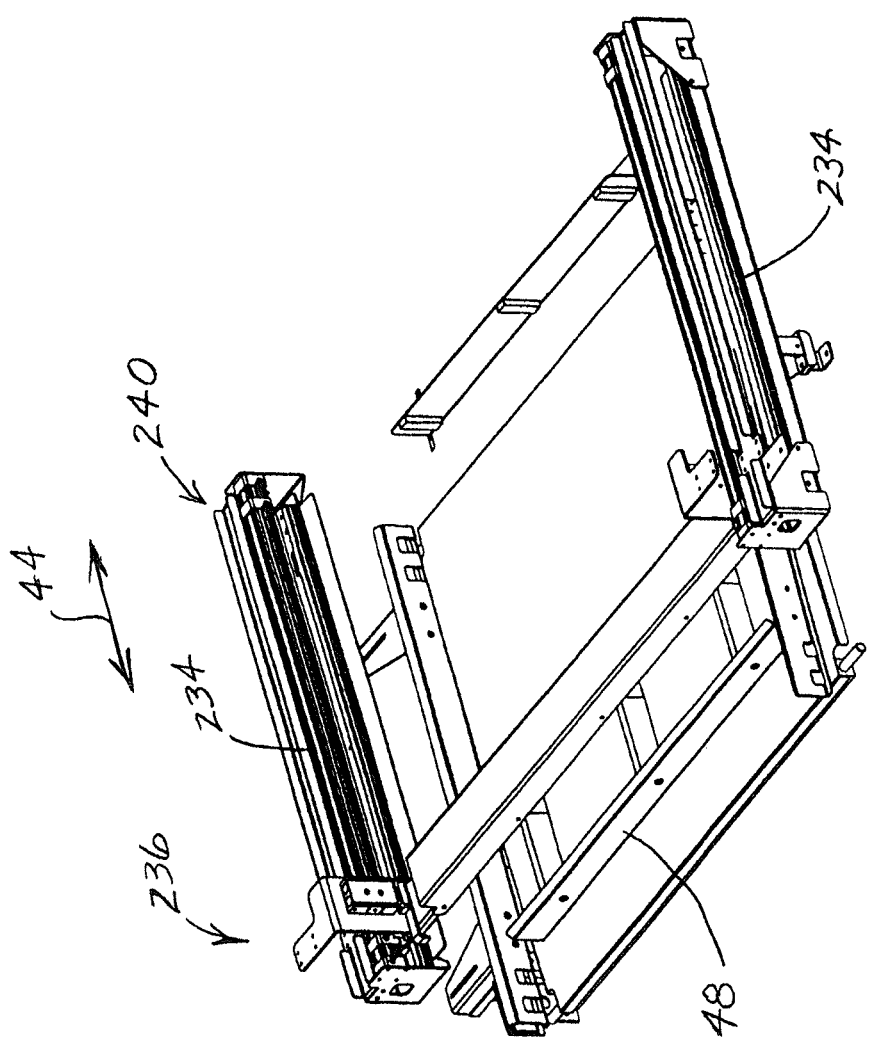
FIG. 43 is an enlarged, isolated upper perspective view of the stabilizer of FIG. 40 in a home position.

As shown in FIGS. 42-43, which are enlarged, isolated upper perspective views of stabilizer 48 of FIG. 40, stabilizer 48 slidably moves in horizontal direction 44 along guides 234 between a home position 236 (FIG. 43) and an extended position 238 (FIG. 42). Once an article array 22 (FIG. 18) is formed and subsequently removed by article array moving device 28 (FIG. 18), a linear actuator 240 (FIG. 42) selectively contacts and urges stabilizer 48 into movement in horizontal direction 44 from extended position 238 toward home position 236 in preparation of receiving article rows for forming another article array. Otherwise, stabilizer 48 "floats," or is urged into movement in horizontal direction 44 as a result of backing plate 46, which is moving in horizontal direction 44, applying a horizontal force to already positioned article 19, which already positioned article 19 then applying a horizontal force to stabilizer 48. However, between horizontal movements and applications of horizontal forces by backing plate 46 and already positioned article 19, stabilizer 48 maintains a fixed horizontal position due to inertia and friction between stabilizer 48 and guides 234, and continues to stabilizingly support at least a portion of the periphery of already positioned article 19.

Figure 12A:
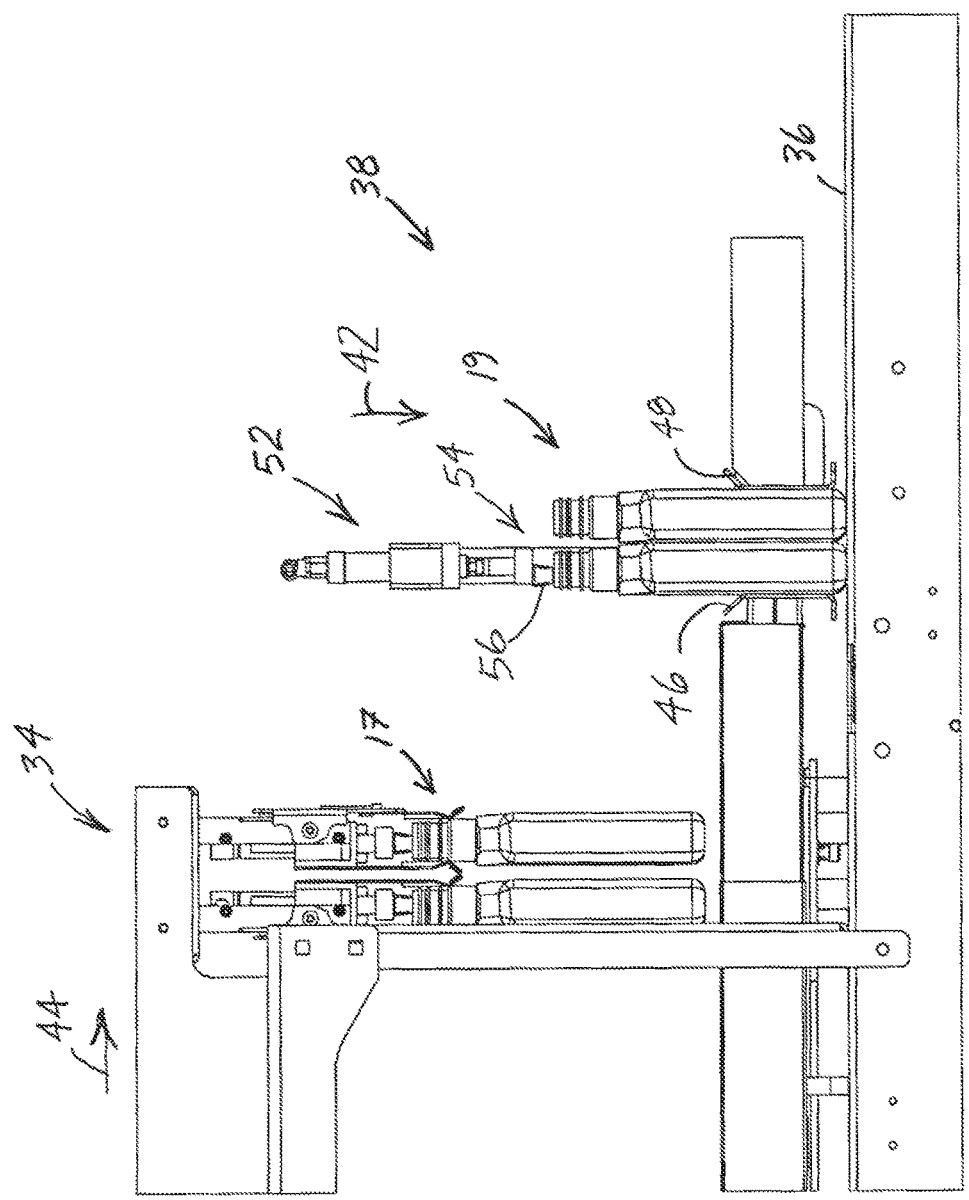

Once article row pair 17 has been moved and continuously stabilizingly supported to become continuously stabilizingly supported already positioned article rows 19, then as shown in FIG. 12A, stabilizer 52 moves a stabilizer bar 56 in vertical direction 42 until stabilizer bar 56 achieves a stabilizing position 54, applying a vertical compressive stabilizing force to at least a portion of the periphery of the already positioned article rows 19. Stabilizer 52 provides an additional, independent stabilizing support to at least the portion of the periphery of the already positioned article rows 19 simultaneously stabilizingly supported by backing plate 46. Article row handling device 34 moves another article row pair 17 in horizontal direction 44 toward already positioned article rows 19.

Figure 44:
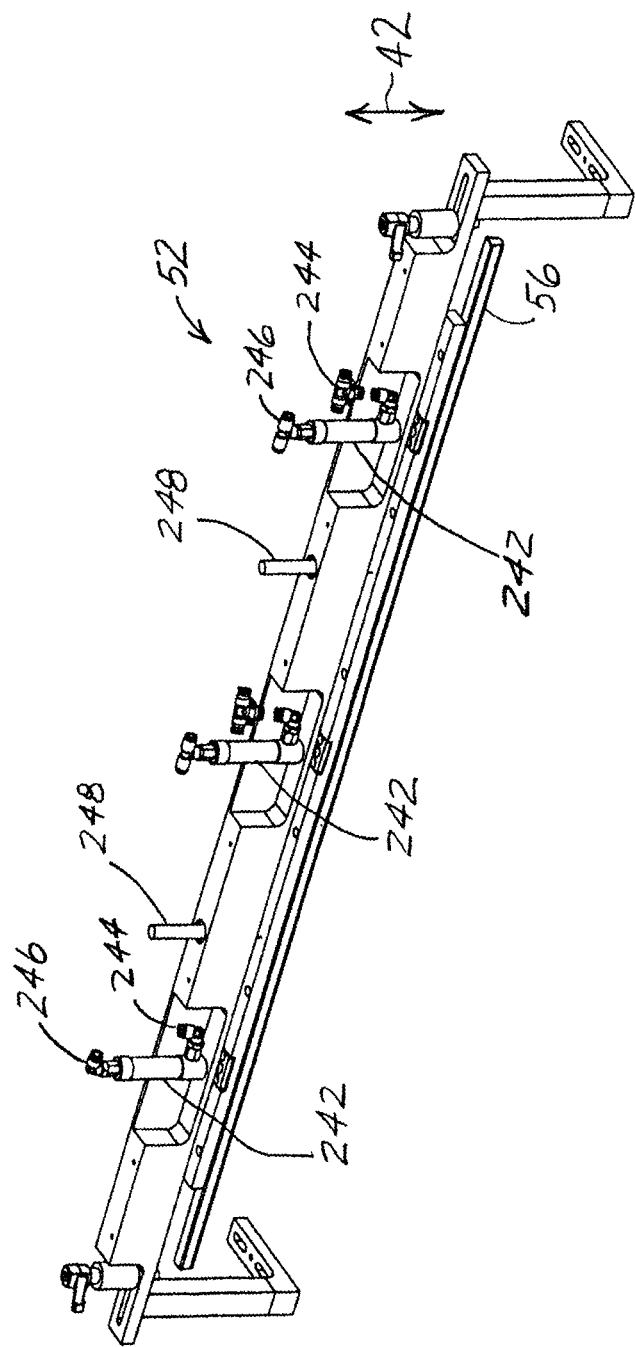
FIG. 44 is an enlarged, isolated upper perspective view of the stabilizer of FIG. 40.

FIG. 44 shows an enlarged, isolated upper perspective view of stabilizer 52 of FIG. 40. Stabilizer bar 56 is urged in vertical directions 42 along guides 248 by actuators 242. In response to an application of pressurized gas to fittings 244, actuators 242 urge stabilizer bar 56 to be raised, while in response of an application of pressurized gas to fittings 246, actuators 242 urge stabilizer bar 56 to be lowered.

Figure 12B:
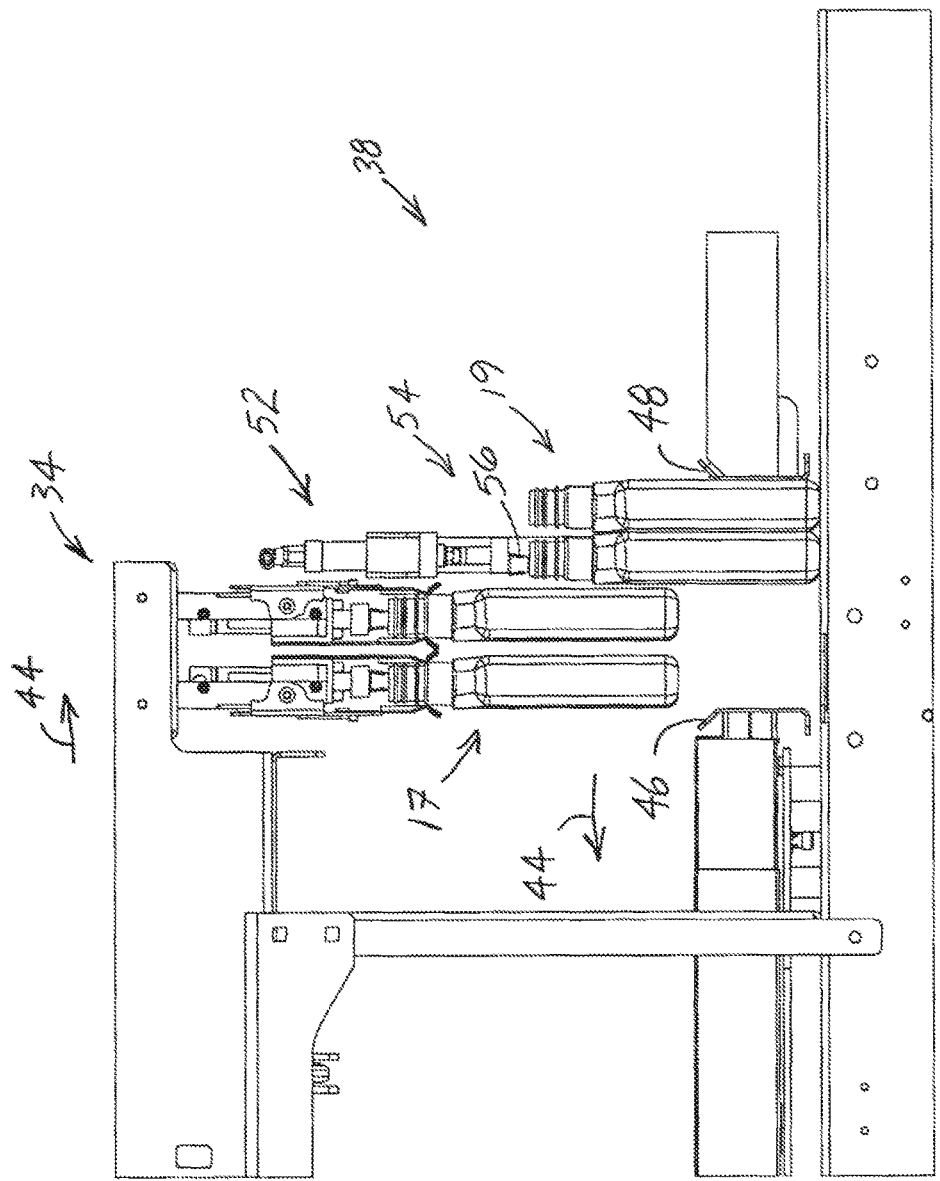

Once stabilizer bar 56 achieves stabilizing position 54, then as shown in FIG. 12B, backing plate 46 moves in horizontal direction 44 away from the already positioned article rows 19, and article row handling device 34 moves article row pair 17 in horizontal direction 44 until article row pair 17 is immediately adjacent to already positioned article rows 19 and vertically positioned between backing plate 46 and the already positioned article rows 19.

Figure 13:
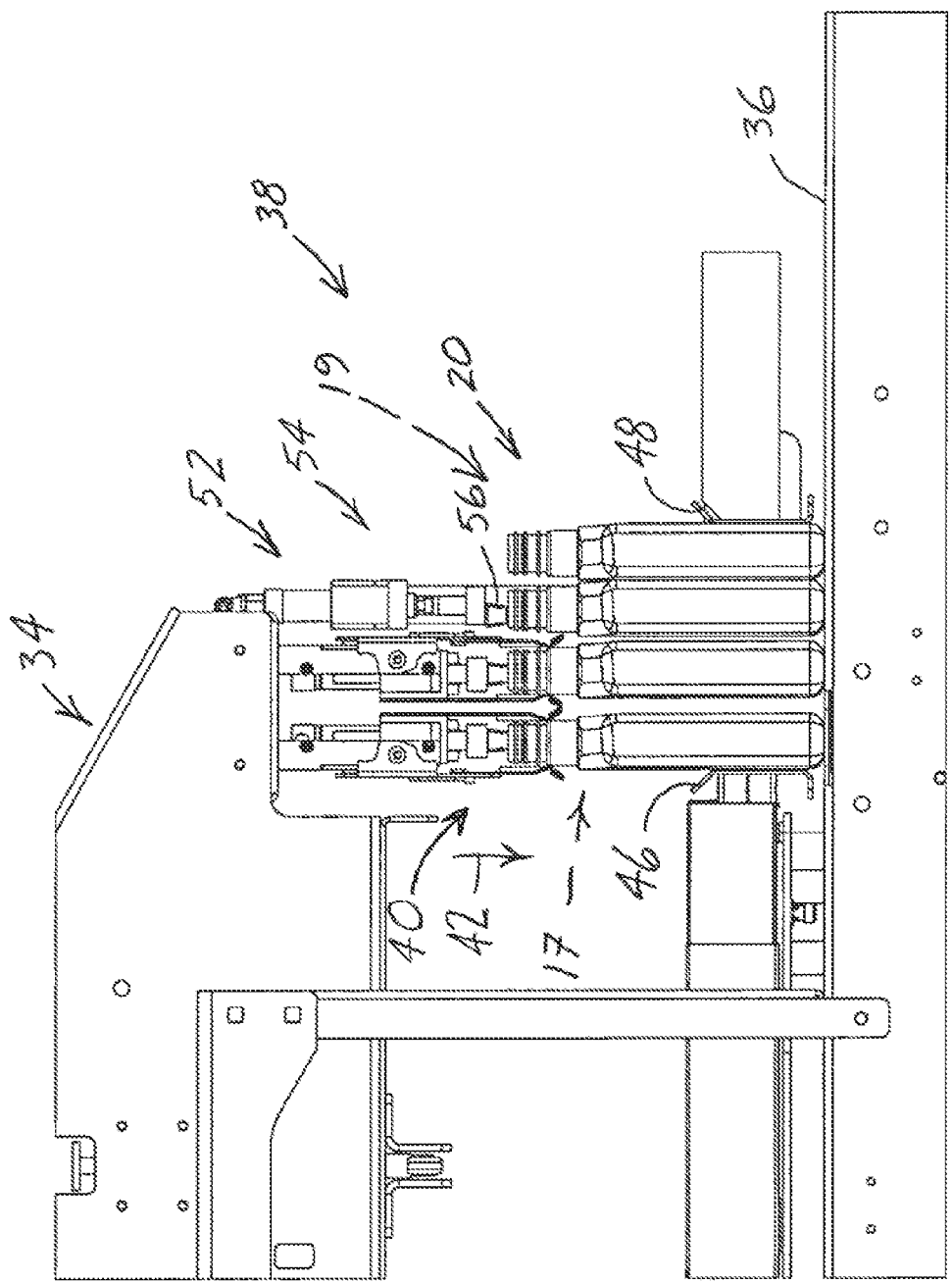

Once article row pair 17 is immediately adjacent to already positioned article rows 19, then as shown in FIG. 13, clamping head 40 of article row handling device 34 moves in vertical direction 42 between backing plate 46 and already positioned article rows 19 until article row pair 17 contacts and is vertically supported by support surface 36 of consolidation area 38. As a result of this arrangement, article row pair 17 being immediately adjacent to already positioned article rows 19, article row pair 17 stabilizingly supports already positioned article rows 19, becoming a partial article array 20. In one embodiment, article row pair 17 contacts and compressively secures already positioned article rows 19 while becoming partial article array 20. Opposed portions of the periphery of partial article array 20 are stabilizingly supported by backing plate 46 and stabilizer 48, as well as support members 50 (FIG. 4) stabilizingly supporting the remaining portions of the periphery of partial article array 20. As a result, partial article array 20 is continuously stabilizingly supported by backing plate 46, stabilizer 48 and consolidation area 38.

Figure 14:
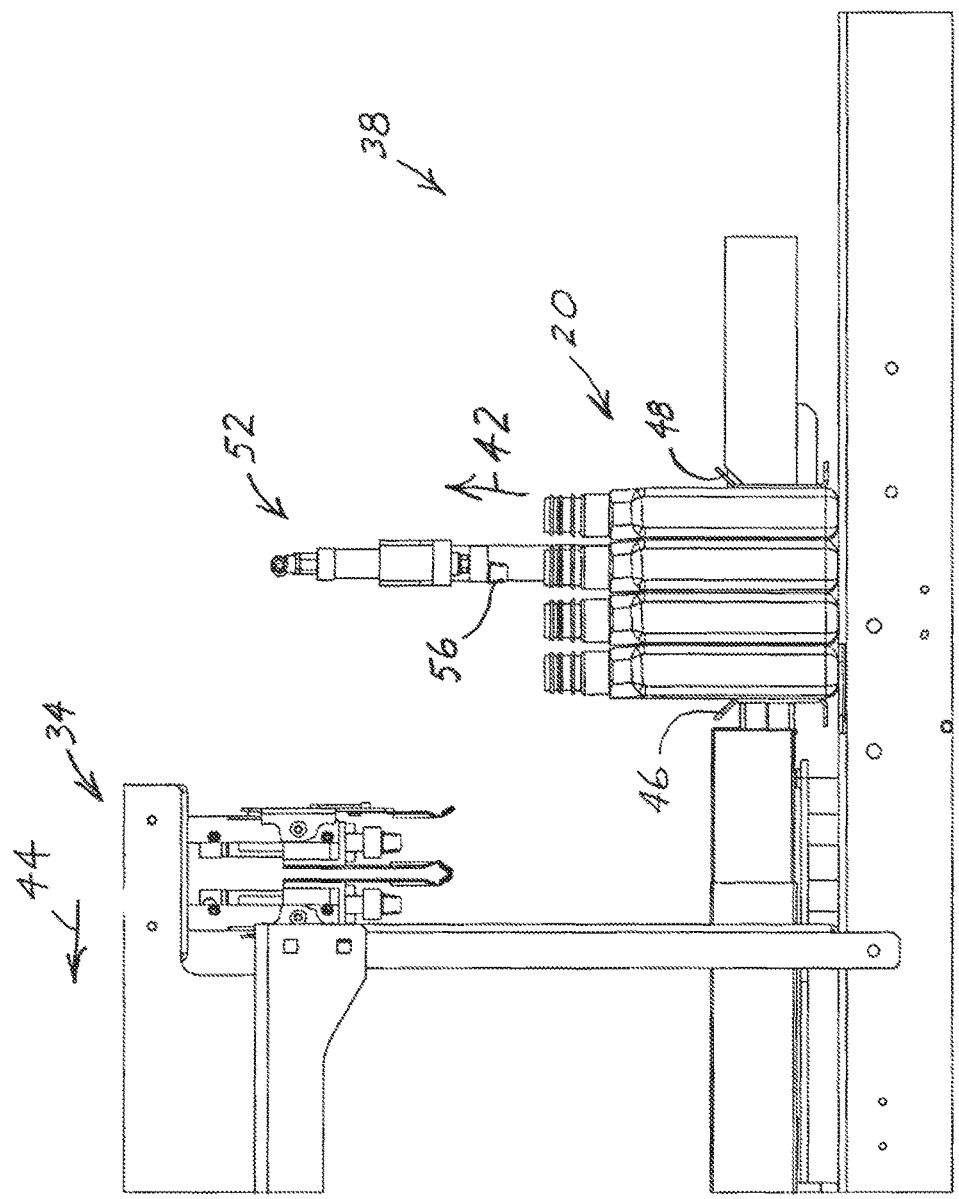

Once partial article array 20 has been formed, then as shown in FIG. 14, stabilizer bar 56 is moved in vertical direction 42 away from and disengaging partial article array 20. In one embodiment, stabilizer 52 is moved in one or more of vertical and horizontal directions such that the stabilizer is moved out of the path of an article array prior to the article array reaching a collection area, as will be discussed in further detail below. Despite disengagement from stabilizer bar 56, partial article array 20 is continuously stabilizingly supported by backing plate 46, stabilizer 48 and consolidation area 38.

Figure 15:
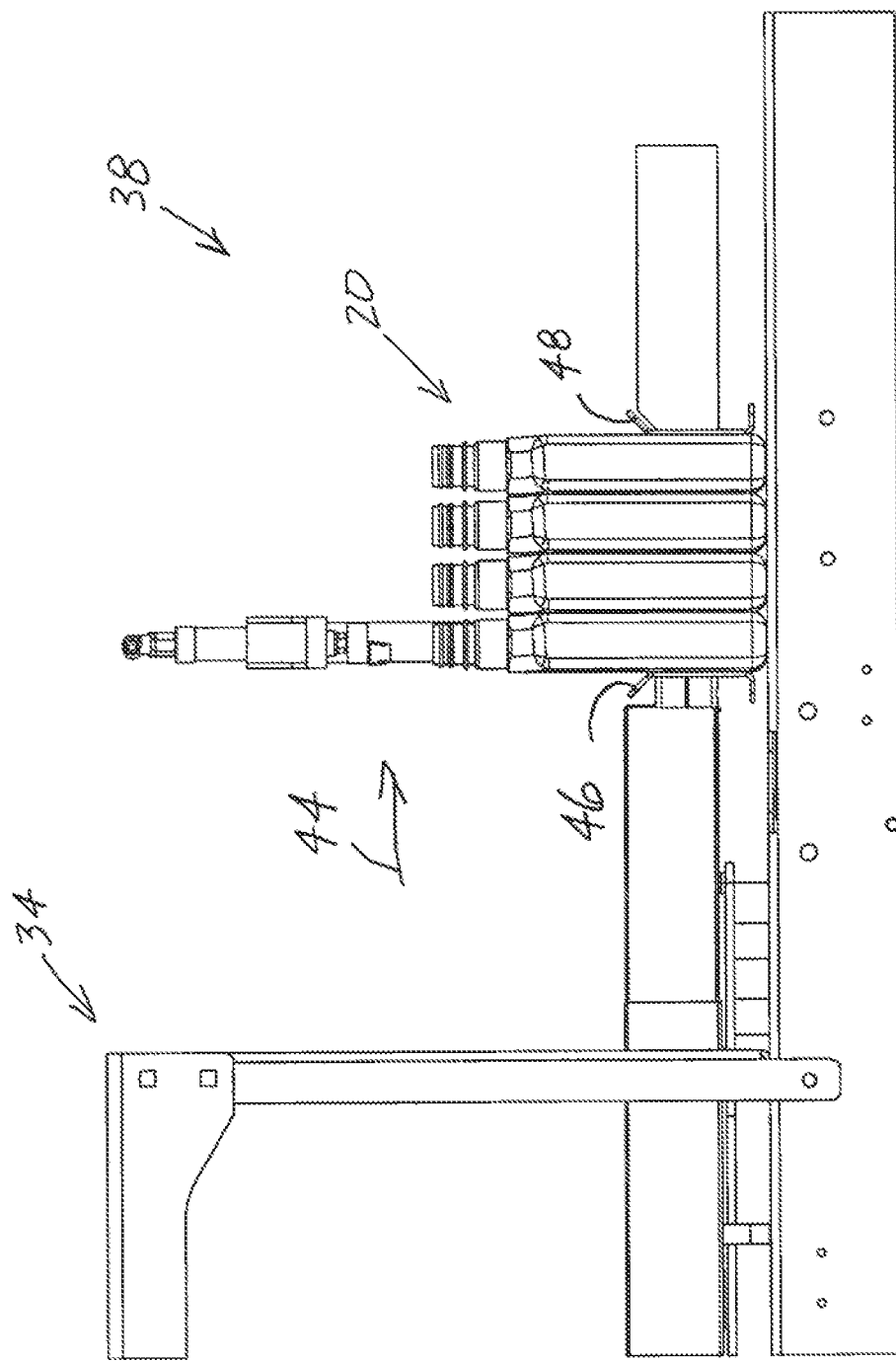

Once stabilizer bar 56 has been disengaged from partial article array 20, then as shown in FIG. 15, backing plate 46 and stabilizer 48 move and stabilizingly support opposed portions of the periphery of partial article array 20 in a horizontal direction 44 away from article row handling device 34 in preparation of adding additional article row pair(s) 17, such as previously discussed and shown in FIGS. 11-14. The periphery of partial article array 20 is continuously stabilizingly supported by the backing plate 46, stabilizer 48 and consolidation area 38, as previously discussed.

Figure 16:
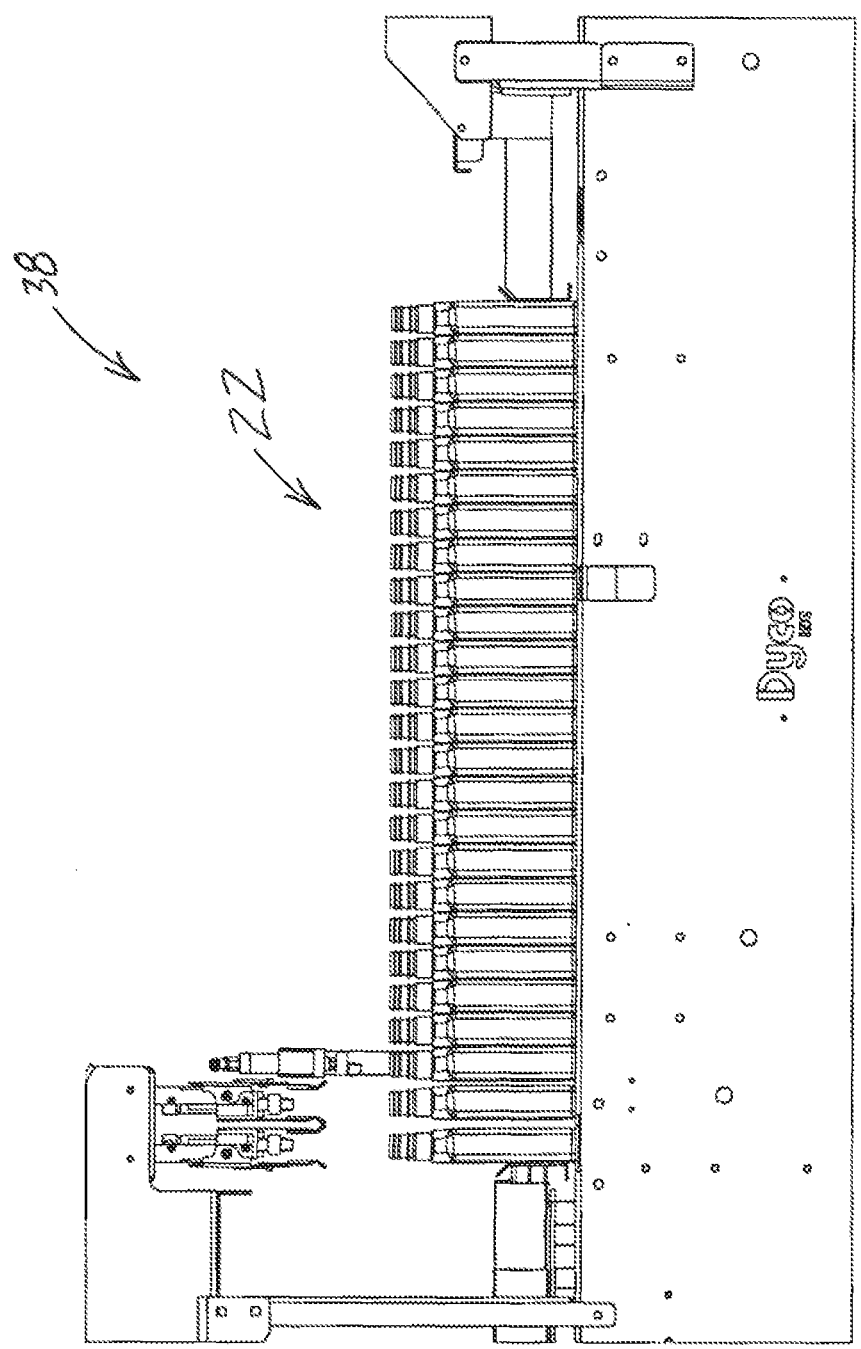

FIG. 16 shows a fully formed or completely built-up or loaded article array 22 that is continuously stabilizingly supported by consolidation area 38, having been continuously stabilizingly supported during the build-up or loading of article array 22.

Figure 17:
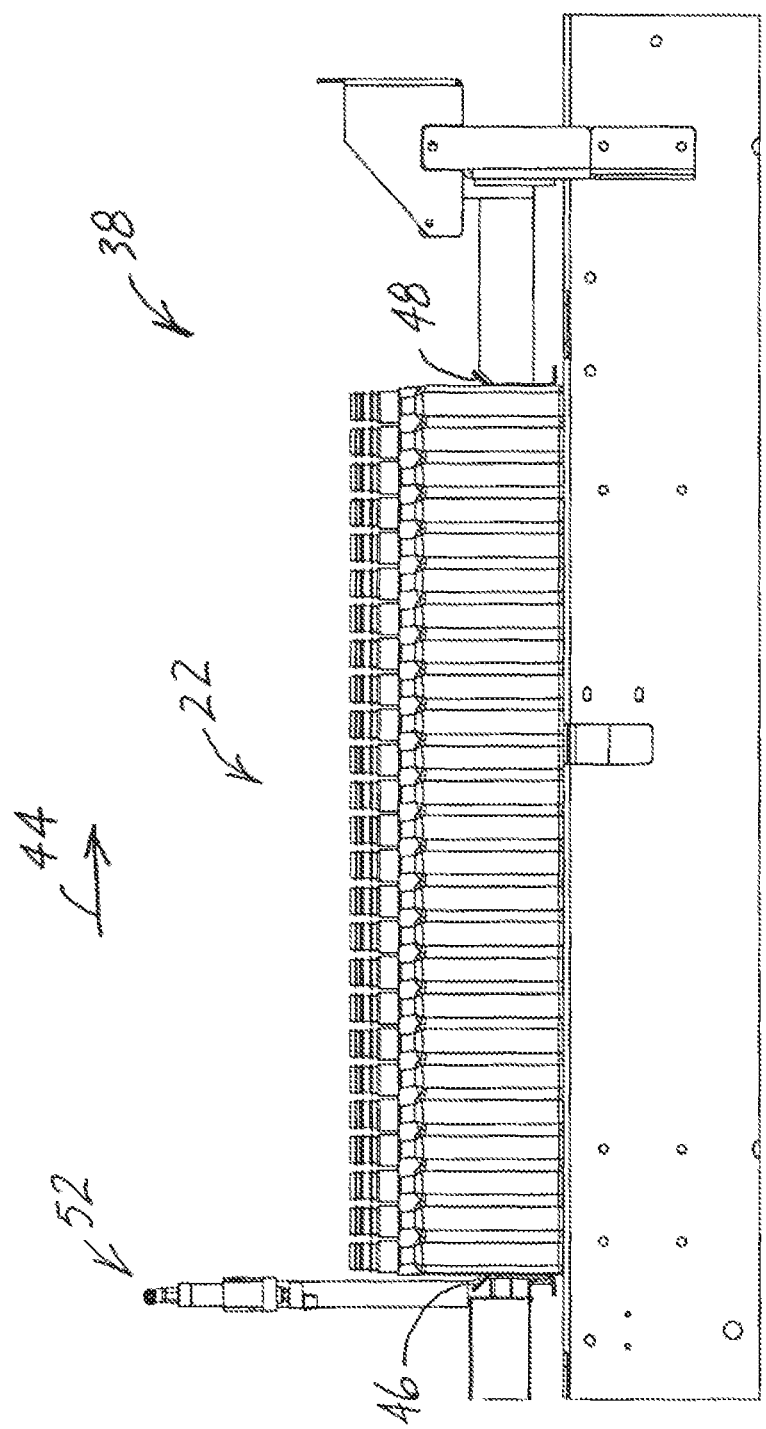
Figure 18:
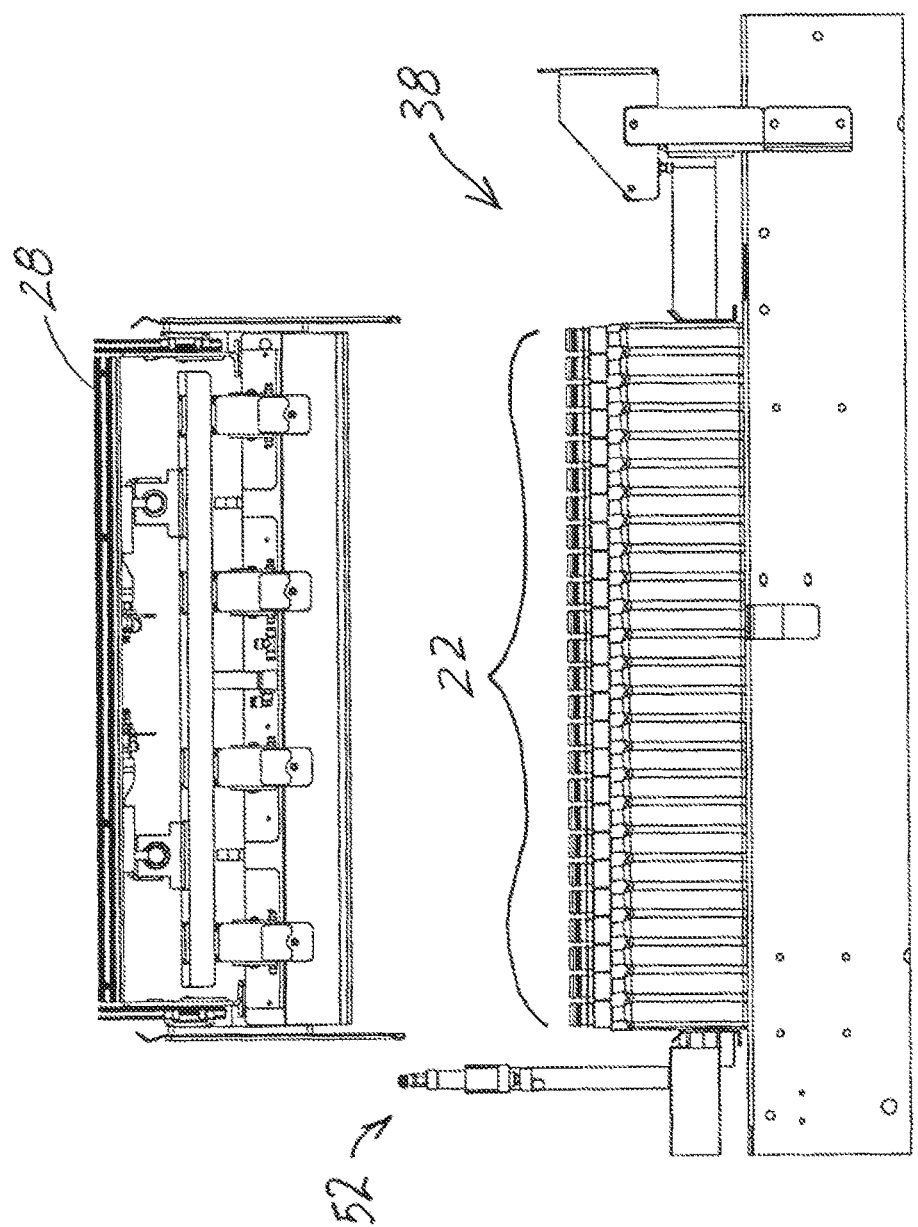
Figure 20A:
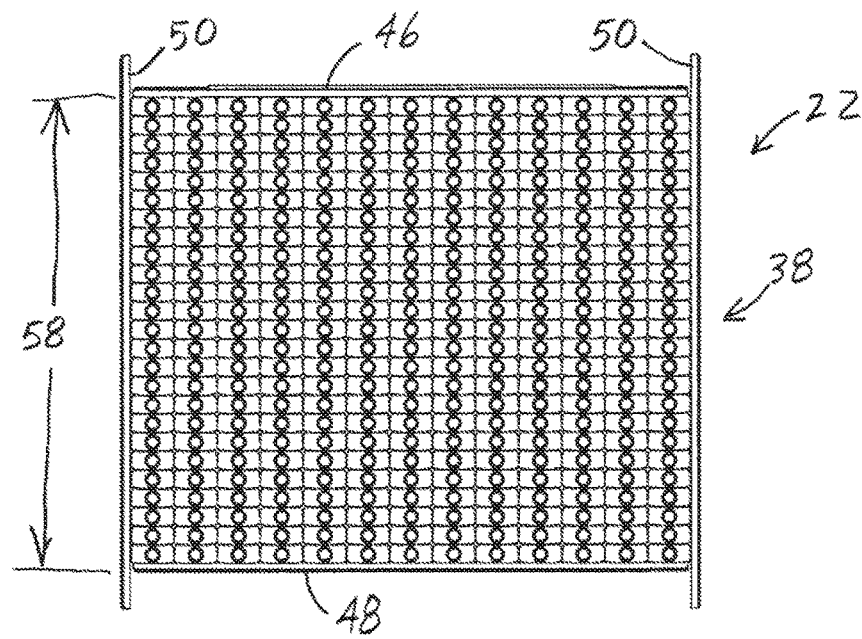
Figure 20B:
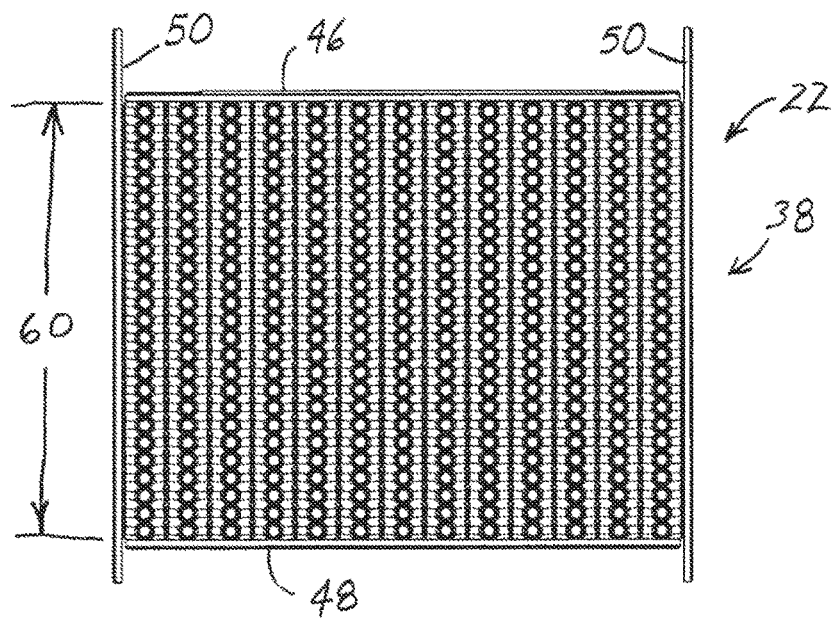

Once article array 22 has been formed, then as shown in FIG. 17, backing plate 46 and stabilizer 48 move and stabilizingly support opposed portions of the periphery of article array 22 in horizontal direction 44 away from stabilizer 52 in preparation of moving article array 22 to collection area 26 (e.g., FIG. 1). FIG. 20A is a plan view of the periphery of article array 22 continuously stabilizingly supported by the backing plate 46, stabilizer 48 and consolidation area 38, as previously discussed, having a distance 58 between backing plate 46 and stabilizer 48. FIG. 20B is a plan view of the periphery of article array 22 that is similar to FIG. 20A, except that backing plate 46 and stabilizer 48 are moved toward each other such that the distance therebetween is reduced, such as to a distance 60, thereby reducing the vertical cross section of article array 22. It may be desirable to reduce the vertical cross section of article array 22 when the article array moving device 28 utilized is an article array head, as shown in FIG. 18 for reasons such as facilitating moving the article array to a collection area 26, such as inside of a container having an opening of a fixed size. Upon being moved inside the container, the article array cross section would elastically increase to the extent possible inside of the container, providing increased stability of the article array inside of the container.

Once article array 22 has been moved, then as shown in FIG. 18, article array moving device 28, such as an article array head is vertically aligned with article array 22.

Figure 21:
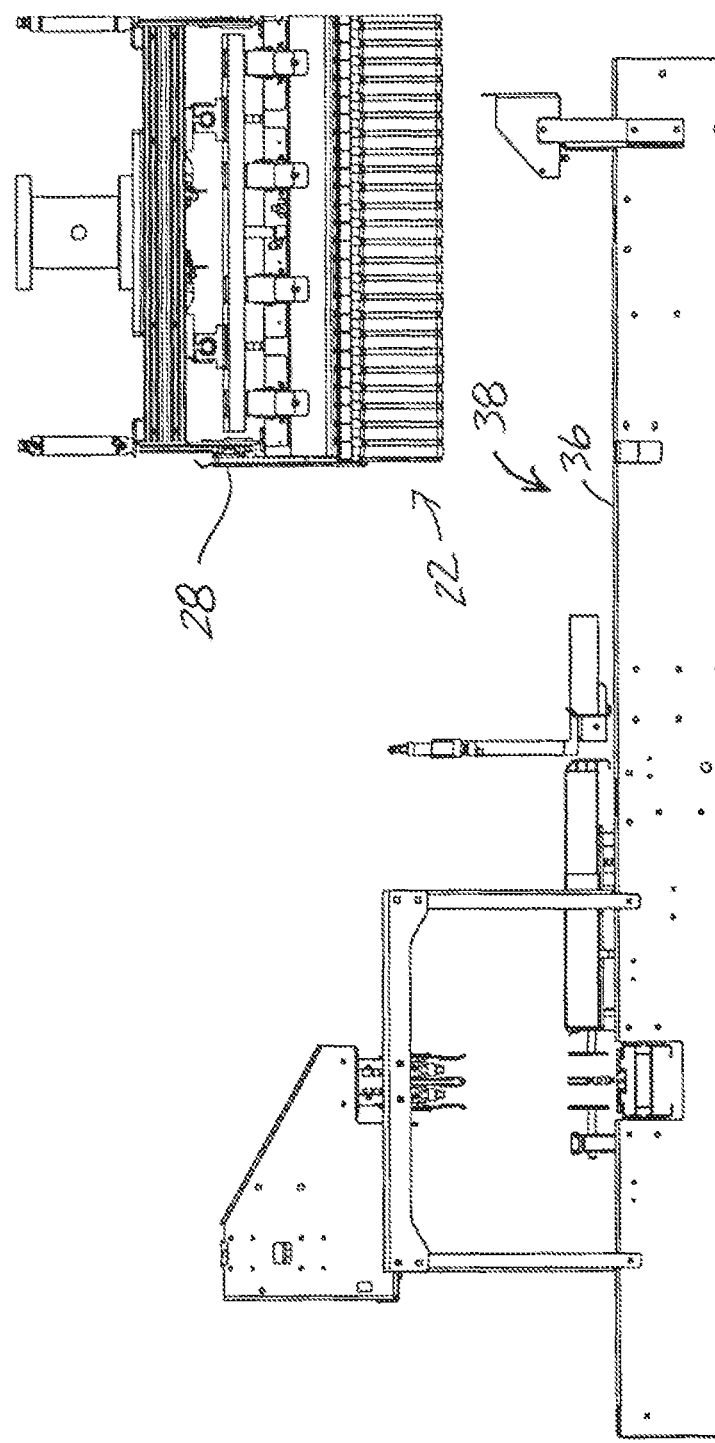

Once article array moving device is vertically aligned with article array 22, then as shown in FIG. 19, article array moving device 28 is moved in vertical direction 42 until engaging article array 22. FIG. 21 shows article array moving device 28 lifting and moving article array 22 from support surface 36 of consolidation area 38 toward a collection area 26 (FIG. 1). Once article array 22 has been moved toward collection area 26 by article array moving device 28, linear actuator 240 (FIG. 42) selectively contacts and urges stabilizer 48 into movement in horizontal direction 44 from extended position 238 toward home position 236 in preparation of receiving article rows for forming another article array.

In one embodiment, stabilizer 52 may be moved in one or more of vertical and horizontal directions such that stabilizer 52 is moved out of the path of article array 22 prior to the article array 22 reaching a collection area. For example, such as shown in FIG. 15, if stabilizer 52 were moved such that article array 22 is vertically accessible by article array moving device 28 (FIG. 18), it may be possible to eliminate further movement of the article array, as shown in FIG. 18, i.e., the backing plate 46 and stabilizer 48 moving and stabilizingly supporting opposed portions of the periphery of article array 22 in horizontal direction 44 away from stabilizer 52 in preparation of moving article array 22 to collection area 26 (e.g., FIG. 1).

FIGS. 22-28 sequentially show the operation of article array forming/moving system 112, such as shown in FIG. 2.

Figure 22:
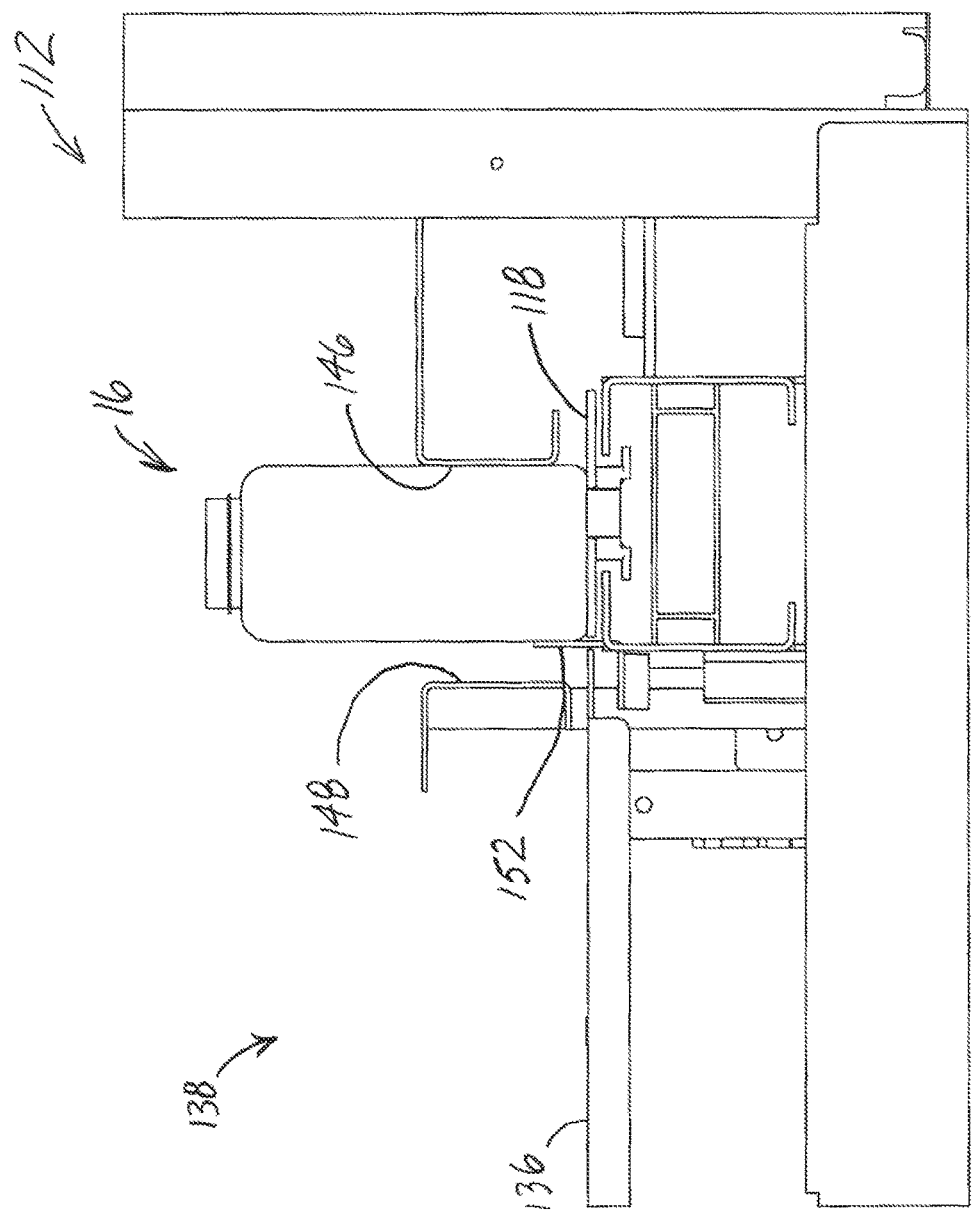
FIGS. 22-33 are sequential operational movements of the forming/moving system of the article array forming/moving system of FIG. 2.

It is to be understood that the exemplary sequential operation movements shown in FIGS. 22-28 may at least partially occur simultaneously or in an order different than that discussed. As shown in FIG. 22, article row 16 is received from article row delivery device 118, such as a conveyor. In one embodiment, article row delivery device 118 may provide more than one article row 16.

Figure 45:
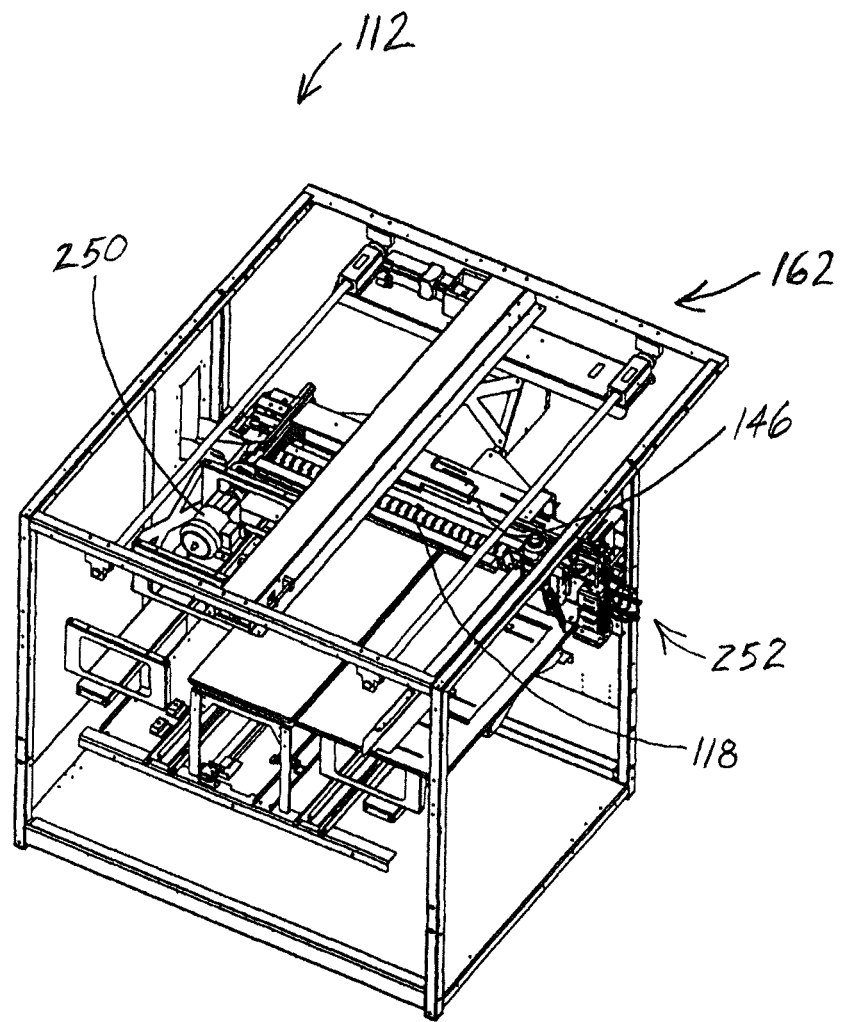
FIG. 45 is a partial cutaway view of the article array forming/moving system of FIG. 2, the article array forming/moving system being rotated 90 degrees counterclockwise about a vertical axis.
Figure 46:
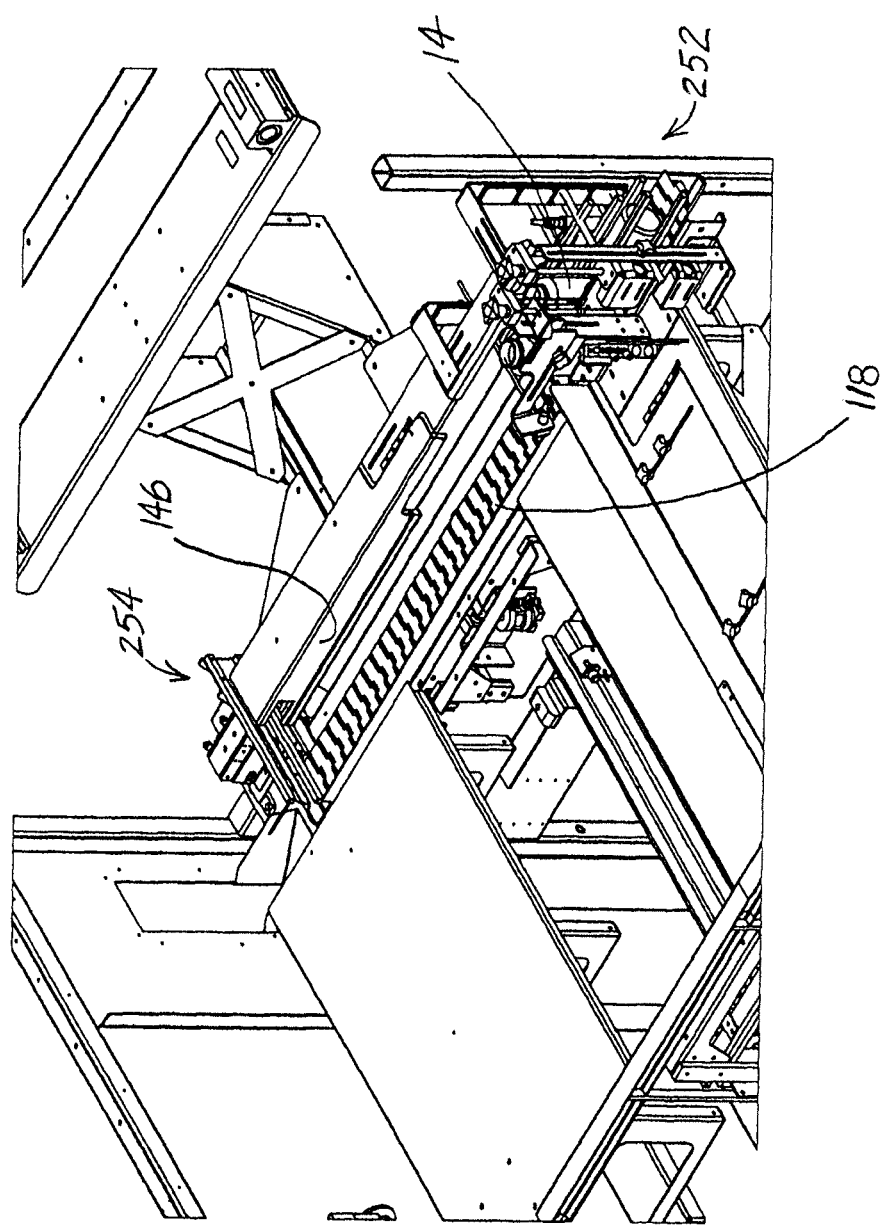
FIG. 46 is an enlarged, partial view of FIG. 45 of an exemplary sensor group.
Figure 47:
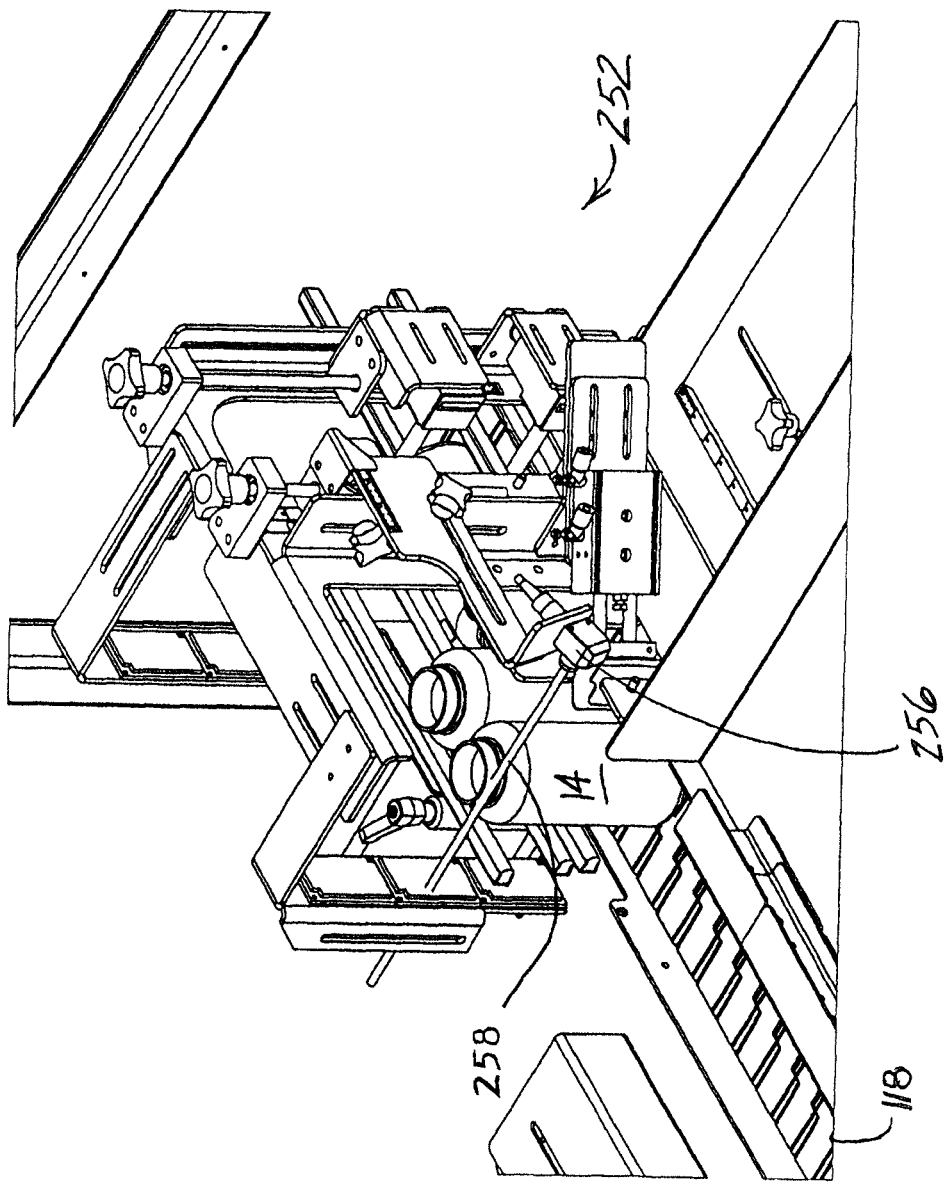
FIG. 47 is an enlarged, partial view of the sensor group of FIG. 46.

FIG. 45 is a partial cutaway view of FIG. 2 of article array forming/moving system 112 rotated 90 degrees counterclockwise about a vertical axis, showing a motor 250 for rotatably driving delivery device 118. FIG. 46 is an enlarged, partial view of FIG. 45 showing a sensor group 252 associated with controlling articles 14 conveyed by delivery device 118. FIG. 47 is an enlarged, partial view of sensor group 252 of FIG. 46. As further shown in FIG. 47, sensor 256 directs a beam 258 transverse to the path of articles 14 conveyed along article row delivery device 118 for purposes of counting the number of articles provided by article row delivery device 118. In response to a predetermined number of articles 14 "breaking" beam 258 and corresponding to a desired number of articles 14 to form an article row 16 (FIG. 16), operation of article row delivery device 118 is halted, preventing further delivery of the articles.

Figure 48:
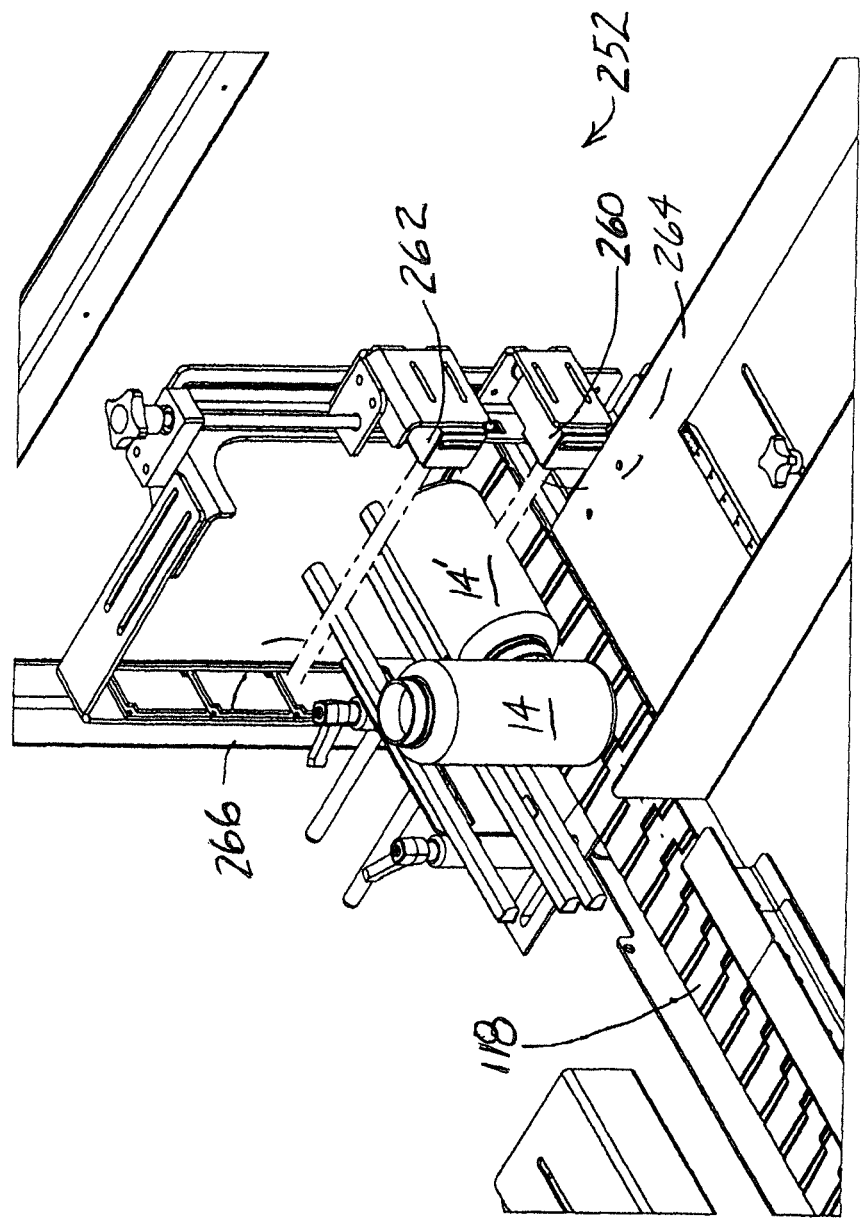
FIG. 48 is an enlarged, partial view of the sensor group of FIG. 46.
Figure 50:
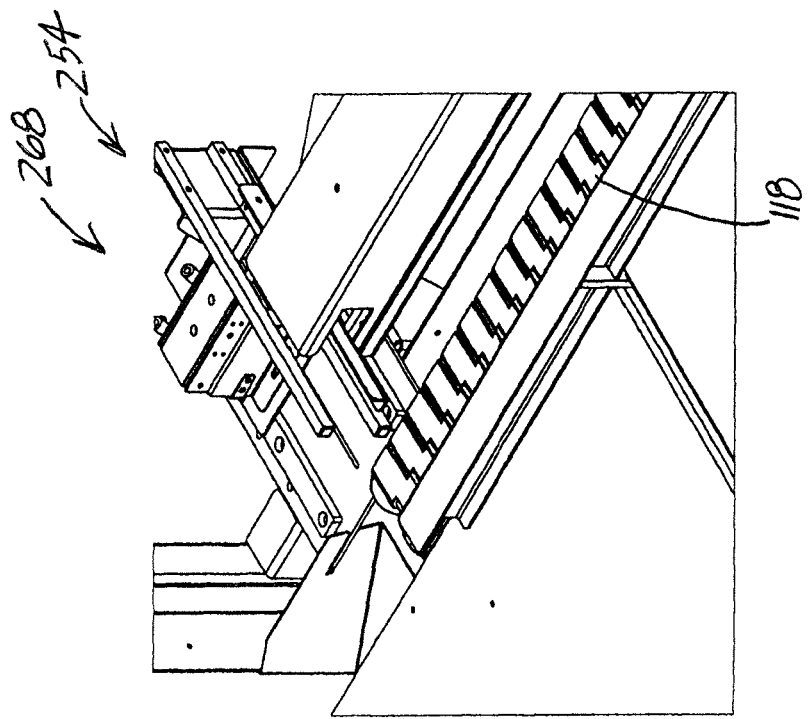
FIG. 50 is an upper perspective view of the actuating gate of FIG. 49 in an open position.
Figure 49:
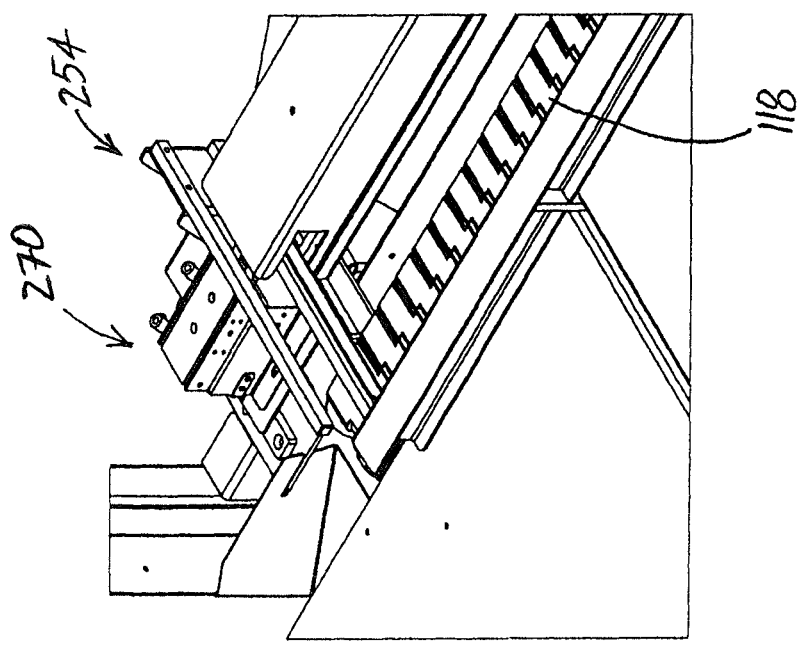
FIG. 49 is an upper perspective view of an exemplary actuating gate in a closed position.
Figure 52:
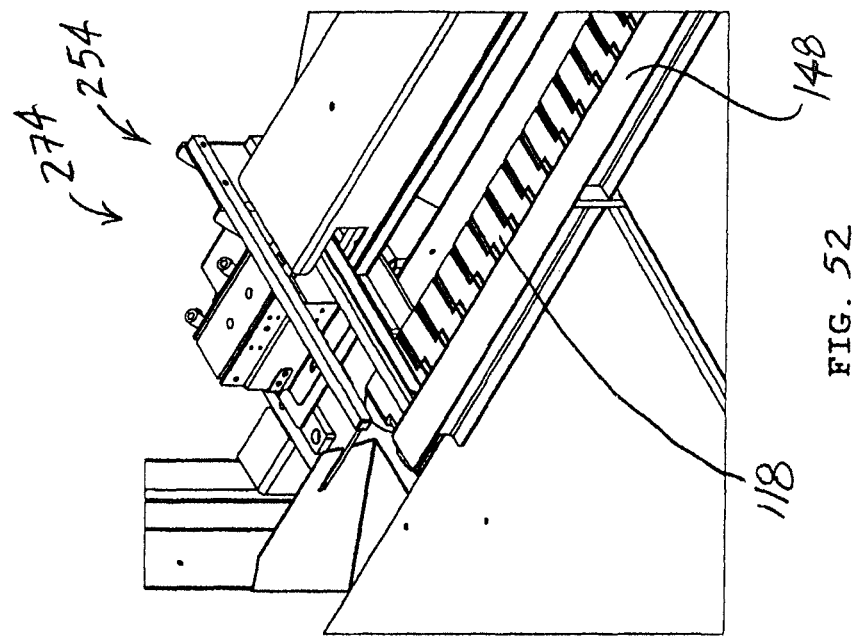
FIG. 52 is an upper perspective view of the actuating gate of FIG. 49 in a staggered position.
Figure 51:
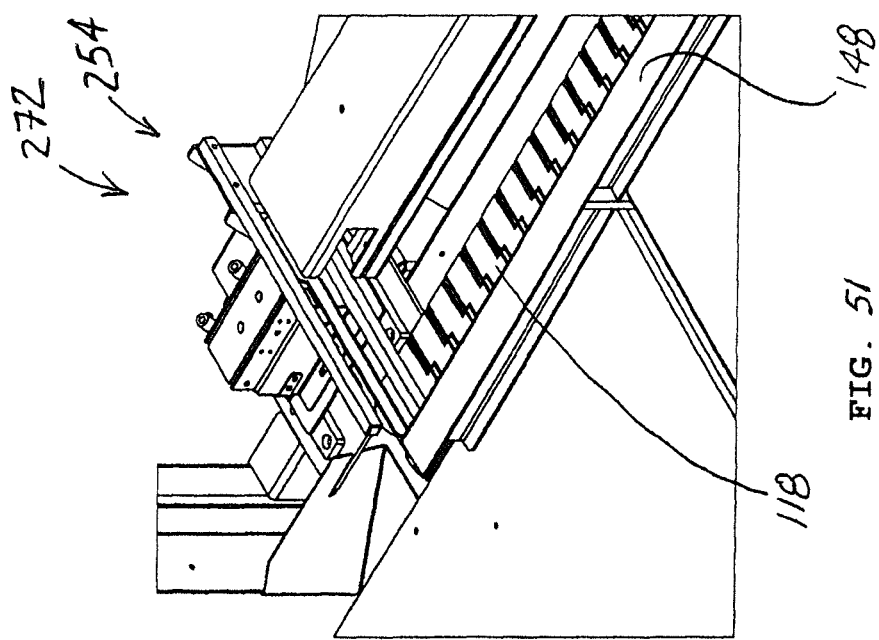
FIG. 51 is an upper perspective view of the actuating gate in a home position.

As shown in FIG. 48, which is an enlarged, partial view of sensor group 252 of FIG. 46, sensors 260, 262 direct respective beams 264, 266 transverse to the path of articles 14 conveyed along article row delivery device 118 for purposes of determining if an article 14 has become a tipped article 14'. That is, as further shown in FIG. 48, tipped article 14' breaks beam 264 of sensor 260, but does not break beam 266 of sensor 262, indicating an error condition, resulting in all of the articles 14 conveyed by row delivery device 118 being cleared from the row delivery device by activating motor 250 (FIG. 45) and actuating gate 254 (FIG. 50) positioned at a distal end of row delivery device 118 to an open position 268 (FIG. 50). As shown in FIG. 49, once the articles 14, 14' have been cleared from row delivery device 118, gate 254 is returned to a closed position 270. Optionally, as shown in FIGS. 51-52, gate 254 can be actuated between a home position 272 (FIG. 51) and a staggered or adjusted position 274 (FIG. 52) in order to form a desired staggered arrangement of article rows, e.g., alternating rows, in order to increase the packing factor of the article array.

Once article row 16 is received from article row delivery device 118, as further shown in FIG. 22, article row 16 is stabilizingly supported by backing plate 146 and stabilizer 152.

Figure 53:
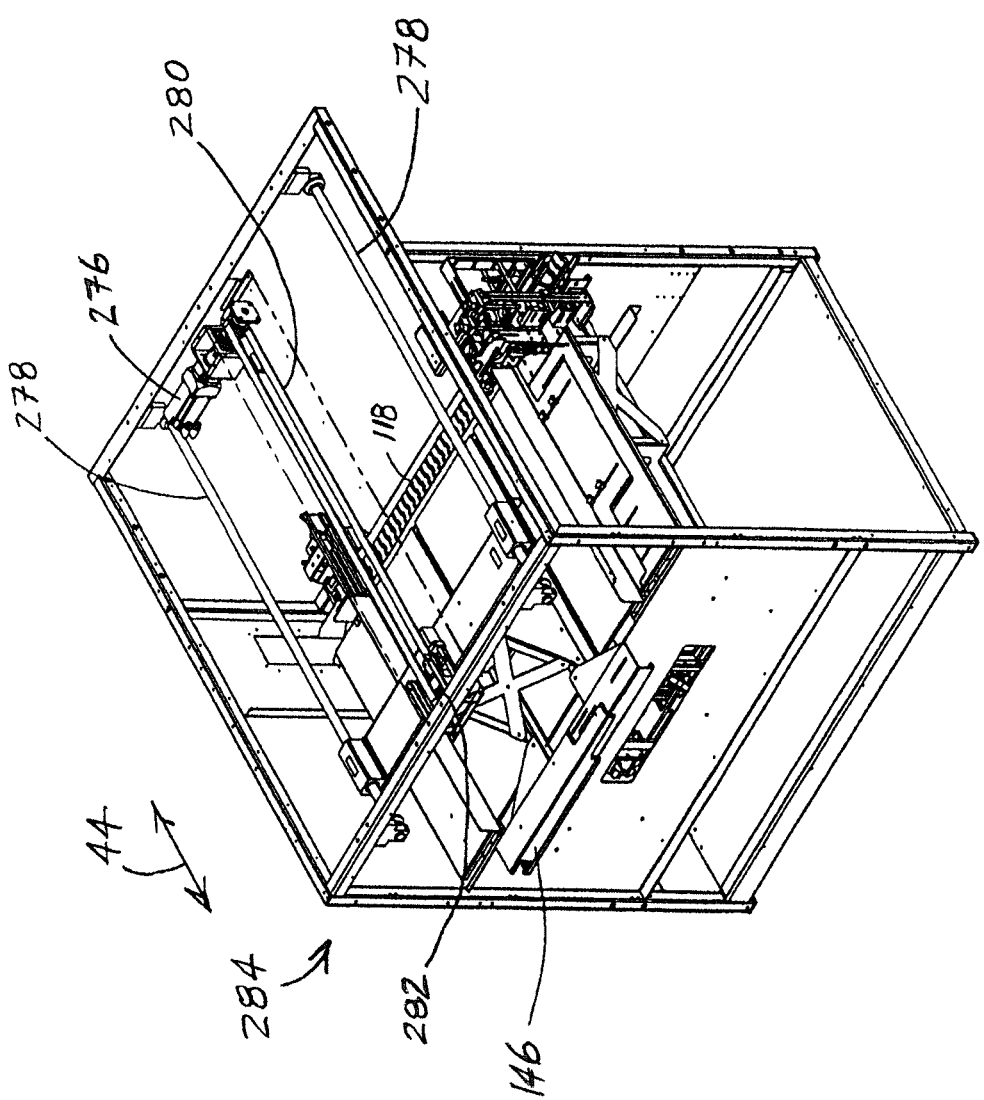
FIG. 53 is an upper perspective view of an exemplary backing plate in an extended position.

As shown in FIG. 53, backing plate 146 is urged into movement in horizontal direction 44 along guides 278 by a motor 250 which rotationally drives a drive belt 280 that is connected to backing plate 146 by a block 282. FIG. 53 shows backing plate 146 in an extended position 284, while FIG. 45 shows backing plate 146 in starting or home position 162.

As shown in FIGS. 54-55, stabilizer 152 is urged into selective movement in vertical direction 42 along guides 296 by actuator 288 between a raised position 290 (FIG. 54) and a retracted position 292 (FIG. 55), such as a pneumatic actuator as a result of selectively providing pressurized gas to fittings 294 in fluid communication with the actuator in a conventional manner.

Figure 23:
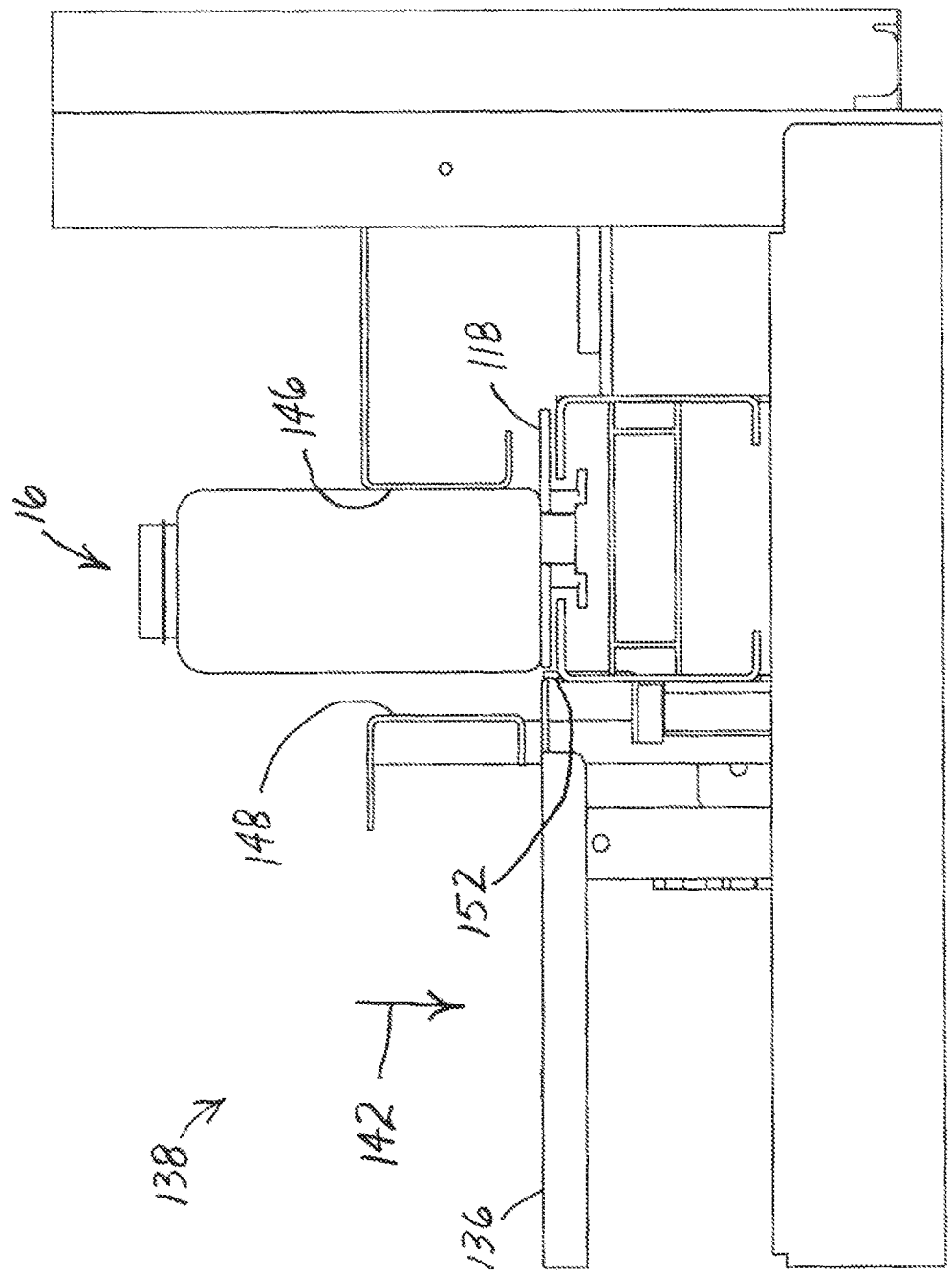

Once article row 16 is stabilizingly supported, then as shown in FIG. 23, stabilizer 152 is moved in vertical direction 142 until stabilizer 152 is in retracted position 292 (FIG. 55) that is substantially flush with the surface of article row delivery device 118 and support surface 136 of consolidation area 138. In one embodiment, stabilizer 152 may be rotated to achieve a retracted position 292 (FIG. 55) that is substantially flush relative to the surface of article row delivery device 118 and support surface 136. By virtue of the close proximity of stabilizer 152 and stabilizer 148, even with stabilizer 152 retracted, the periphery of article row 16 remains continuously stabilizingly supported by backing plate 146, stabilizer 148 and consolidation area 138. Consolidation area 138 includes support surface 136, backing plate 146, stabilizer 148, support members 150 (FIG. 29) and other components as will be discussed in further detail below.

Figure 24:
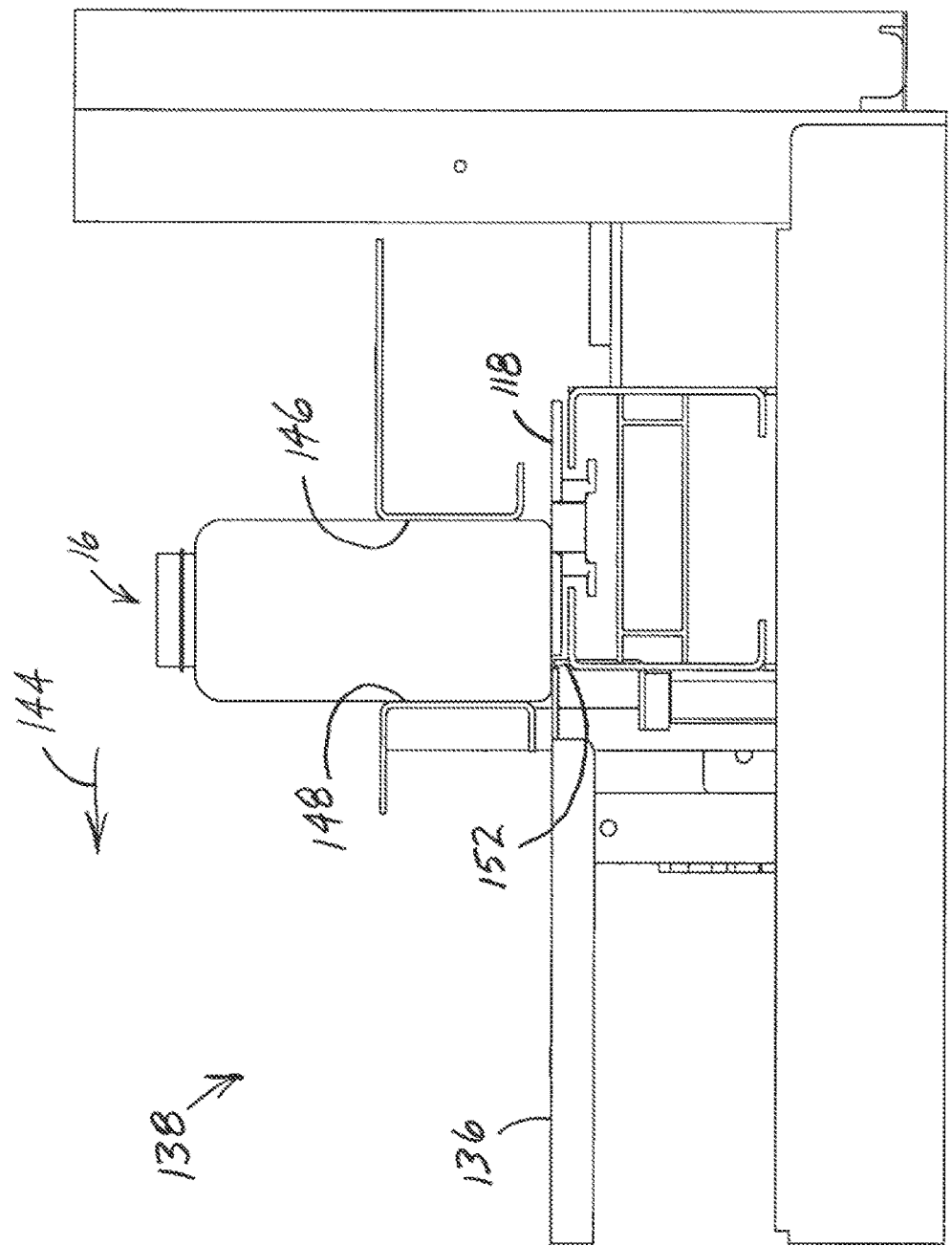
Figure 25:
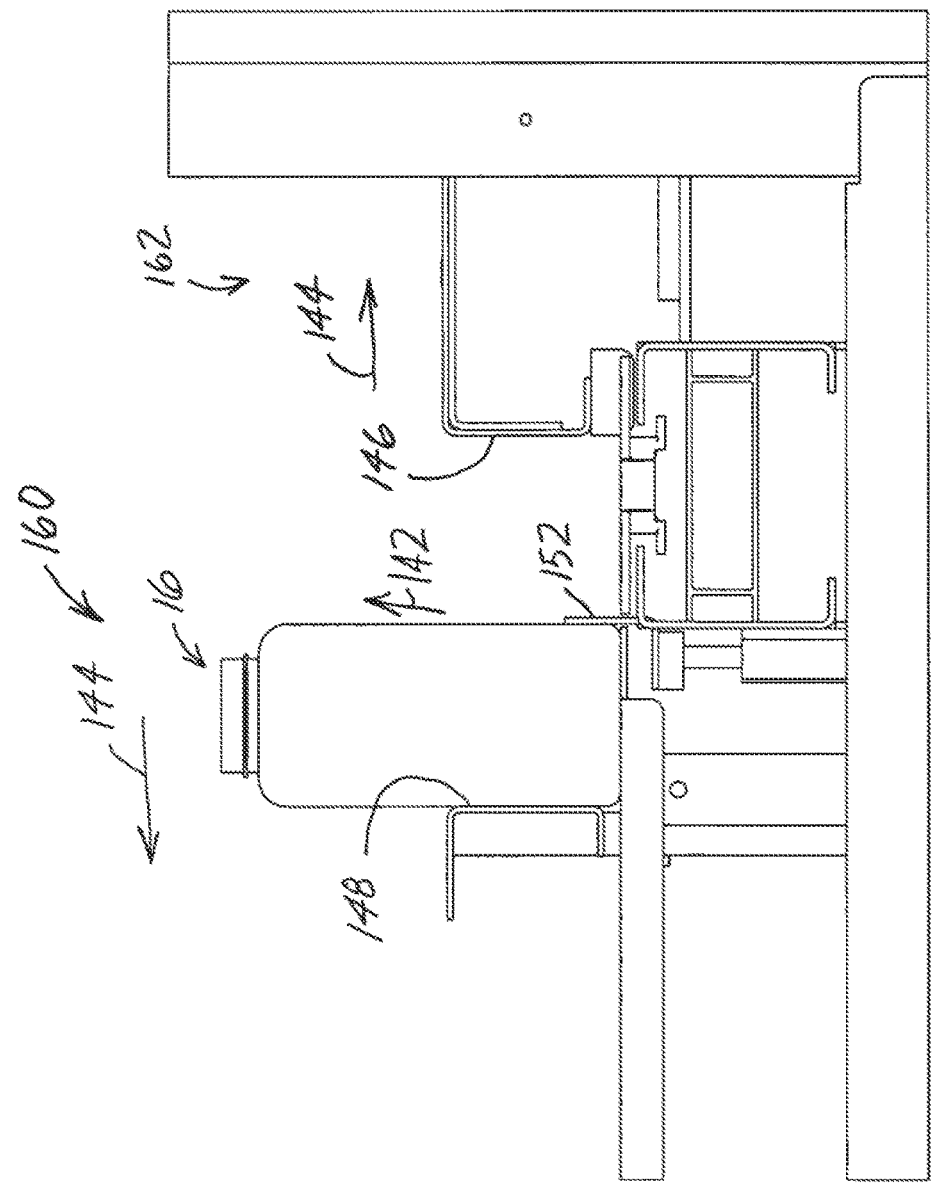

Once stabilizer 152 is in a retracted position, then as shown in FIG. 24, backing plate 146 and stabilizer 148 move and stabilizingly support opposed portions of the periphery of article row 16 in a horizontal direction 144 away from article row delivery device 118 and over retracted stabilizer 152. Article row 16 is then further moved in a horizontal direction 144 until reaching an extended predetermined position 160 (FIG. 25).

Figure 31:
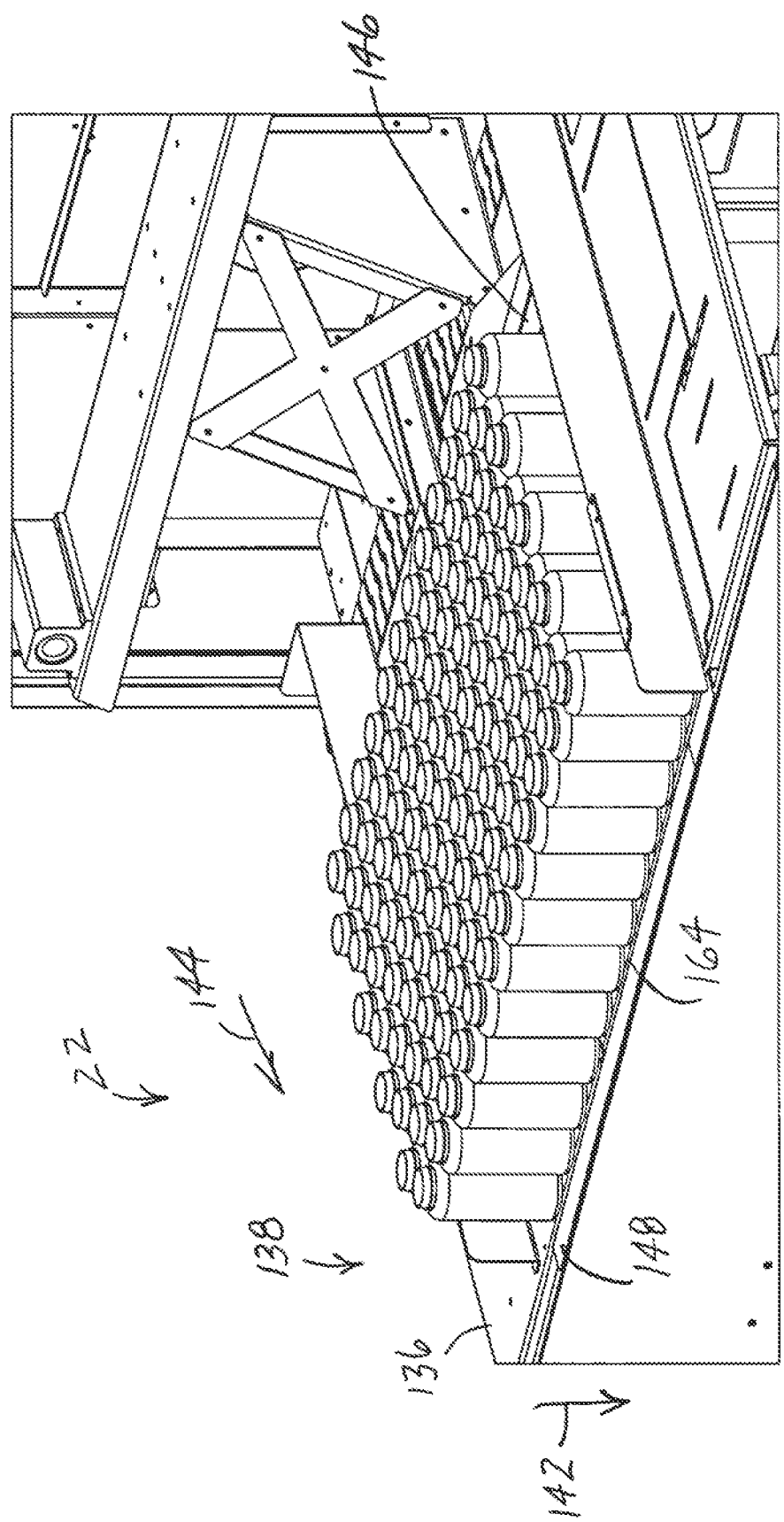
Figure 56:
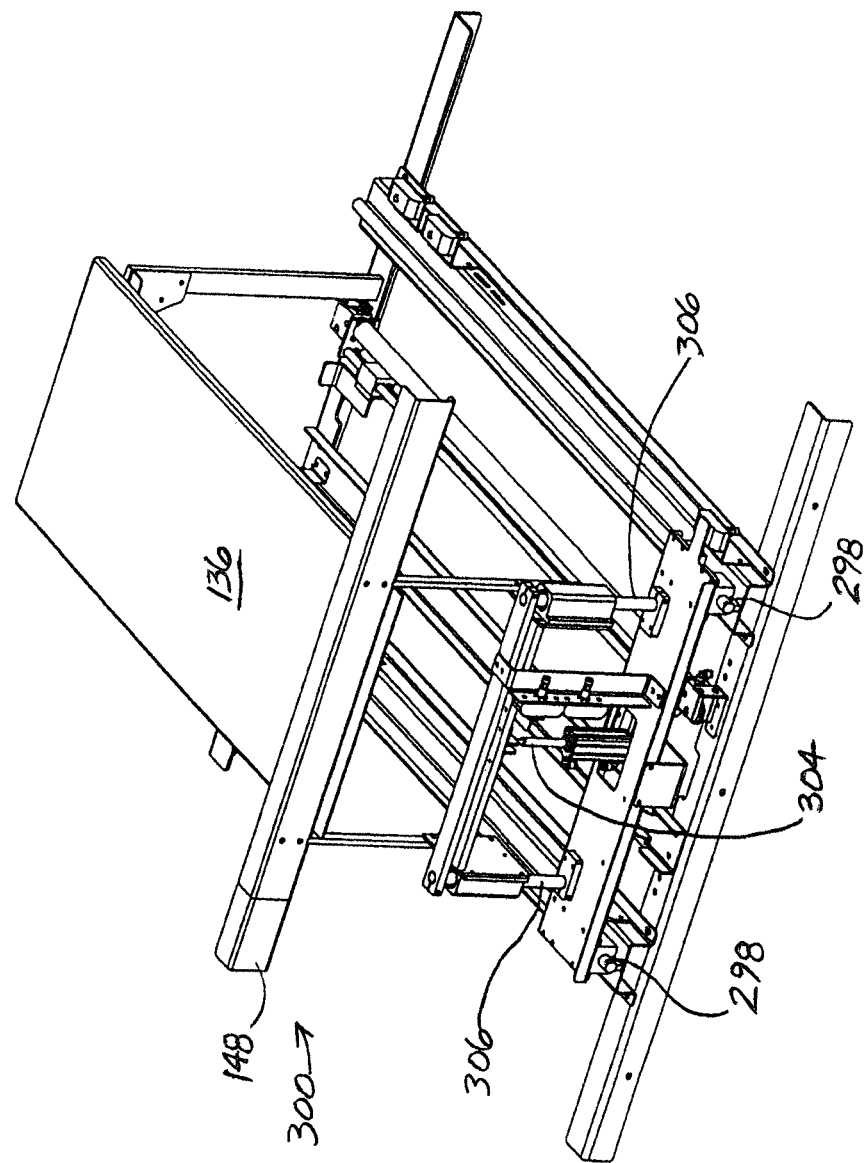
FIG. 56 is an isolated upper perspective view of an exemplary stabilizer in a home position.
Figure 57:
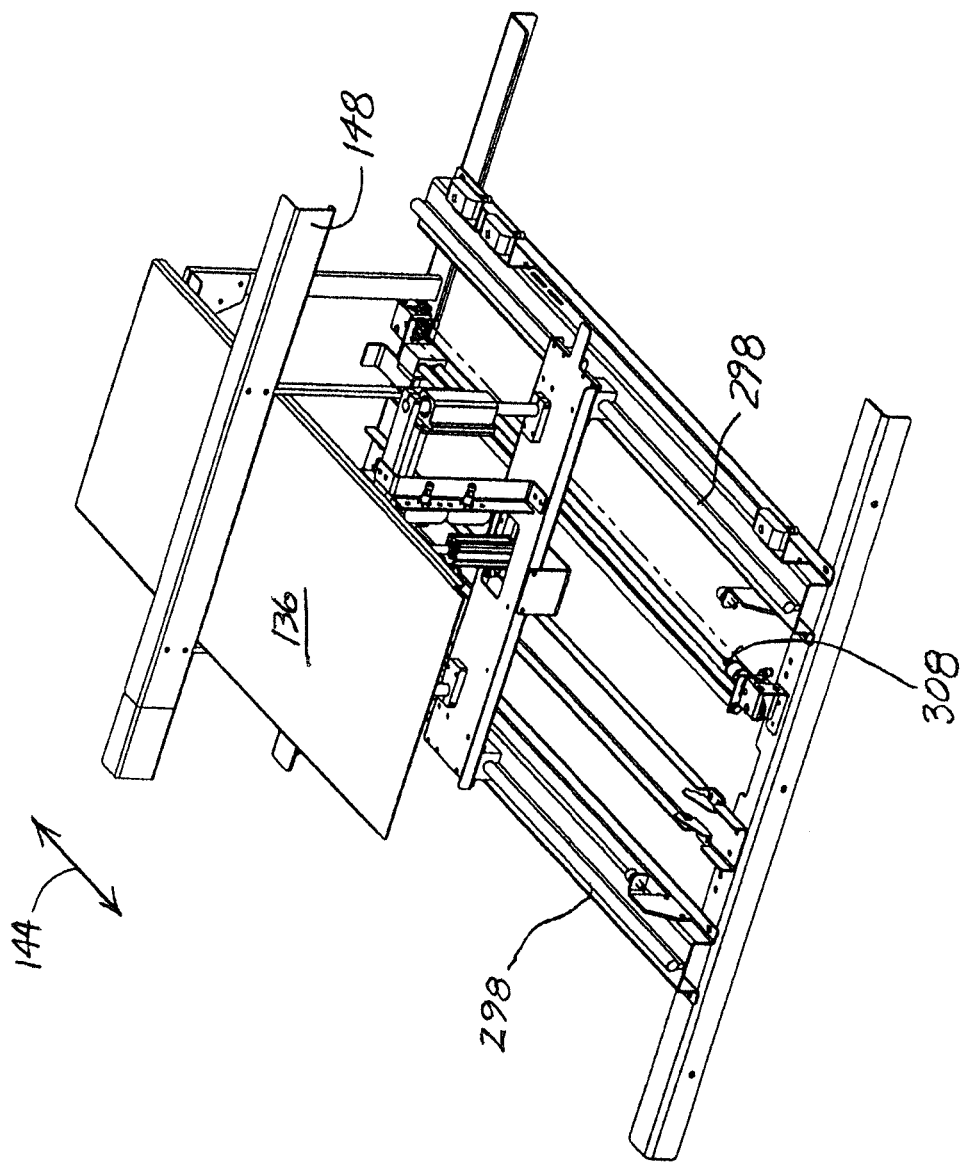
FIG. 57 is an isolated upper perspective view of the stabilizer of FIG. 56 in an intermediate position between the home position and an extended horizontal position.
Figure 58:
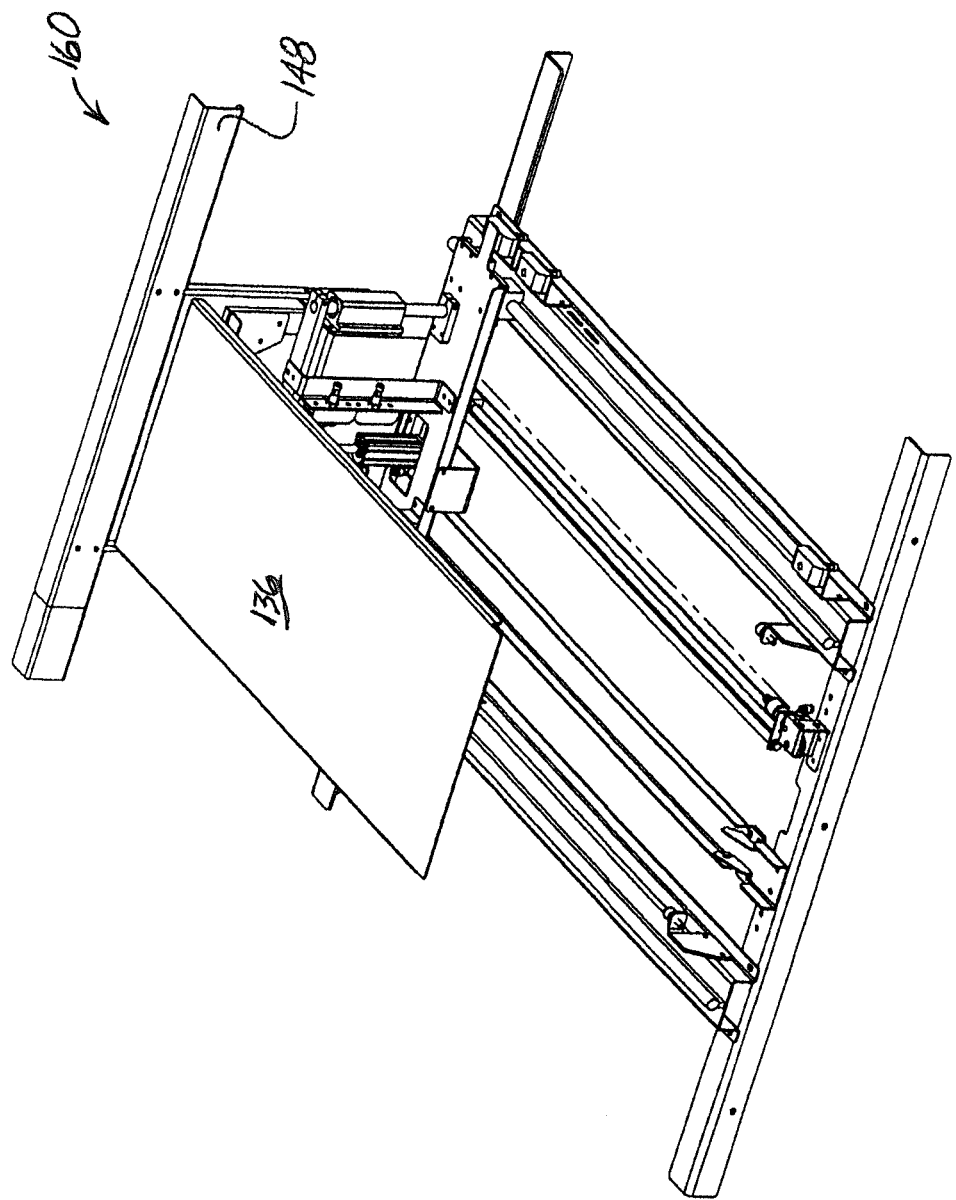
FIG. 58 is an isolated upper perspective view of the stabilizer of FIG. 56 in an extended horizontal position.

In a manner similar to stabilizer 48 (FIGS. 42-43), as shown in FIGS. 56-58, stabilizer 148 slidably moves in horizontal direction 144 along guides 298 between a home position 300 (FIG. 56) and an extended predetermined position 160 (see FIGS. 31, 58). Stabilizer 148 "floats," or is urged into movement in horizontal direction 144 as a result of backing plate 146, which is moving in horizontal direction 144, applying a horizontal force to article rows 16 (FIG. 26), which article rows 16 then applying a horizontal force to stabilizer 148.

However, between horizontal movements and applications of horizontal forces by backing plate 146 and article rows 16, stabilizer 148 maintains a fixed horizontal position due to inertia and friction between stabilizer 148 and guides 298, and continues to stabilizingly support at least a portion of the periphery of article rows 16.

Figure 59:
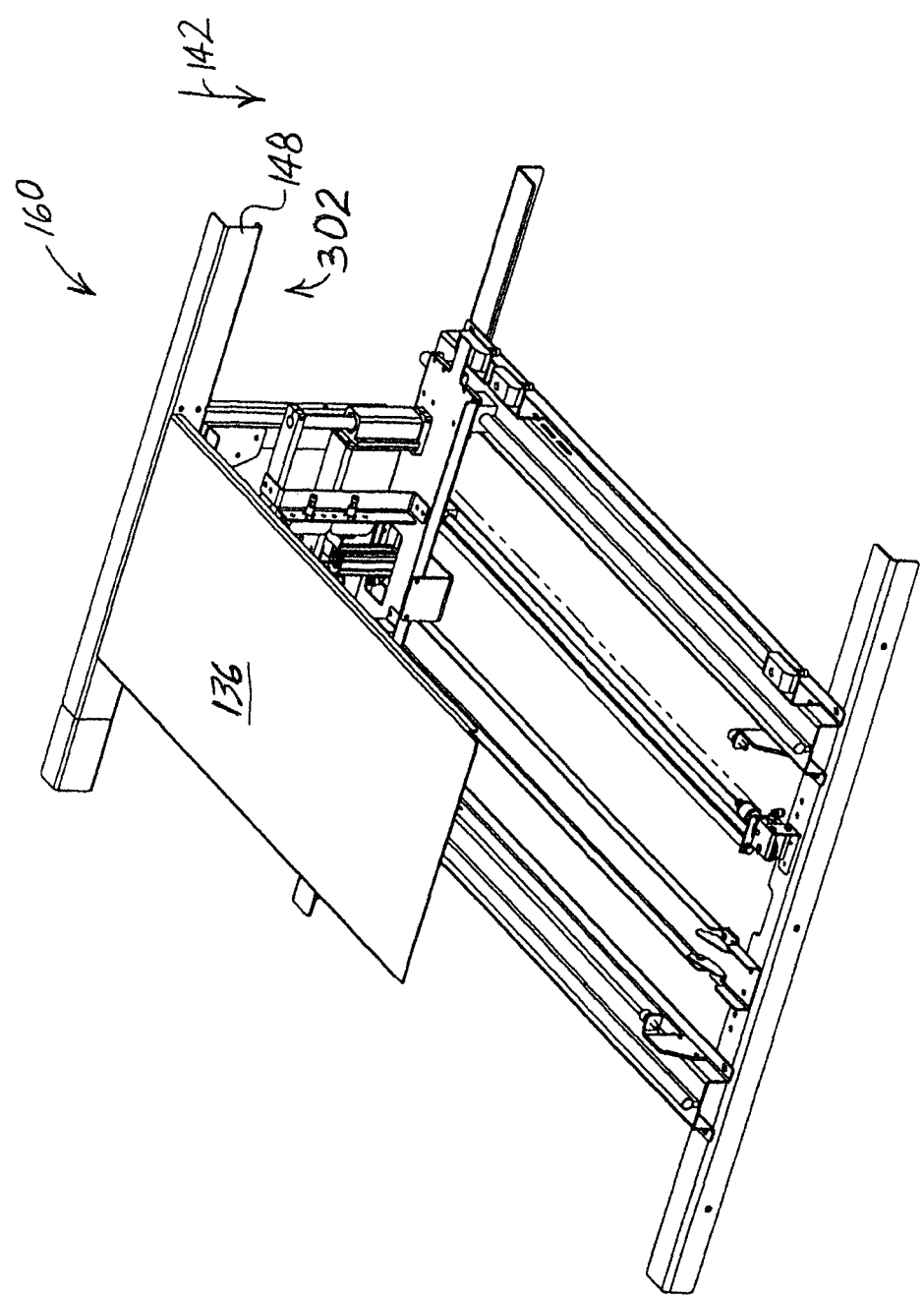
FIG. 59 is an isolated upper perspective view of the stabilizer of FIG. 58 in a vertically retracted position.

Once an article array 22 (FIG. 31) is formed and stabilizer 148 is in the extended predetermined position 160, then as shown in FIG. 59, an actuator 304 (FIG. 56) guided along guides 306 in a vertical direction 142 selectively retracts and urges stabilizer 148 into movement in vertical direction 142 such that stabilizer 148 is substantially flush with the support surface 136 in a retracted position 302 (FIG. 59).

Once article row 16 reaches extended predetermined position 160, then as shown in FIG. 25, stabilizer 152 is moved in vertical direction 142 to an extended position either prior to or substantially simultaneously with backing plate 146 moving in horizontal direction 144 away from article row 16, until backing plate 146 reaches a starting position or home position 162. In either event, stabilizer 152 provides an additional, independent stabilizing support to at least the portion of the periphery of article row 16 simultaneously stabilizingly supported by backing plate 146.

Figure 26:
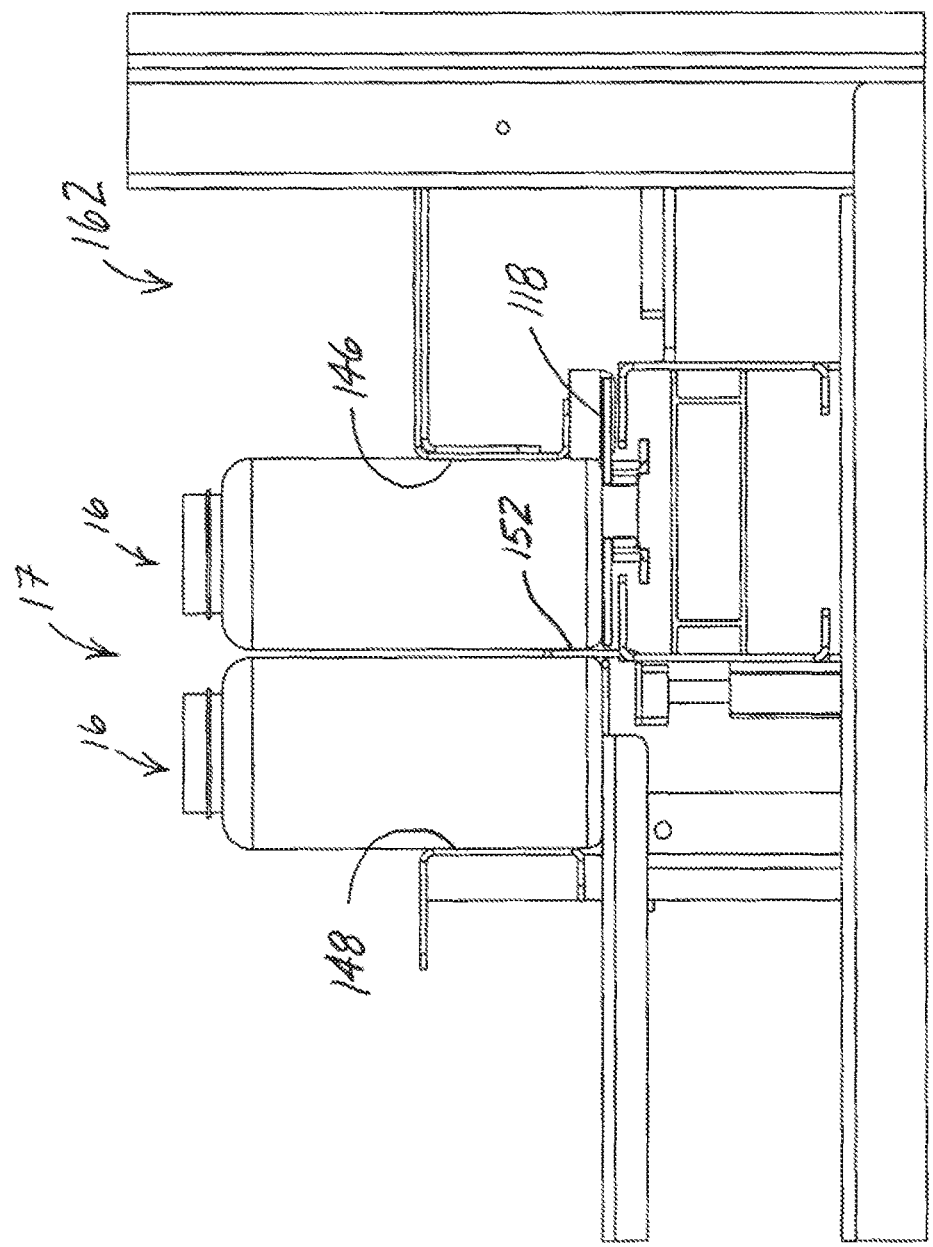

Once stabilizer 152 is in an extended position and backing plate 146 is in home position 162, then as shown in FIG. 26, an additional article row 16 is received from article row delivery device 118, the article rows 16 becoming an article row pair 17.

Figure 27:
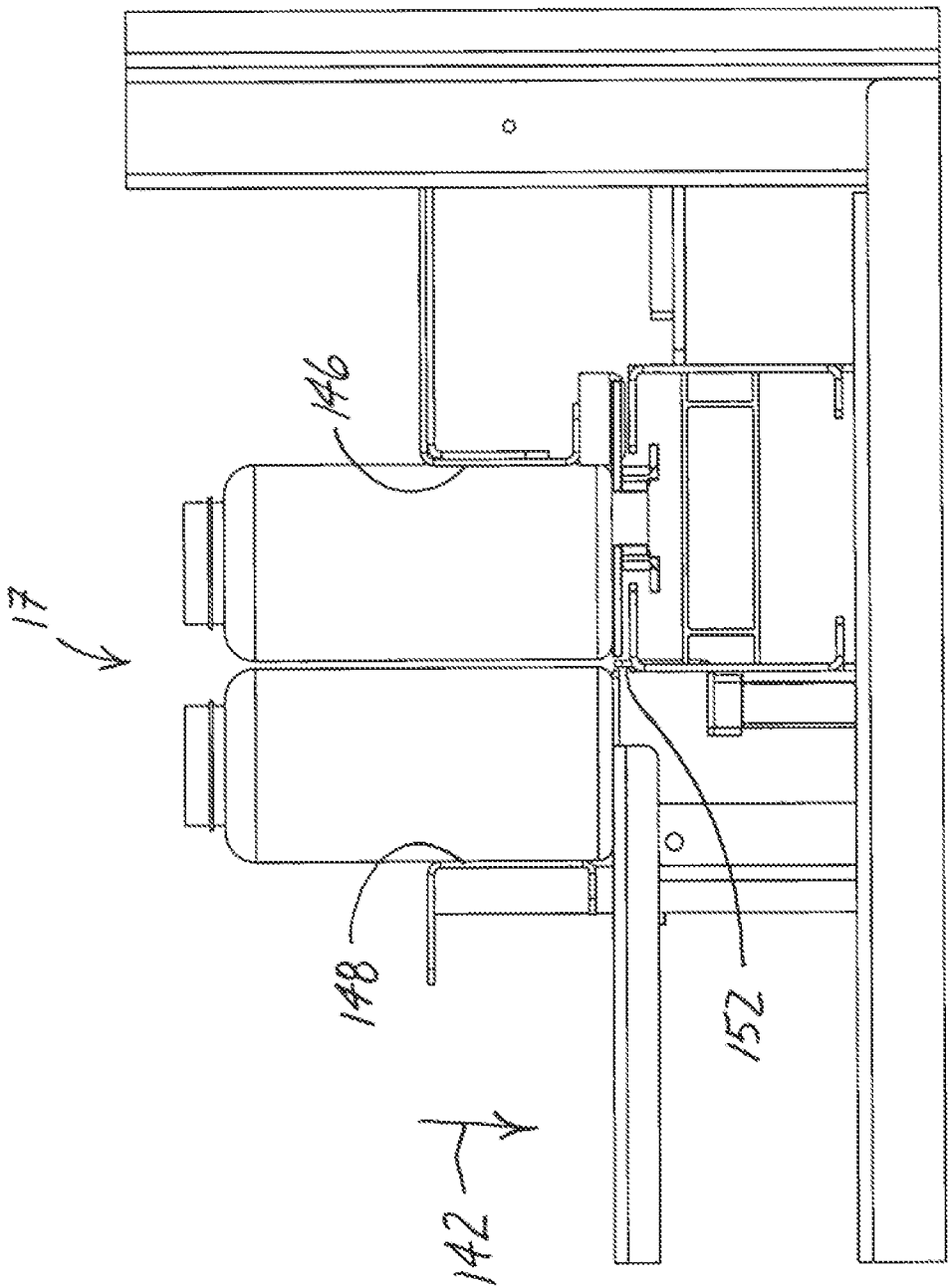

Once article row pair 17 has been formed, then as shown in FIG. 27, stabilizer 152 is moved in vertical direction 142 to its retracted position.

Figure 28:
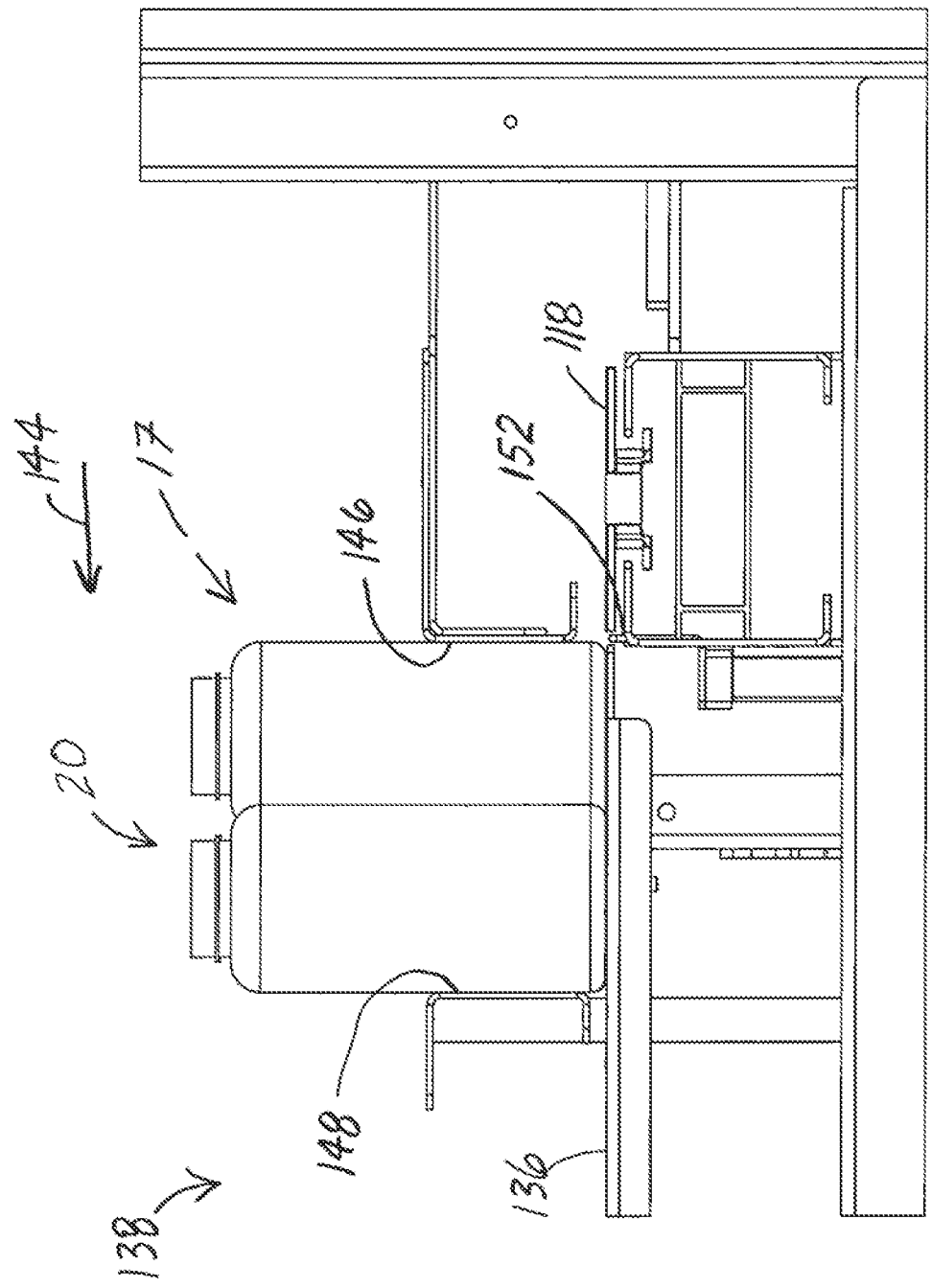

Once stabilizer 152 is retracted, then as shown in FIG. 28, backing plate 146 and stabilizer 148 move and stabilizingly support opposed portions of the periphery of article row pair 17 in a horizontal direction 144 away from article row delivery device 118 and over retracted stabilizer 152, article row pair 17 becoming partial article array 20. Depending upon the geometry of the articles, such as a circular cross section, adjacent article rows may partially overlap one another to form a more compact, stable arrangement, such as shown in FIG. 29 for article array 22.

Figure 29:
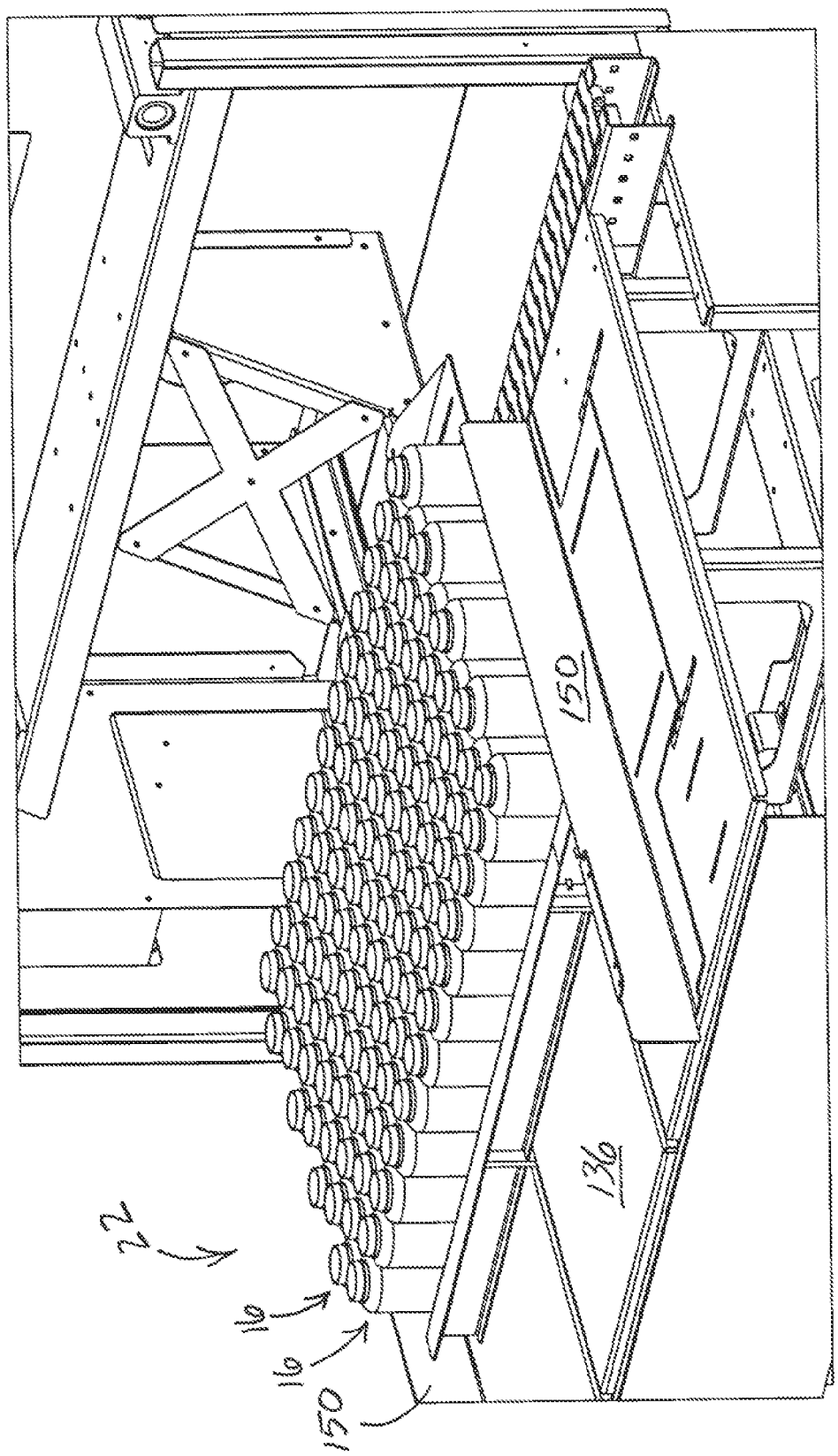

Once partial article array 20 has been formed, additional article rows 16 are added, such as previously discussed and shown in FIGS. 25-28, forming article array 22 as shown in FIG. 29.

Figure 30:
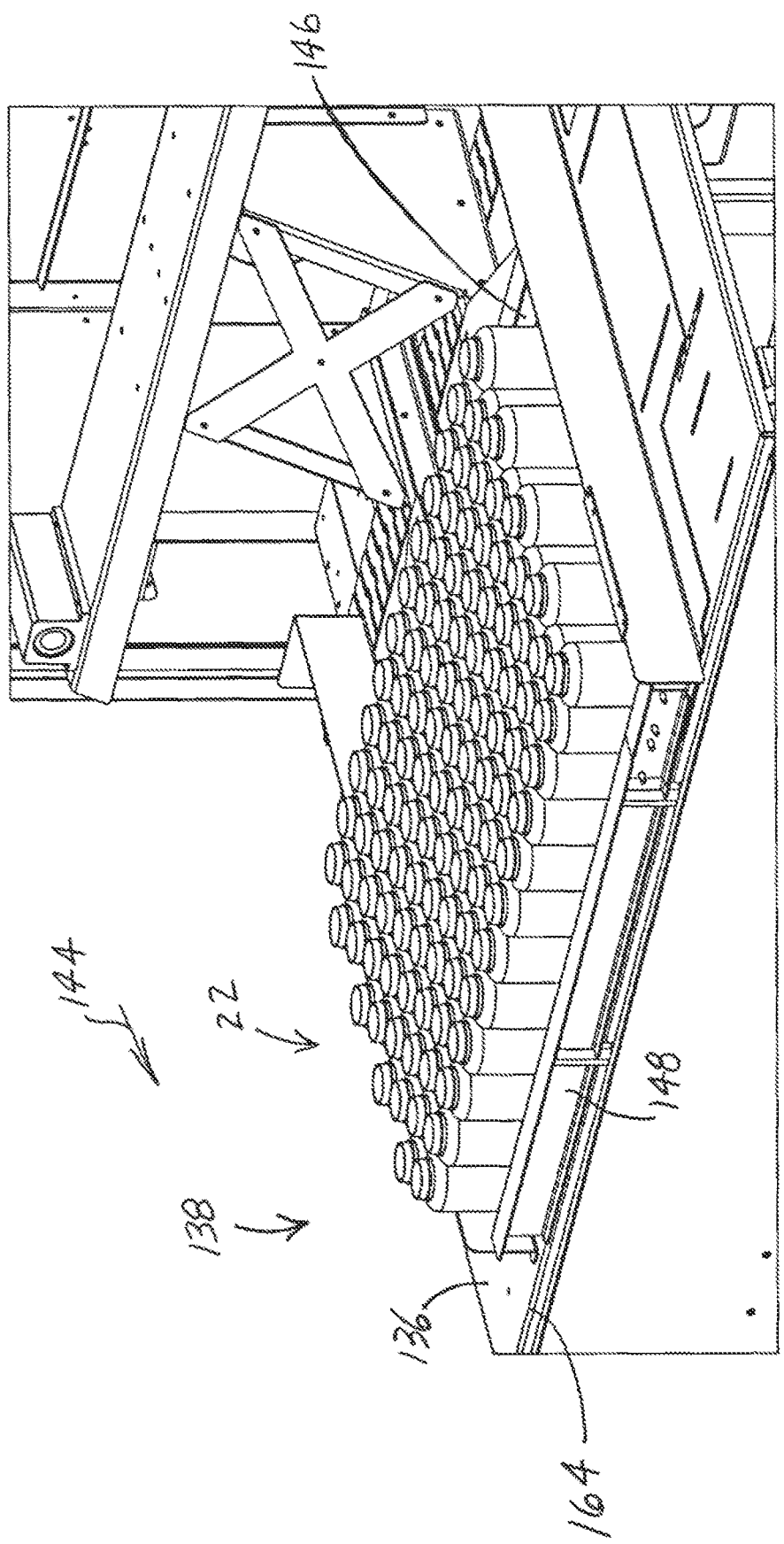

Once article array 22 has been formed, then as shown in FIG. 30, backing plate 146 and stabilizer 148 move and stabilizingly support opposed portions of the periphery of article array 22 in a horizontal direction 144 toward an end 164 of support surface 136 of consolidation area 138 in preparation of moving article array 22 from consolidation area 138 to a collection area 126, 226 (see respective FIGS. 2, 3). The periphery of article array 22 is continuously stabilizingly supported by backing plate 146, stabilizer 148, and consolidation area 138, which includes support members (FIG. 29), as previously discussed.

As shown in FIG. 31, as backing plate 146 and stabilizer 148 move and stabilizingly support opposed portions of the periphery of partial article array 20 in horizontal direction 144 toward end 164 of support surface 136 of consolidation area 138 in preparation of moving article array 22 from consolidation area 138 to a collection area 126, 226 (see respective FIGS. 32, 34), stabilizer 148 selectively retracts in a vertical direction 142, becoming substantially flush with support surface 136.

Figure 32:
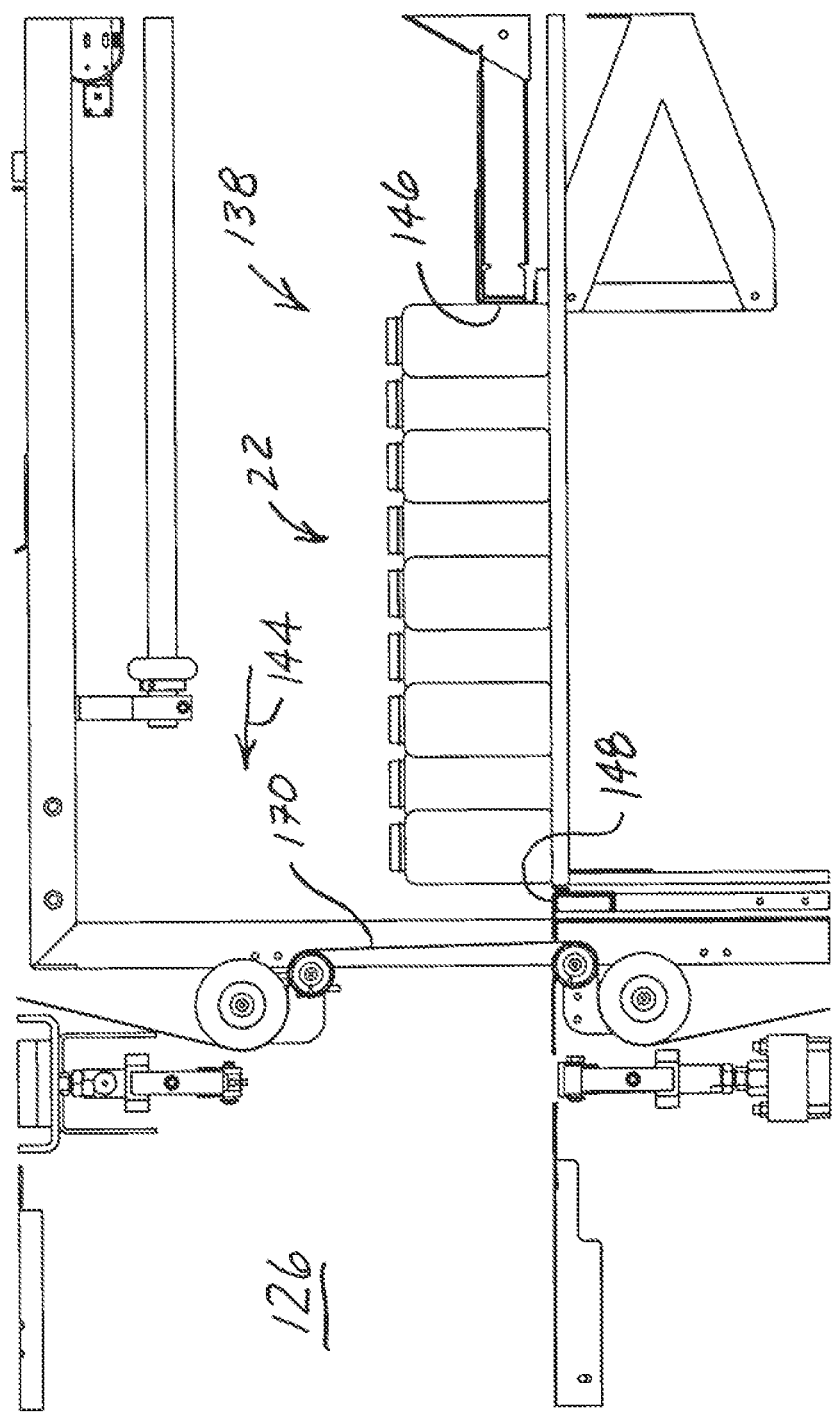
Figure 33:
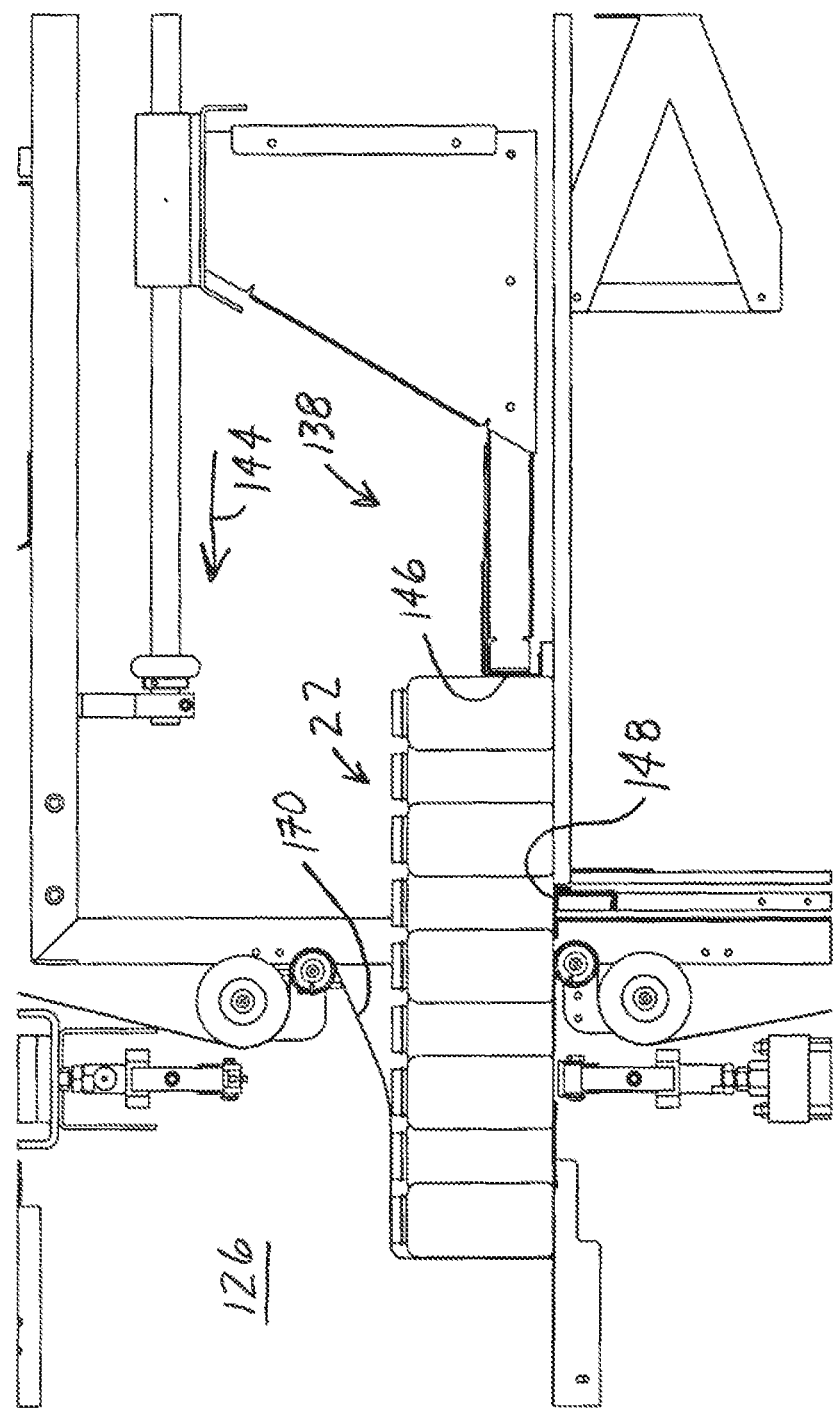

As shown in FIG. 32, which is an extended side view of FIG. 31, article array 22 is moved in horizontal direction 144 toward collection area 126, which is a bagging area. As further shown in FIG. 32, the periphery of article array 22 in close proximity to retracted stabilizer 148 is continuously stabilizingly supported as a result of its close proximity to film 170 of bagging area or collection area 126. FIG. 33 shows article array 22 further directed into collection area 126 and further surrounded by film 170, ultimately becoming a bagged article array (not shown).

FIG. 34 is similar to FIG. 33, except that article array 22 is being directed into collection area 226, such as an area including a slip sheet 172. A further difference with collection area 226 is that an additional stabilizer 174 is required to ensure article array 22 is continuously stabilizingly supported while being moved from consolidation area 138 to collection area 226.

Once article array 22 has been moved to collection area 116 (FIG. 33), 226 (FIG. 34), a linear actuator 308 (FIG. 57) selectively contacts and urges stabilizer 148 into movement in horizontal direction 144 from a predetermined extended position 160 (FIG. 59) toward home position 300 (FIG. 56) in preparation of receiving article rows for forming another article array.

Figure 35:
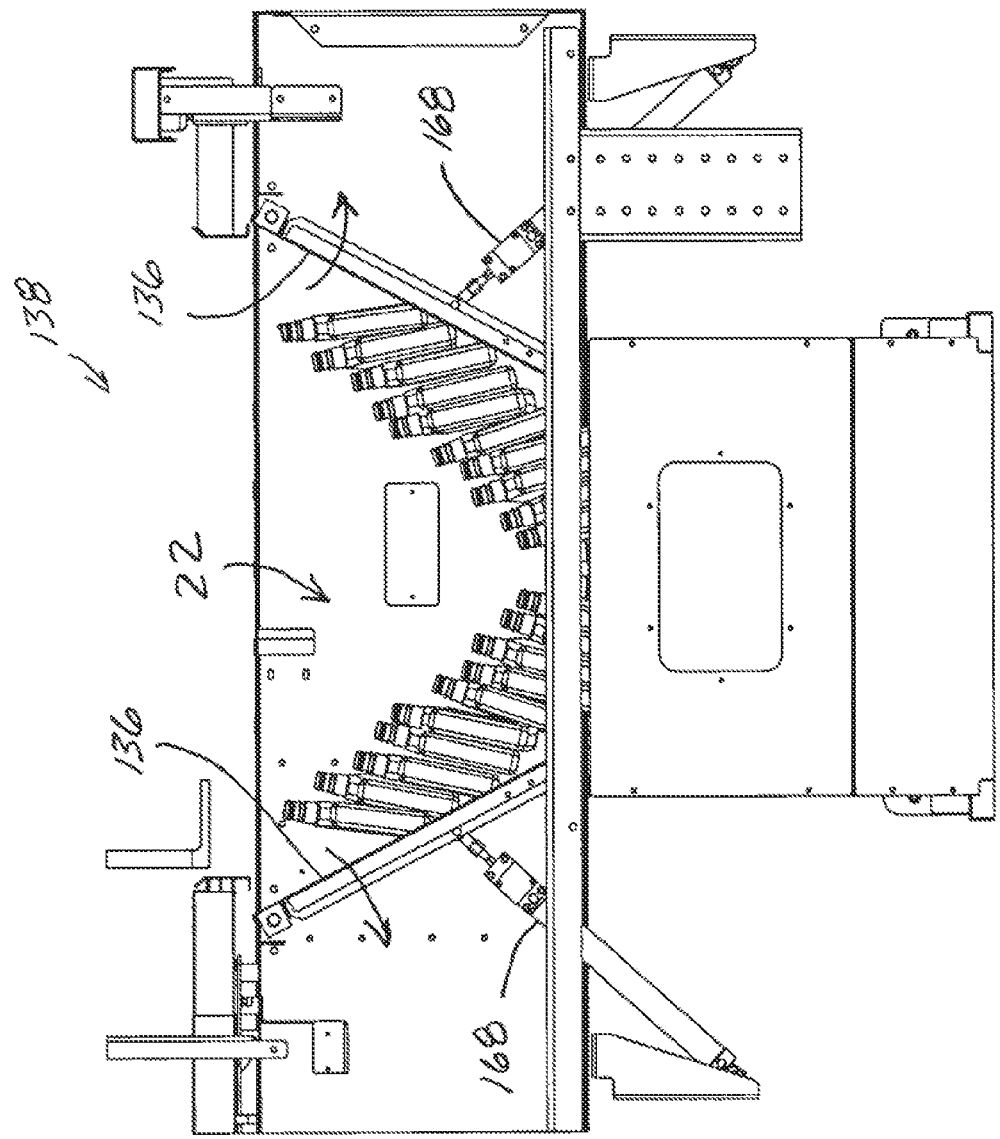
FIG. 35 is a side view of an exemplary embodiment of an article removal feature of an exemplary forming/moving system.

FIG. 35 shows an embodiment of consolidation area 138 in which portions of support surface 136 are pivotably connected to corresponding actuators 168. During normal operation, actuators 168 are maintained in an extended position, securing the portions of support surface 136 in a horizontal position for supporting an article array. However, for reasons such as partial tipping of articles of the article array 22, the presence of defective articles or for other reasons, actuators 168 are selectively urged toward a retracted position such that at least sufficient portions of support surface 136 subtend an angle with a horizontal plane sufficient to remove all articles on the portions of support surface 136 by force of gravity, thereby preventing all articles of the article array 22 from being movable to the collection area. This support surface construction resembles bombardier doors of an aircraft. In another embodiment, a single actuator may be utilized to support a support surface of unitary construction. In another embodiment, support surface 136 may include more than two portions, each having corresponding actuators.

It is to be understood that the movement of the article array forming/moving system and associated components is controlled by a computer or similar control device, including sensors operating in a known manner, and is driven by any appropriate drive mechanism known in the art.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A system for forming and moving an article array comprising:
   a consolidation area having a support surface for receiving and arranging rows of articles to form an article array from an article row delivery device while the consolidation area continuously stabilizingly supports a periphery of the article rows positioned on the support surface as the article rows are arranged to form the article array;
   wherein the consolidation area including a backing plate, a first stabilizer, and opposed support members, the article rows positioned between the backing plate, the first stabilizer, and the support members, the backing plate and the first stabilizer providing stabilizing support to opposed portions of the periphery of the article rows, and the support members providing stabilizing support to remaining portions of the periphery of the article rows;
   upon the first stabilizer and the backing plate moving and stabilizingly supporting the article rows in a first direction while forming the article array, at least the backing plate in contact with each article of a corresponding row of the article rows while moving the article rows in the first direction, a second stabilizer comprises a one-piece member having an uninterrupted contact surface providing independent stabilizing support to the portion of the periphery of the article rows stabilizingly supported by the backing plate prior to the backing plate moving in a direction opposite the first direction, in preparation of receiving additional article rows in the consolidation area immediately adjacent the article rows already positioned on the support surface for forming the article array;
   wherein upon formation of the article array, the second stabilizer discontinues providing stabilizing support to the portion of the periphery of article rows formerly stabilizingly supported by the backing plate, the portion of the periphery of the first row of articles formerly stabilizingly supported by the backing plate being stabilizingly supported by a corresponding portion of the periphery of the additional rows of articles, and a portion of the periphery of the additional row of articles being stabilizingly supported by the backing plate; and
   an article array moving device for moving the article array from the consolidation area toward the collection area.

2. The system of claim 1, wherein the article row delivery device comprises at least one of an article array head, a conveyor and a combination thereof.

3. The system of claim 1, wherein the article array moving device comprises at least one of an article array head and a movable backing plate.

4. The system of claim 1, wherein the collection area is selected from the group comprising a container, a slip sheet, a bagging area, and a tray.

5. The system of claim 1, wherein the first stabilizer moves out of the path of the article array prior to the article array reaching the collection area.

6. The system of claim 1, wherein the first stabilizer extends upwardly through the support surface, and is selectively retractable.

7. The system of claim 1, wherein the second stabilizer moves out of the path of the article array prior to the article array reaching the collection area.

8. The system of claim 1, wherein the support surface is selectively movable for removal of all articles of any of the article rows and the article array from the support surface, preventing all of the articles of any of article rows and the article array from being movable to the collection area.

9. The system of claim 8, wherein the support surface is pivotably connected to a device movable between an extended position and a retracted position, wherein in response to the device being in the retracted position, the support surface subtends an angle with a horizontal plane sufficient to remove all articles on the support surface by force of gravity.

10. A system for forming and moving an article array comprising:
   a consolidation area having a support surface for receiving and arranging rows of articles to form an article array from an article row delivery device while the consolidation area continuously stabilizingly supports a periphery of the article rows positioned on the support surface as the article rows are arranged to form the article array;
   wherein the consolidation area including a backing plate, a first stabilizer, and opposed support members, the article rows positioned between the backing plate, the first stabilizer, and the support members, the backing plate and the first stabilizer providing stabilizing support to opposed portions of the periphery of the article rows, and the support members providing stabilizing support to remaining portions of the periphery of the article rows;
   upon the first stabilizer and the backing plate moving and stabilizingly supporting the article rows in a first direction while forming the article array, at least the backing plate in contact with each article of a corresponding row of the article rows while moving the article rows in the first direction, a second stabilizer provides independent stabilizing support to the portion of the periphery of the article rows stabilizingly supported by the backing plate prior to the backing plate moving in a direction opposite the first direction, in preparation of receiving additional article rows in the consolidation area immediately adjacent the article rows already positioned on the support surface for forming the article array;

wherein the second stabilizer is solely movable in a vertical direction;

wherein upon formation of the article array, the second stabilizer discontinues providing stabilizing support to the portion of the periphery of article rows formerly stabilizingly supported by the backing plate, the portion of the periphery of the first row of articles formerly stabilizingly supported by the backing plate being stabilizingly supported by a corresponding portion of the periphery of the additional rows of articles, and a portion of the periphery of the additional row of articles being stabilizingly supported by the backing plate; and an article array moving device for moving the article array from the consolidation area toward the collection area.

11. A system for forming and moving an article array comprising:

a consolidation area having a support surface for receiving and arranging rows of articles to form an article array from an article row delivery device while the consolidation area continuously stabilizingly supports a periphery of the article rows positioned on the support surface as the article rows are arranged to form the article array;

wherein the consolidation area including a backing plate, a first stabilizer, and opposed support members, the article rows positioned between the backing plate, the first stabilizer, and the support members, the backing plate and the first stabilizer providing stabilizing support to opposed portions of the periphery of the article rows, and the support members providing stabilizing support to remaining portions of the periphery of the article rows;

upon the first stabilizer and the backing plate moving and stabilizingly supporting the article rows in a first direction while forming the article array, at least the backing plate in contact with each article of a corresponding row of the article rows while moving the article rows in the first direction, a second stabilizer provides independent stabilizing support to the portion of the periphery of the article rows stabilizingly supported by the backing plate prior to the backing plate moving in a direction opposite the first direction, in preparation of receiving additional article rows in the consolidation area immediately adjacent the article rows already positioned on the support surface for forming the article array;

wherein the backing plate includes a lateral profile and the second stabilizer includes a lateral profile;

wherein the lateral profile of the backing plate and the lateral profile of second stabilizer non-intersectingly move relative to one another during operation of the system;

wherein upon formation of the article array, the second stabilizer discontinues providing stabilizing support to the portion of the periphery of article rows formerly stabilizingly supported by the backing plate, the portion of the periphery of the first row of articles formerly stabilizingly supported by the backing plate being stabilizingly supported by a corresponding portion of the periphery of the additional rows of articles, and a portion of the periphery of the additional row of articles being stabilizingly supported by the backing plate; and an article array moving device for moving the article array from the consolidation area toward the collection area.

12. A system for forming and moving an article array comprising:

a consolidation area having a support surface for receiving and arranging rows of articles to form an article array from an article row delivery device while the consolidation area continuously stabilizingly supports a periphery of the article rows positioned on the support surface as the article rows are arranged to form the article array;

wherein the consolidation area including a backing plate, a first stabilizer, and opposed support members, the article rows positioned between the backing-plate, the first stabilizer, and the support members, the backing plate and the first stabilizer providing stabilizing support to opposed portions of the periphery of the article rows, and the support members providing stabilizing support to remaining portions of the periphery of the article rows;

upon the first stabilizer and the backing plate moving and stabilizingly supporting the article rows in a first direction while forming the article array, at least the backing plate in contact with each article of a corresponding row of the article rows while moving the article rows in the first direction, a second stabilizer provides independent stabilizing support as a result of an application of a vertical compressive stability force to the portion of the periphery of the article rows stabilizingly supported by the backing plate prior to the backing plate moving in a direction opposite the first direction, in preparation of receiving additional article rows in the consolidation area immediately adjacent the article rows already positioned on the support surface for forming the article array;

wherein upon formation of the article array, the second stabilizer discontinues providing stabilizing support to the portion of the periphery of article rows formerly stabilizingly supported by the backing plate, the portion of the periphery of the first row of articles formerly stabilizingly supported by the backing plate being stabilizingly supported by a corresponding portion of the periphery of the additional rows of articles, and a portion of the periphery of the additional row of articles being stabilizingly supported by the backing plate; and an article array moving device for moving the article array from the consolidation area toward the collection area.

* * * * *